United States Patent
Rodriguez et al.

(10) Patent No.: US 7,409,140 B2
(45) Date of Patent: Aug. 5, 2008

(54) CHANNEL BUFFERING AND DISPLAY MANAGEMENT SYSTEM FOR MULTI-TUNER SET-TOP BOX

(75) Inventors: Arturo A. Rodriguez, Norcross, GA (US); Ramesh Nallur, Duluth, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 1524 days.

(21) Appl. No.: 10/143,123

(22) Filed: May 10, 2002

(65) Prior Publication Data
US 2002/0168178 A1    Nov. 14, 2002

Related U.S. Application Data

(60) Provisional application No. 60/290,315, filed on May 11, 2001.

(51) Int. Cl.
H04N 5/91 (2006.01)
(52) U.S. Cl. .......................... 386/46; 725/59
(58) Field of Classification Search ................ 386/46, 386/83, 124; 718/100, 104; 725/38, 46, 725/59, 151
See application file for complete search history.

(56) References Cited

U.S. PATENT DOCUMENTS

| | | | |
|---|---|---|---|
| 4,706,121 A | 11/1987 | Young | 358/142 |
| 4,908,713 A | 3/1990 | Levine | 358/335 |
| 4,963,994 A | 10/1990 | Levine | 358/335 |
| 5,253,066 A | 10/1993 | Vogel | 358/188 |
| 5,293,357 A | 3/1994 | Hallenbeck | 348/734 |
| 5,371,551 A | 12/1994 | Logan et al. | 348/571 |
| 5,410,343 A | 4/1995 | Coddington et al. | 348/7 |
| 5,477,262 A | 12/1995 | Banker et al. | 348/7 |
| 5,479,268 A | 12/1995 | Young et al. | 358/335 |
| 5,508,815 A | 4/1996 | Levine | 358/335 |
| 5,568,272 A | 10/1996 | Levine | 386/48 |
| 5,661,526 A | 8/1997 | Hamamoto et al. | 348/465 |
| 5,724,646 A | 3/1998 | Ganek et al. | 455/4.2 |
| 5,809,204 A | 9/1998 | Young et al. | 386/83 |

(Continued)

OTHER PUBLICATIONS

Scientific-Atlanta, Inc. Pending U.S. Appl. No. 10/010,270, filed Dec. 6, 2001, Title: "Controlling Substantially Constant Buffer Capacity for Personal Video Recording With Consistent User Interface of Available Disk Space," Inventors: Harold J. Plourde, Jr. and Arturo A. Rodriguez.

(Continued)

Primary Examiner—Thai Q. Tran
Assistant Examiner—Mishawn Dunn

(57) ABSTRACT

A system is provided that resources media content of multiple display channels. The system includes a memory with logic, tuning resources to receive media content of a plurality of display channels, buffering resources for buffering the media content, display resources for displaying the media content from at least one of the display channels, and a processor configured with the logic to determine when the resources are unavailable to receive media content of a newly requested display channel. The processor is further configured with the logic to, responsive to a determination of insufficient resources, determine the lowest priority display channel using at least one user configurable rule, wherein the processor is further configured with the logic to effect discontinuing the receipt of media content of a display channel designated as having the lowest priority among a plurality of received display channels.

86 Claims, 24 Drawing Sheets

U.S. PATENT DOCUMENTS

| | | | |
|---|---|---|---|
| 5,854,887 A | 12/1998 | Kindell et al. | 395/200.13 |
| 5,889,920 A | 3/1999 | Compoint et al. | |
| 5,915,068 A | 6/1999 | Levine | 386/83 |
| 5,963,702 A | 10/1999 | Yamashita | |
| 5,990,881 A | 11/1999 | Inoue et al. | 345/327 |
| 5,999,691 A | 12/1999 | Takagi et al. | |
| 6,032,180 A | 2/2000 | Nishikawa | 709/217 |
| 6,052,562 A | 4/2000 | Dorenbosch | 455/38.1 |
| RE36,801 E | 8/2000 | Logan et al. | 348/571 |
| 6,118,834 A | 9/2000 | Rasanen | 375/372 |
| 6,163,335 A | 12/2000 | Barraclough | 348/15 |
| 6,226,447 B1 | 5/2001 | Sasaki et al. | |
| 6,233,389 B1 | 5/2001 | Barton et al. | |
| 6,430,363 B2 | 8/2002 | Sasaki et al. | |
| 6,445,872 B1 | 9/2002 | Sano et al. | |
| 6,665,869 B1 * | 12/2003 | Ellis et al. | 725/39 |
| 6,714,722 B1 | 3/2004 | Tsukidate | |
| 6,766,100 B1 | 7/2004 | Komar et al. | |
| 6,775,843 B1 * | 8/2004 | McDermott | 725/151 |
| 6,798,971 B2 | 9/2004 | Potrebic | |
| 6,850,691 B1 | 2/2005 | Stam et al. | |
| 6,868,225 B1 | 3/2005 | Brown et al. | |
| 6,993,782 B1 * | 1/2006 | Newberry et al. | 725/39 |
| 7,024,676 B1 * | 4/2006 | Klopfenstein | 725/49 |
| 7,028,329 B1 | 4/2006 | Mizutani | |
| 7,231,136 B2 | 6/2007 | Sasaki et al. | |
| 2001/0002224 A1 | 5/2001 | Sasaki et al. | |
| 2001/0019658 A1 | 9/2001 | Barton et al. | |
| 2001/0028782 A1 | 10/2001 | Ohno et al. | |
| 2001/0033736 A1 | 10/2001 | Yap et al. | |
| 2001/0051037 A1 | 12/2001 | Safadi et al. | |
| 2002/0009285 A1 | 1/2002 | Safadi et al. | |
| 2002/0046404 A1 | 4/2002 | Mizutani | |
| 2002/0071653 A1 | 6/2002 | Cowley et al. | |
| 2002/0076195 A1 | 6/2002 | Nakajima et al. | |
| 2002/0090004 A1 * | 7/2002 | Rinchiuso | 370/468 |
| 2002/0110352 A1 | 8/2002 | Potrebic | |
| 2002/0146233 A1 | 10/2002 | Barton et al. | |
| 2002/0174430 A1 | 11/2002 | Ellis et al. | |
| 2003/0028706 A1 | 2/2003 | Okada | |
| 2003/0068154 A1 | 4/2003 | Zyika | |
| 2003/0095792 A1 | 5/2003 | Ogikubo | |
| 2003/0099458 A1 | 5/2003 | Mizukami et al. | |
| 2003/0108331 A1 | 6/2003 | Plourde et al. | |
| 2003/0110513 A1 | 6/2003 | Plourde, Jr. et al. | |
| 2003/0128302 A1 | 7/2003 | Potrebic et al. | |
| 2003/0156826 A1 | 8/2003 | Sonoda et al. | |
| 2003/0206719 A1 | 11/2003 | Bumgardner et al. | |
| 2003/0215211 A1 | 11/2003 | Coffin, III | |
| 2003/0228126 A1 | 12/2003 | Buxton | |
| 2003/0231855 A1 | 12/2003 | Gates et al. | |
| 2003/0235391 A1 | 12/2003 | Gates et al. | |
| 2004/0005142 A1 | 1/2004 | Yoo et al. | |
| 2004/0013406 A1 | 1/2004 | Barton et al. | |
| 2004/0042103 A1 | 3/2004 | Mayer | |
| 2004/0091249 A1 | 5/2004 | Mekenkamp et al. | |
| 2004/0175094 A1 | 9/2004 | Mautner et al. | |
| 2004/0184776 A1 | 9/2004 | Inoue et al. | |
| 2004/0197078 A1 | 10/2004 | Yoon et al. | |
| 2004/0208477 A1 | 10/2004 | Bumgardner et al. | |
| 2004/0218905 A1 | 11/2004 | Green et al. | |
| 2004/0228609 A1 | 11/2004 | Nakamura | |
| 2004/0240840 A1 | 12/2004 | Ledermann et al. | |
| 2004/0258389 A1 | 12/2004 | Castillo | |
| 2004/0258396 A1 | 12/2004 | Nakamura et al. | |
| 2005/0002638 A1 | 1/2005 | Putterman et al. | |
| 2005/0002639 A1 | 1/2005 | Putterman et al. | |
| 2005/0002640 A1 | 1/2005 | Putterman et al. | |
| 2005/0041954 A1 | 2/2005 | Austin | |
| 2005/0047749 A1 | 3/2005 | Kaibe | |
| 2005/0078938 A1 | 4/2005 | Crohas | |
| 2005/0111819 A1 | 5/2005 | Cormack et al. | |
| 2005/0111838 A1 | 5/2005 | Arishima | |
| 2005/0120373 A1 | 6/2005 | Thomas et al. | |
| 2005/0132418 A1 | 6/2005 | Barton et al. | |
| 2005/0158029 A1 | 7/2005 | Irikuchi et al. | |
| 2005/0259961 A1 | 11/2005 | Sano | |
| 2005/0259962 A1 | 11/2005 | Sano et al. | |
| 2005/0259963 A1 | 11/2005 | Sano et al. | |
| 2005/0265694 A1 | 12/2005 | Green et al. | |
| 2005/0276567 A1 | 12/2005 | Okuyama et al. | |
| 2006/0002682 A1 | 1/2006 | Kanamori | |
| 2006/0045472 A1 | 3/2006 | Poslinski | |
| 2006/0051059 A1 | 3/2006 | Krakirian et al. | |
| 2006/0140584 A1 | 6/2006 | Ellis et al. | |
| 2006/0153523 A1 | 7/2006 | Ishida et al. | |
| 2006/0177197 A1 | 8/2006 | Nakamura et al. | |
| 2006/0188221 A1 | 8/2006 | Lee | |
| 2006/0228096 A1 | 10/2006 | Hoshino et al. | |
| 2006/0239659 A1 | 10/2006 | Chng | |
| 2007/0047919 A1 | 3/2007 | Yoshida et al. | |
| 2007/0077028 A1 | 4/2007 | Bodkin et al. | |
| 2007/0110393 A1 | 5/2007 | Jang | |
| 2007/0154174 A1 | 7/2007 | Sasaki et al. | |

OTHER PUBLICATIONS

Scientific-Atlanta, Inc. Pending U.S. Appl. No. 10/008,624, filed Dec. 6, 2001, Title: "Converting Time-Shift Buffering for Personal Video Recording Into Permanent Recordings," Inventors: Harold J. Plourde, Jr. and Arturo A. Rodriguez.

Scientific-Atlanta, Inc. Pending U.S. Appl. No. 10/010,781, filed Dec. 5, 2001, Title: "Application Management and Interface for Cluster Control of Time Shift Buffer," Inventor: Harold J. Plourde, Jr.

Scientific-Atlanta, Inc. Pending U.S. Appl. No. 10/005,628, filed Dec. 5, 2001, Title: "Disk Driver Cluster Management of Time Shift Buffer with File Allocation Table Structure," Inventor: Harold J. Plourde, Jr.

Scientific-Atlanta, Inc. Pending U.S. Appl. No. 10/008,439, filed Dec. 6, 2001, Title: "Dividing and Managing Time-Shift Buffering Into Program Specific Segments Based on Defined Durations," Inventors: Harold J. Plourde, Jr. and Arturo A. Rodriguez.

Scientific-Atlanta, Inc. Pending U.S. Appl. No. 10/015,349, filed Dec. 11, 2001, Title: "Controlling Personal Video Recording Functions from Interactive Television," Inventors: Mark E. Schutte and Valerie G. Gutknecht.

Scientific-Atlanta, Inc. Pending U.S. Appl. No. 10/102,043, filed Mar. 20, 2002, Title: "Composite Buffering," Inventors: John Eric West and Arturo A. Rodriguez.

Scientific-Atlanta, Inc. Pending U.S. Appl. No. 10/034,028, filed Dec. 20, 2001, Title: "Program Position User Interface for Personal Video Recording Time Shift Buffer," Inventors: Dariusz S. Kaminski and Robert O. Banker.

Scientific-Atlanta, Inc. Pending U.S. Appl. No. 10/143,647, filed May 10, 2002, Title: "Managing Time Shift Buffers," Inventors: Dariusz S. Kaminski, Arturo A. Rodriguez, Robert O. Banker and Valerie G. Gutknecht.

Scientific-Atlanta, Inc. Pending U.S. Appl. No. 09/918,376, filed Jul. 30, 2001, Title: "Digital Subsriber Television Networks with Local Physical Storage Devices and Virtual Storage," Inventors: Arturo A. Rodriguez and Dean F. Jerding.

Motorola-Connected Home Solutions-Digital Video Solutions-DCH3416 Host Set-top; DCH3416 Host Set-top, found at http://broadband.motorola.com/business/digitalvideo/product_dch3416_settop.asp; 2 pages; printed Jul. 13, 2007.

Motorola DVR; entitled "Motorola Dual-Tuner DVR High-Definition Set-top DCT6412", found at http://broadband.motorola.com/dvr/dct6412.asp; 4 pages; printed Jul. 13, 2007.

IPTV Dual Tuner SD-DVR; entitled "Pace Introduces Vegas DVR Product", found at http://www.iptv-industry.com/ar/3o.htm; 3 pages; dated Mar. 20, 2006.

MAVROMATIC; entitled "Pioneer's Dual Tuner HD-DVR", found at http://www.mavromatic.com/archives/000228; 4 pages; printed Jul. 13, 2007.

TiVo.com Buy TiVo; entitled "Choose a price plan", found at http://dynamic.tivo.com/2.0boxdetails.asp?box-series280hrDTDVR; 2 pages; printed Jul. 13, 2007.

Dish Network DVR/PVR Receiver-DVR Receiver (Dual-Tuner), DVR 921 High Definition; DVR Receiver (Dual-Tuner), found at www.afreedish.com/dish-network-dvr-receiver.html; 4 pages; printed Jul. 13, 2007.

* cited by examiner

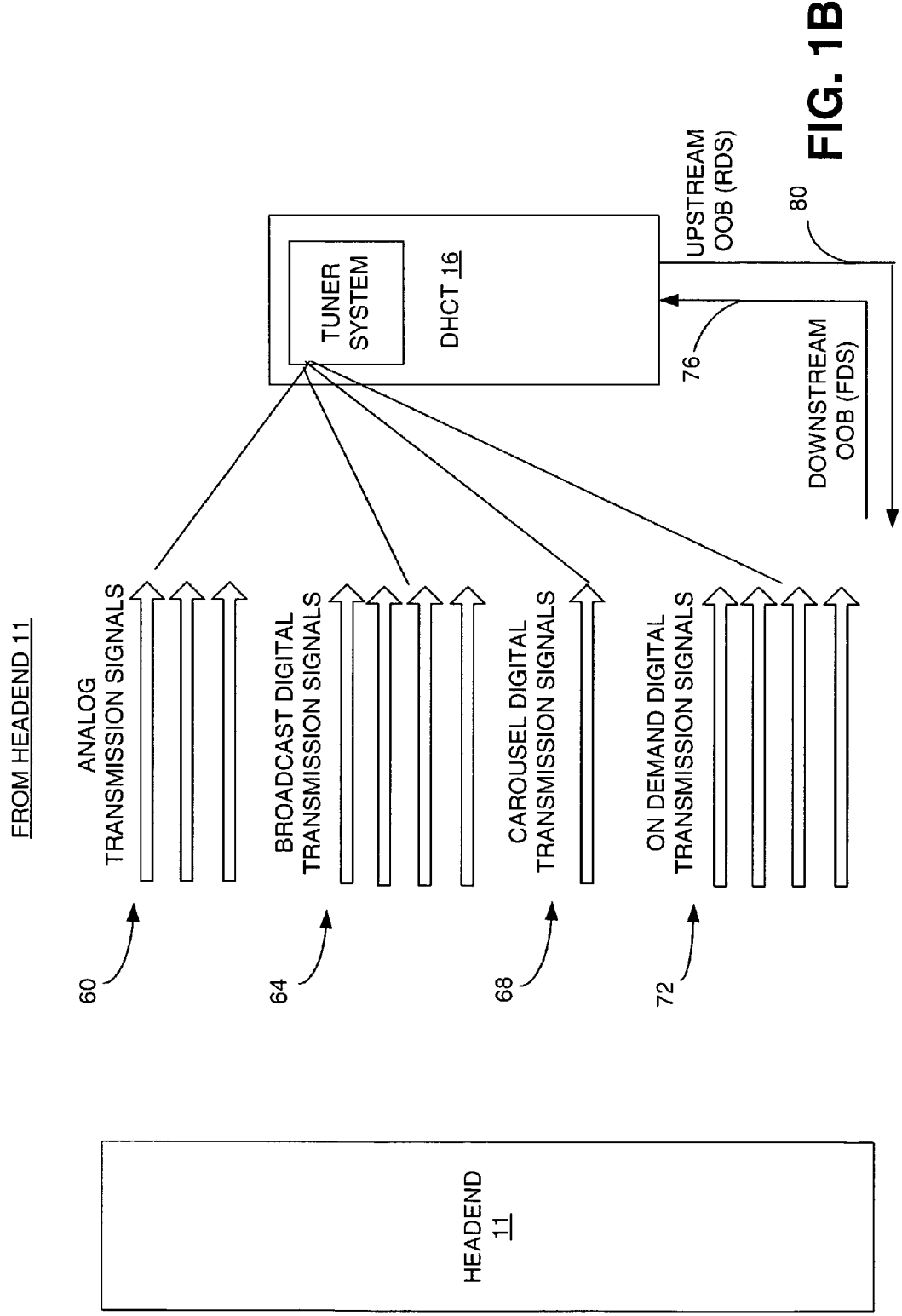

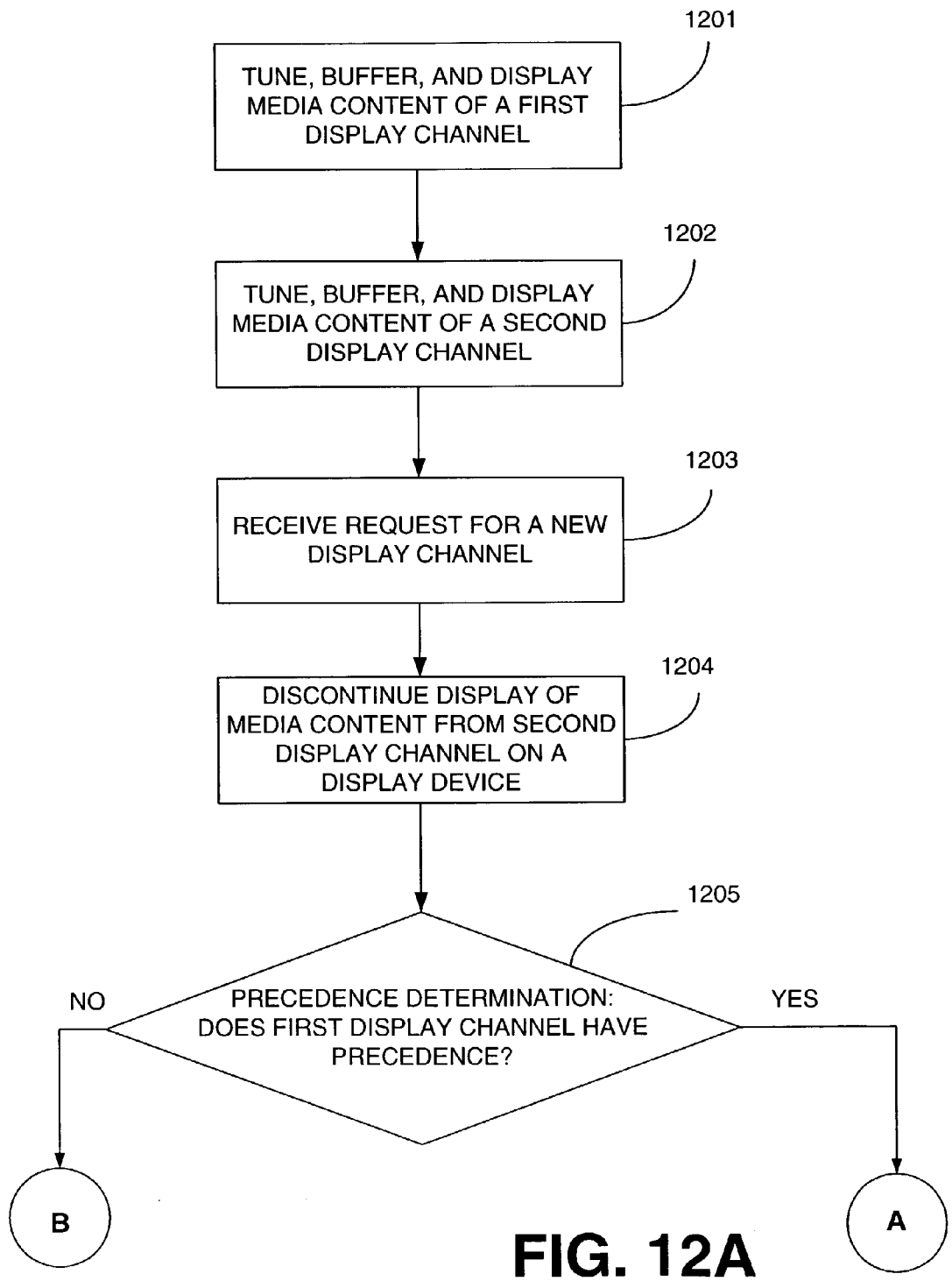

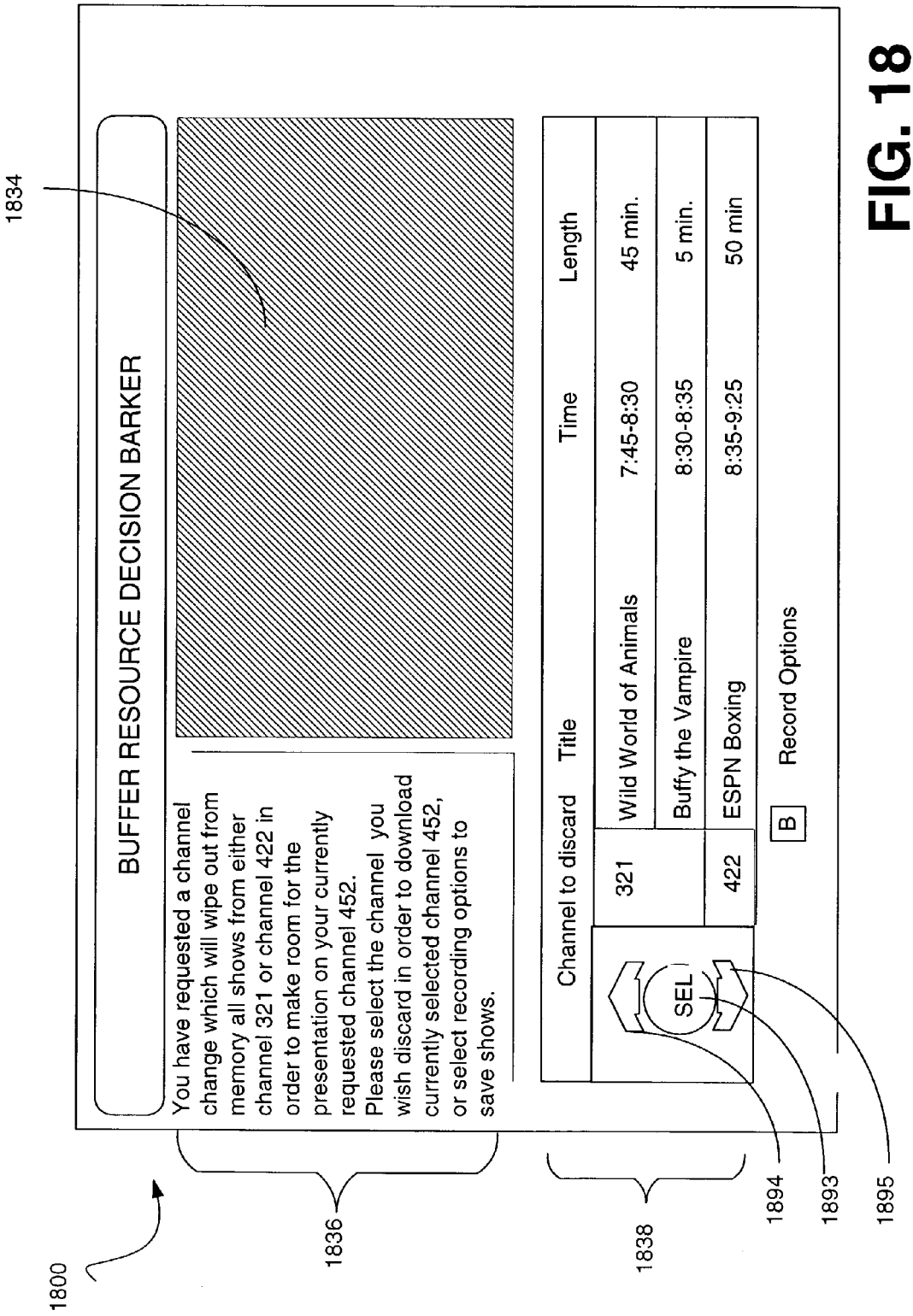

CHANNEL BUFFERING AND DISPLAY MANAGEMENT SYSTEM FOR MULTI-TUNER SET-TOP BOX

CROSS-REFERENCE TO RELATED APPLICATIONS

This application claims priority to copending U.S. provisional application having Ser. No. 60/290,315, filed May 11, 2001, which is entirely incorporated herein by reference.

This application is related to copending U.S. utility patent application entitled, "MANAGING TIME SHIFT BUFFERS", referenced under Scientific-Atlanta, Inc., which includes inventors Dariusz S. Kaminski, Arturo A. Rodriguez, Robert O. Banker, and Valerie G. Gutknecht, filed on even date herewith, which is entirely incorporated herein by reference.

TECHNICAL FIELD

The present invention is generally related to television systems, and, more particularly, is related to personal video recording.

BACKGROUND OF THE INVENTION

With recent advances in digital transmission technology, subscriber television systems are now capable of providing much more than the traditional analog broadcast video. In implementing enhanced programming, the home communication terminal device ("HCT"), otherwise known as the set-top box, has become an important computing device for accessing media content services (and media content within those services) and navigating a user through a maze of available services. In addition to supporting traditional analog broadcast video functionality, digital HCTs (or "DHCTs") now also support an increasing number of two-way digital services such as video-on-demand and personal video recording.

Typically, a DHCT is connected to a cable or satellite, or generally, a subscriber television system, and includes hardware and software necessary to provide the functionality of the digital television system at the user's site. Some of the software executed by a DHCT may be downloaded and/or updated via the subscriber television system. Each DHCT also typically includes a processor, communication components, and memory, and is connected to a television or other display device, such as a personal computer. While many conventional DHCTs are stand-alone devices that are externally connected to a television, a DHCT and/or its functionality may be integrated into a television or personal computer or even an audio device such as a programmable radio, as will be appreciated by those of ordinary skill in the art.

DHCTs are typically capable of providing users with a very large number and variety of media content choices. As the number of available media content choices increases, viewing conflicts arise whereby the user must choose between watching two or more media content instances (e.g., discrete, individual instances of media content such as, for a non-limiting example, a particular television show or "program" episode), all of which the user would like to view. Further, because of the large number of viewing choices, the user may miss viewing opportunities. Buffering of media content instances in memory, or more recently, in storage devices (e.g., hard disk drives, CD-ROM, etc.) coupled to the DHCT, has provided some relief from the conflict in viewing choices while providing personal video recording functionality. However, current buffering mechanisms for personal video recording make inefficient use of tuner and buffer resources for a plurality of display channel changes using buffering mechanisms that operate under single-tuner constraints and/or assumptions. Therefore, there exists a need to exploit multi-tuner functionality to make more efficient use of DHCT resources.

Thus, a heretofore unaddressed need exists in the industry to address the aforementioned deficiencies and inadequacies.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1B is a block diagram of the transmission signals supported by the STS of FIG. 1A, and input into the digital home communication terminal (DHCT) from the headend, in accordance with one embodiment of the invention.

FIGS. 12A-12C are flow diagrams that illustrate an example resource management process for tuning, buffering, and displaying media content from a plurality of display channels for the configurations illustrated in FIGS. 5-11, in accordance with one embodiment of the invention.

FIG. 18 is a screen diagram of an example decision barker screen that enables a user to make decisions between which downloaded display channel media content to displace in order to receive new media content from a new display channel, in accordance with one embodiment of the invention.

DETAILED DESCRIPTION OF THE PREFERRED EMBODIMENTS

The preferred embodiments of the invention now will be described more fully hereinafter with reference to the accompanying drawings, in which preferred embodiments of the invention are shown. One way of understanding the preferred embodiments of the invention includes viewing them within the context of a subscriber television system, and more particularly within the context of a media client device, such as a digital home communication terminal (DHCT). The DHCT provides for user interaction with what is displayed on a television and what is buffered into an associated storage device. Although other communication environments are considered to be within the scope of the preferred embodiments, the preferred embodiments of the invention will be described in the context of a DHCT that receives media content from a headend over a subscriber network as one example implementation among many.

Because the preferred embodiments of the invention can be understood in the context of a subscriber television system environment, an initial description of a subscriber television system is followed with a description of the types of transmission signals that are included in the subscriber television system, in addition to further description of the headend and DHCT (and coupled storage device) that are included within the subscriber television system. The preferred embodiments of the invention include controlling rules for displaying and buffering media content in a multi-tuner, multi-display channel changing environment. Thus, the description that follows the DHCT discussion will help to illustrate what resources are included in tuning, displaying and/or storing media content at the DHCT, and how those resources are managed and allocated to implement a plurality of display channel changes.

Following the discussion on resource allocation and management is a description of input variables, and how the input variables are used in the context of a rule based system of the preferred embodiments to produce a set of consequences and/or outputs to make decisions on what media content to receive and buffer during a plurality of display channel changes.

This description of input variables in the context of a rule-based system is followed by a description of some example implementations that rely on the rule based system to provide for efficient functioning of the personal video recording (PVR) system of the DHCT.

The preferred embodiments of the invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and are provided as an exemplary list among many other examples contemplated but not shown.

Figure 1A:
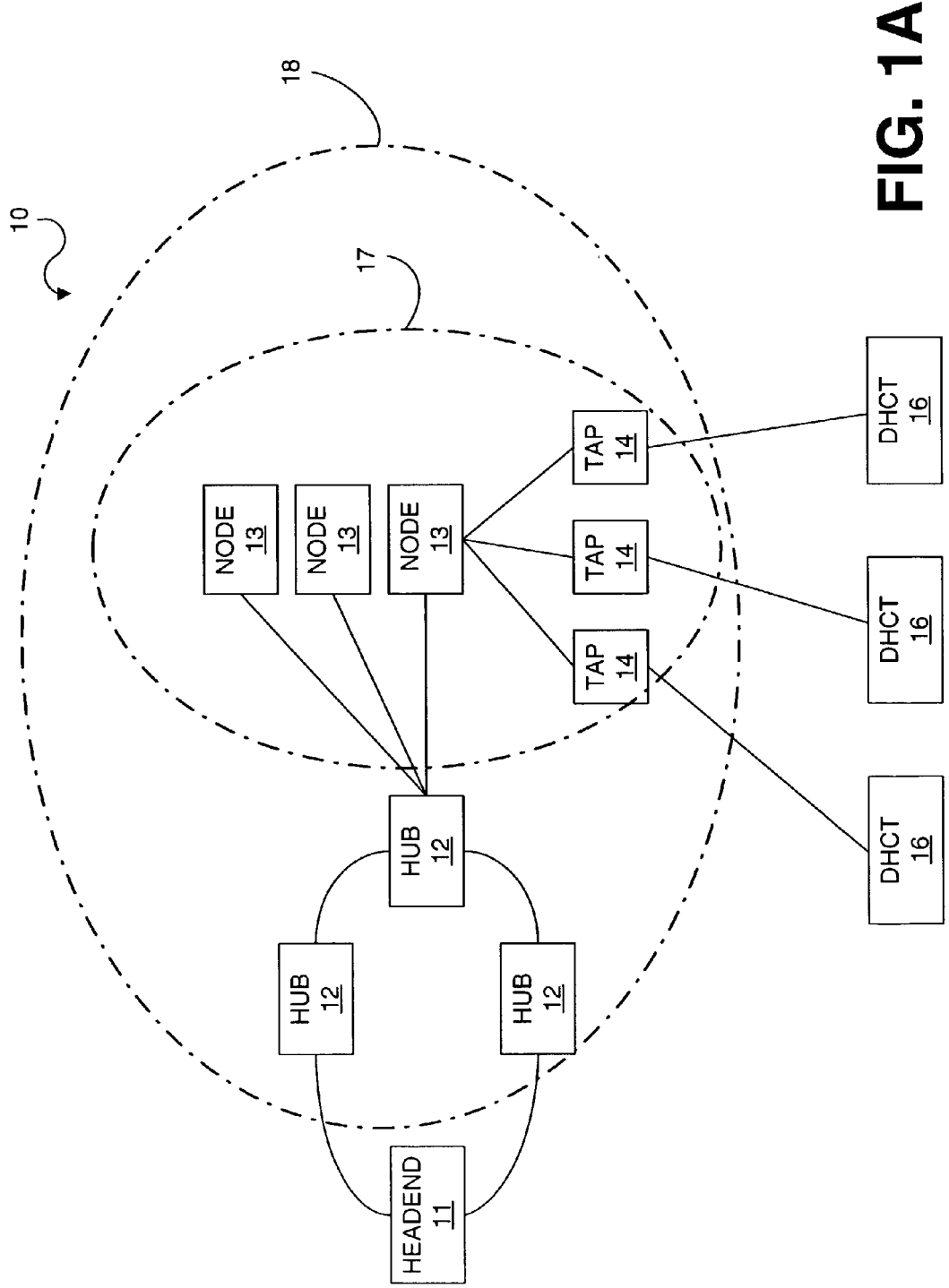
FIG. 1A is a block diagram of an example subscriber television system (STS), in accordance with one embodiment of the invention.

One embodiment of the invention is generally implemented as part of a subscriber television system (STS), which includes digital broadband delivery systems (DBDS) and cable television systems (CTS). As a non-limiting example, a subscriber television system (STS) and its operation will be described initially, with the understanding that other conventional data delivery systems are within the scope of the preferred embodiments of the invention. FIG. 1A shows a block diagram view of an STS 10, which is generally a high quality, reliable and integrated network system that is typically capable of delivering video, audio, voice and data services to digital home communication terminals (DHCTs) 16.

Although FIG. 1A depicts a high level view of an STS 10, it should be appreciated that a plurality of subscriber television systems can tie together a plurality of regional networks into an integrated global network so that DHCT users can receive media content provided from anywhere in the world. Further, it will be appreciated that the STS 10 shown in FIG. 1A is merely illustrative and should not be construed as implying any limitations upon the scope of the preferred embodiments of the invention. For instance, subscriber television systems also included within the scope of the preferred embodiments of the invention include systems not utilizing physical structured cabling for transmission, such as, but not limited to, satellite systems. Further, transmission media included within the scope of the preferred embodiments of the invention include, but are not limited to, Hybrid Fiber/Coax (HFC), optical, satellite, radio frequency (RF), frequency modulated (FM), and microwave. Further, data provided from the headend 11 to the DHCTs 16 and programming necessary to perform the functions discussed below will be understood to be present in the STS 10, in accordance with the description below.

The STS 10 typically delivers broadcast video signals as digitally formatted signals in addition to delivering traditional broadcast analog video signals. Furthermore, the system can typically support one way broadcast services as well as both one-way data services and two-way media content and data services. The two-way operation of the network typically allows for user interactivity with services, such as Pay-Per-View programming, Near Video-On-Demand (NVOD) programming according to any of several known NVOD implementation methods, Video-on-Demand (VOD) programming (according to any of several VOD implementation methods), and interactive applications, such as Internet connections.

The STS 10 also provides the interfaces, network control, transport control, session control, and servers to access media content from media content services, and distributes media content to DHCT users. As shown in FIG. 1A, a typical STS 10 comprises a headend 11, hubs 12, an HFC access network 17, nodes, 13, taps 14, and DHCTs 16. It should be appreciated that although a single component (e.g., a headend) is illustrated in FIG. 1A, an STS 10 can feature a plurality of any one of the illustrated components, can omit components, or may be configured with alternative embodiments for any one of the individual components or with yet other additional components not enumerated above.

Media content provided by one or more content providers (not shown) is communicated by the content providers to one or more headends 11. From those headends 11 the media content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 that is connected to a digital home communication terminal (DHCT) 16. Coaxial cables are typically used to couple nodes 13 and taps 14 because the electrical signals can be easily repeated with RF amplifiers. As the high-level operations of many of the functions of an STS 10 are well known to those of ordinary skill in the art, further high level description of the overall STS 10 of FIG. 1A will not be contained herein.

FIG. 1B is a block diagram illustrating the transmission signals supported by the STS 10 (FIG. 1A), where the transmission signals 60, 64, 68, and 72 are input into a DHCT 16 in accordance with one embodiment of the invention. One or more content providers (not shown) are the source of the information that is included in the transmission signals. Before passing through the network 17 (FIG. 1), transmission signals can be generated at a headend 11 or at a hub 12 (FIG. 1A) that might function as a mini-headend and which therefore possesses some of the headend functionality.

As depicted in FIG. 1B, the STS 10 (FIG. 1A) can simultaneously support a number of transmission signal types, transmission rates, and modulation formats. The ability to carry analog and digital signals over a large bandwidth are characteristics of an HFC network typically employed in an STS, as in the STS 10 of FIG. 1A. As will be appreciated by those of ordinary skill in the art, analog and digital signals in HFC networks can be multiplexed using Frequency Division Multiplexing (FDM), which enables many different types of signals to be transmitted over the STS 10 to the DHCT 16. Typically, an STS 10 using HFC supports downstream (i.e., in the direction from the headend 11 to the DHCT 16) frequencies from 50 mega-hertz (MHz) to 870 MHz, whereas upstream frequencies (i.e., in the direction from the DHCT 16 to higher levels of the system) are in the 5 MHz to 42 MHz band. Generally, the RF bandwidth spacing for analog and digital services is 6 MHz. Furthermore, for a typical 870 MHz system in the United States, a possible downstream RF spectrum subdivision plan uses 6 MHz frequency subdivisions, or spans, within the 50 MHz to 550 MHz band for analog video transmission signals and within the 550 MHz to 870 MHz range for digital transmission signals.

Analog Transmission Signals (ATSs) 60 shown in FIG. 1B are typically broadcast in 6 MHz frequency subdivisions, typically referred to in analog broadcasting as channels, having an analog broadcast signal composed of analog video and analog audio, and include Broadcast TV Systems Committee (BTSC) stereo and Secondary Audio Program (SAP) audio. Referring again to FIG. 1B, the downstream direction transmission signals, having been multiplexed, and in one embodiment using FDM, are often referred to as in-band transmission signals and include the ATSs 60 and Digital Transmission Signals (DTSs) 64, 68, 72 (also known as Digital Transport Signals). These transmission signals carry video, audio, and/or data services. For example, these transmission signals may carry television signals, Internet data, and/or any additional types of data, such as Interactive Program Guide (IPG) data. Additionally, as will be appreciated by those of ordinary skill in the art, additional data can be sent with the analog video image in the Vertical Blanking Interval (VBI) of the video signal and stored in DHCT memory or a DHCT local physical storage device (not shown). It should be appreciated, however, that the amount of data that can be transmitted in the VBI of the analog video signal is typically significantly less than data transmitted in a DTS.

Like the ATSs 60, the DTSs 64, 68, 72 each typically occupies 6 MHz of the RF spectrum. However, the DTSs 64, 68, and 72 are digital transmission signals consisting of 64- or 256-Quadrature Amplitude Modulated (QAM) digital signals formatted preferably using Moving Picture Experts Group (MPEG) standards such as MPEG-2 transport streams, allocated in a separate frequency range. The MPEG-2 transport stream enables transmission of a plurality of DTS types over each 6 MHz RF subdivision, as compared to a 6 MHz ATS. The three types of digital transport signals illustrated in FIG. 1B include broadcast digital transmission signals 64, carousel digital transmission signals 68, and on-demand transmission signals 72.

MPEG-2 transport may be used to multiplex video, audio, and data in each of these Digital Transmission Signals (DTSs). However, because an MPEG-2 transport stream allows for multiplexed video, audio, and data into the same stream, the DTSs do not necessarily have to be allocated in separate 6 MHz RF frequencies, unlike the ATSs 60 in one embodiment. On the other hand, each DTS is capable of carrying multiple broadcast digital media content instances, multiple cycling data carousels containing broadcast data, and data requested on-demand by the subscriber. Data is formatted, such as in Internet Protocol (IP), mapped into MPEG-2 packets, and inserted into the multiplexed MPEG-2 transport stream. Encryption can be applied to the data stream for security so that the data may be received only by authorized DHCTs. The authorized DHCT 16 is provided with the mechanisms to receive, among other things, additional data or enhanced services. Such mechanisms can include "keys" that are required to decrypt encrypted data.

Each 6 MHz RF subdivision assigned to a digital transmission signal can carry the video and audio streams of the media content instances of multiple television (TV) stations, as well as media content and data that is not necessarily related to those TV media content instances, as compared to one TV channel broadcast over one ATS 60 that consumes the entire 6 MHz. The digital data is inserted into MPEG transport streams carried through each 6 MHz frequency subdivision assigned for digital transmission, and then demultiplexed at the subscriber DHCT so that multiple sets of data can be produced within each tuned 6 MHz frequency span, or subdivision.

Although broadcast in nature, the carousel DTSs 68 and on-demand DTSs 72 offer different functionality. Continuing with FIG. 1B, the broadcast DTSs 64 and carousel DTSs 68 typically function as continuous feed for an indefinite time, whereas the on-demand DTSs 72 are continuous feeds sessions for a limited time. In one embodiment, all DTS types are capable of being transmitted at high data rates. The broadcast DTSs 64 preferably carry data comprising multiple digitally-MPEG-2 compressed and formatted TV source signals and other continuously fed data information. The carousel DTSs 68 carry broadcast media content or data that is systematically broadcast in a cycling fashion but updated and revised as needed. Thus, the carousel DTSs 68 serve to carry high volume data such as media content and data and possibly, other data at high data rates.

The carousel DTSs 68 preferably carry data formatted in directories and files by a Broadcast File System (BFS) (not shown), which is used for producing and transmitting data streams throughout the STS 10, and which provides an efficient means for the delivery of application executables and application media content and data to the DHCT, as will be described below. Media content and data received by the DHCT 16 in such manner can then be saved in the DHCT memory and/or transferred to the DHCT storage device for later use. The on-demand DTSs 72, on the other hand, can carry particular information such as compressed video and audio pertaining to subscriber requested media content instance preview and/or media content instance descriptions, as well as other specialized data information.

Preferably, the User-to-Network Download Protocol of the MPEG-2 standard's DSM-CC specification (Digital Storage Media—Command and Control) preferably provides the data carousel protocol used for broadcasting data from a server located at the headend 11, or located elsewhere. It also provides the interactive download protocol for reliable downloading of data from a server (possibly the same server) to an individual DHCT through the on-demand DTSs. Each carousel and on-demand DTS is preferably defined by a DSM-CC session. Therefore, some of the basic functionality reflected in the DHCT 16 when the DHCT does not have a local physical storage device is somewhat similar to a networked computer (i.e., a computer without a persistent storage device), in addition to traditional set top box functionality, as is well known to those of ordinary skill in the art. A DHCT 16 with a storage device reduces data access latency when the data is stored in the local physical storage device ahead of time.

Also shown in FIG. 1B are Out-Of-Band (OOB) signals that provide continuously available two-way signaling to the subscribers' DHCT 16 regardless of which in-band signals are tuned to by the individual DHCT in-band tuners. The OOB signals consist of a Forward Data Signal (FDS) 76 and a Reverse Data Signal (RDS) 80. The OOB signals can comply to any one of a number of well known transport protocols but preferably comply to either a Digital Audio Visual Council (DAVIC) 1.1 Transport Protocol with an FDS of 1.544 mega-bits per second (Mbps) or more using quadrature phase shift keying (QPSK) modulation and an RDS of 1.544 Mbps or more using QPSK modulation, or to a Data Over Cable Service Interface Specification (DOCSIS) Transport Protocol with an FDS of 27 Mbps using 64-QAM modulation and an RDS of 1.544 Mbps or more using QPSK modulation or 16-QAM modulation. The OOB signals provide the two-way operation of the network, which allows for subscriber interactivity with the applications and services provided by the network. Furthermore, the OOB signals are not limited to a 6 MHz spectrum, but generally to a smaller spectrum, such as 1.5 or 3 MHz.

Figure 2:
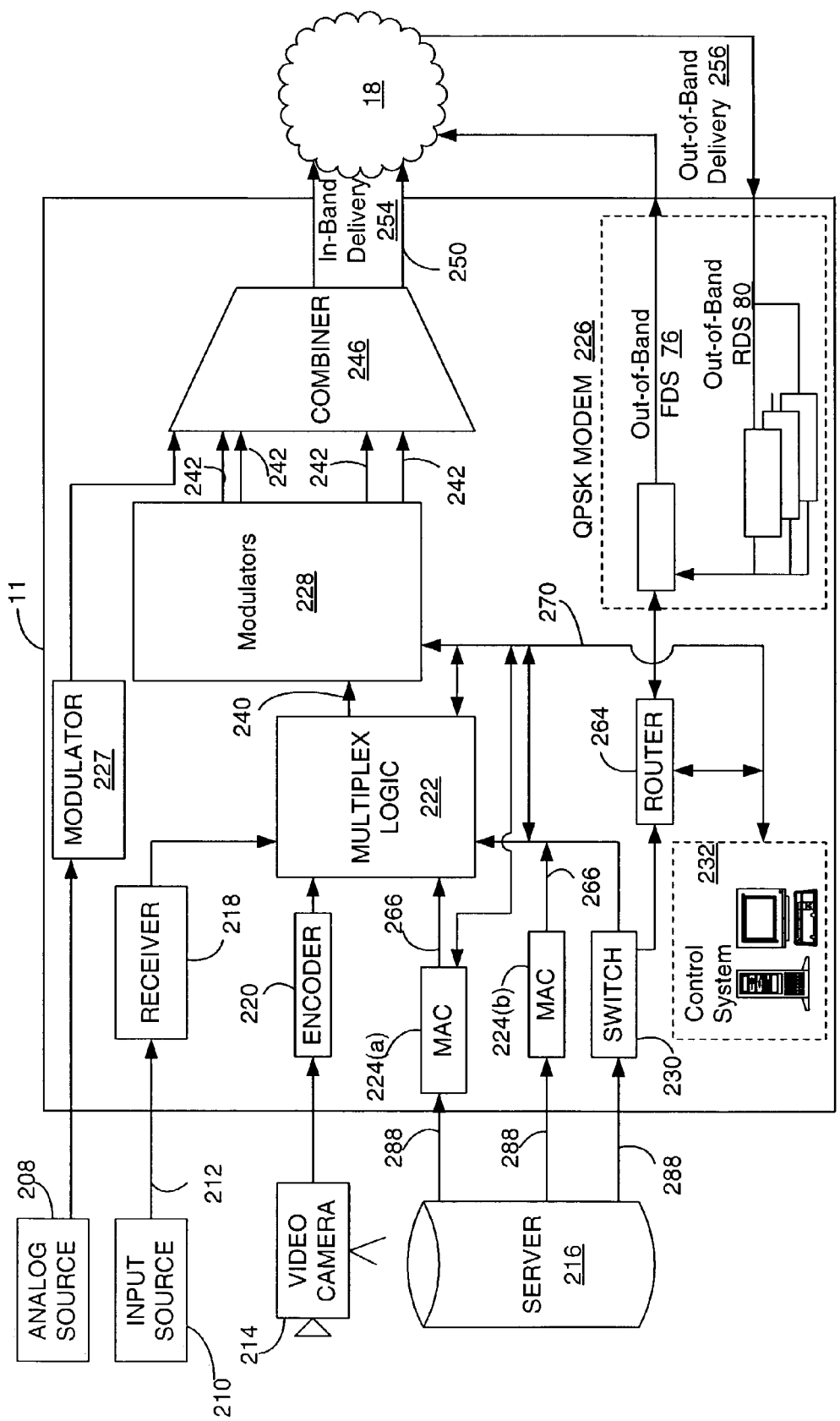
FIG. 2 is a block diagram of an example headend as depicted in FIG. 1A and related equipment, in accordance with one embodiment of the invention.

FIG. 2 is an overview of one example headend 11, which provides the interface between the STS 10 (FIG. 1A) and the service and content providers. The overview of FIG. 2 is equally applicable to one example hub 12 (FIG. 1A), and the same elements and principles may be implemented at the hub 12 instead of the headend 11 as described herein. It will be understood that the headend 11 shown in FIG. 2 is merely illustrative and should not be construed as implying any limitations upon the scope of the preferred embodiments of the invention. The headend 11 receives content from a variety of service and content providers, which can provide input in a variety of ways. The headend 11 combines the content from the various sources and distributes the content to subscribers via the distribution systems of the network 18.

In a typical system, the programming, services and other information from content providers can be distributed according to a variety of mechanisms. The input signals may be transmitted from sources to the headend 11 via a variety of transmission paths, including satellites (not shown), and terrestrial broadcast transmitters and antennas (not shown). The headend 11 can also receive content from a direct feed source 210 via a direct line 212. Other input sources from content providers include a video camera 214, an analog input source 208, or an application server 216. The application server 216 may include more than one line of communication. One or more components such as the analog input source 208, the input source 210, the video camera 214, and the application server 216 can be located external to the headend 11, as shown, or internal to the headend 11 as would be appreciated by one having ordinary skill in the art. The signals provided by the content or programming input sources can include a single media content instance or a multiplex that includes several media content instances.

The headend 11 generally includes one or more receivers 218 that are each associated with a content source. In one implementation, MPEG encoders, such as encoder 220, are included for digitally encoding local programming or a real-time feed from the video camera 214, or the like. In other implementations, an encoder can be located externally to the headend 11. The encoder 220 outputs the respective compressed video and audio streams corresponding to the analog audio/video signal received at its input. For example, the encoder 220 can output formatted MPEG-2 or MPEG-1 packetized elementary (PES) streams or transport streams compliant to the syntax and semantics of the ISO MPEG-2 standard, respectively. The PES or transport streams may be multiplexed with input signals from a switch 230, the receiver 218 and a control system 232. The multiplexing logic 222 processes the input signals and multiplexes at least a portion of the input signals into a transport stream 240. The analog input source 208 can provide an analog audio/video broadcast signal which can be input into a modulator 227. From the modulator 227, a modulated analog output signal can be combined at a combiner 246 along with other modulated signals for transmission into a transmission medium 250. Alternatively, an analog audio/video broadcast signal from the analog input source 208 can be input into the modulator 228. Alternatively, an analog audio/video broadcast signal can be input directly from the modulator 227 to the transmission medium 250. The analog broadcast media content instances are transmitted via respective RF channels, each assigned for transmission of an analog audio/video signal such as National Television Standards Committee (NTSC) video, as described in association with FIG. 1B.

The switch, such as an asynchronous transfer mode (ATM) switch 230, provides an interface to an application server 216. There can be multiple application servers 216 providing a variety of services such as a Pay-Per-View service, including video on demand (VOD), a data service, an Internet service, a network system, or a telephone system. Service and content providers may download content to an application server located within the STS 10. The application server 216 may be located within the headend 11 or elsewhere within the STS 10, such as in a hub 12. The various inputs into the headend 11 are then combined with the other information from the control system 232, which is specific to the STS 10, such as local programming and control information, which can include, among other things, conditional access information.

The headend 11 contains one or more modulators 228 to convert the received transport streams 240 into modulated output signals suitable for transmission over the transmission medium 250 through the network 18. Each modulator 228 may be a multimodulator including a plurality of modulators, such as, but not limited to, QAM modulators, that radio frequency modulate at least a portion of the transport streams 240 to become output transport streams 242. The output signals 242 from the various modulators 228 or multimodulators are combined, using equipment such as the combiner 246, for input into the transmission medium 250, which is sent via the in-band delivery path 254 to subscriber locations (not shown). The in-band delivery path 254 can include DTS 64, 68, 72, and ATS 60, as described with FIG. 1B.

In one embodiment, the server 216 also provides various types of data 288 to the headend 11. The data, in part, is received by media access control functions 224 that output MPEG transport packets containing data 266 instead of digital audio/video MPEG streams. The control system 232 enables the television system operator to control and monitor the functions and performance of the STS 10. The control system 232 interfaces with various components, via communication link 270, in order to monitor and/or control a variety of functions, including the frequency spectrum lineup of the programming for the STS 10, billing for each subscriber, and conditional access for the content distributed to subscribers. Information, such as conditional access information, is communicated from the control system 232 to the multiplexing logic 222 where it is multiplexed into the transport stream 240.

Among other things, the control system 232 provides input to the modulator 228 for setting the operating parameters, such as selecting certain media content instances or portions of transport streams for inclusion in one or more output transport stream 242, system specific MPEG table packet organization, and/or conditional access information. Control information and other data can be communicated to hubs 12 (FIG. 1A) and DHCTs 16 (FIG. 1A) via an in-band delivery path 254 or via an out-of-band delivery path 256.

The out-of-band data is transmitted via the out-of-band FDS 76 of the transmission medium 250 by, but not limited to, a Quadrature Phase-Shift Keying (QPSK) modem array 226. Two-way communication utilizes the RDS 80 of the out-of-band delivery path 256. Hubs 12 (FIG. 1A) and DHCTs 16 (FIG. 1A) transmit out-of-band data through the transmission medium 250, and the out-of-band data is received in the headend 11 via the out-of-band RDS 80. The out-of-band data is routed through router 264 to the application server 216 and/or to the control system 232. The out-of-band control information includes such information as, among others, a pay-per-view purchase instruction and a pause viewing command from the subscriber location to a video-on-demand type application server located internally or external to the headend 11, such as the application server 216, as well as any other data sent from the DHCT 16 or hubs 12, all of which will preferably be properly timed. The control system 232 also monitors, controls, and coordinates all communications in the subscriber television system, including video, audio, and data. The control system 232 can be located at the headend 11 or remotely.

The transmission medium 250 distributes signals from the headend 11 to the other elements in the subscriber television system, such as the hub 12, the node 13, and subscriber locations (FIG. 1A). The transmission medium 250 can incorporate one or more of a variety of media, such as optical fiber, coaxial cable, HFC, satellite, direct broadcast, or other transmission media.

Figure 3A:
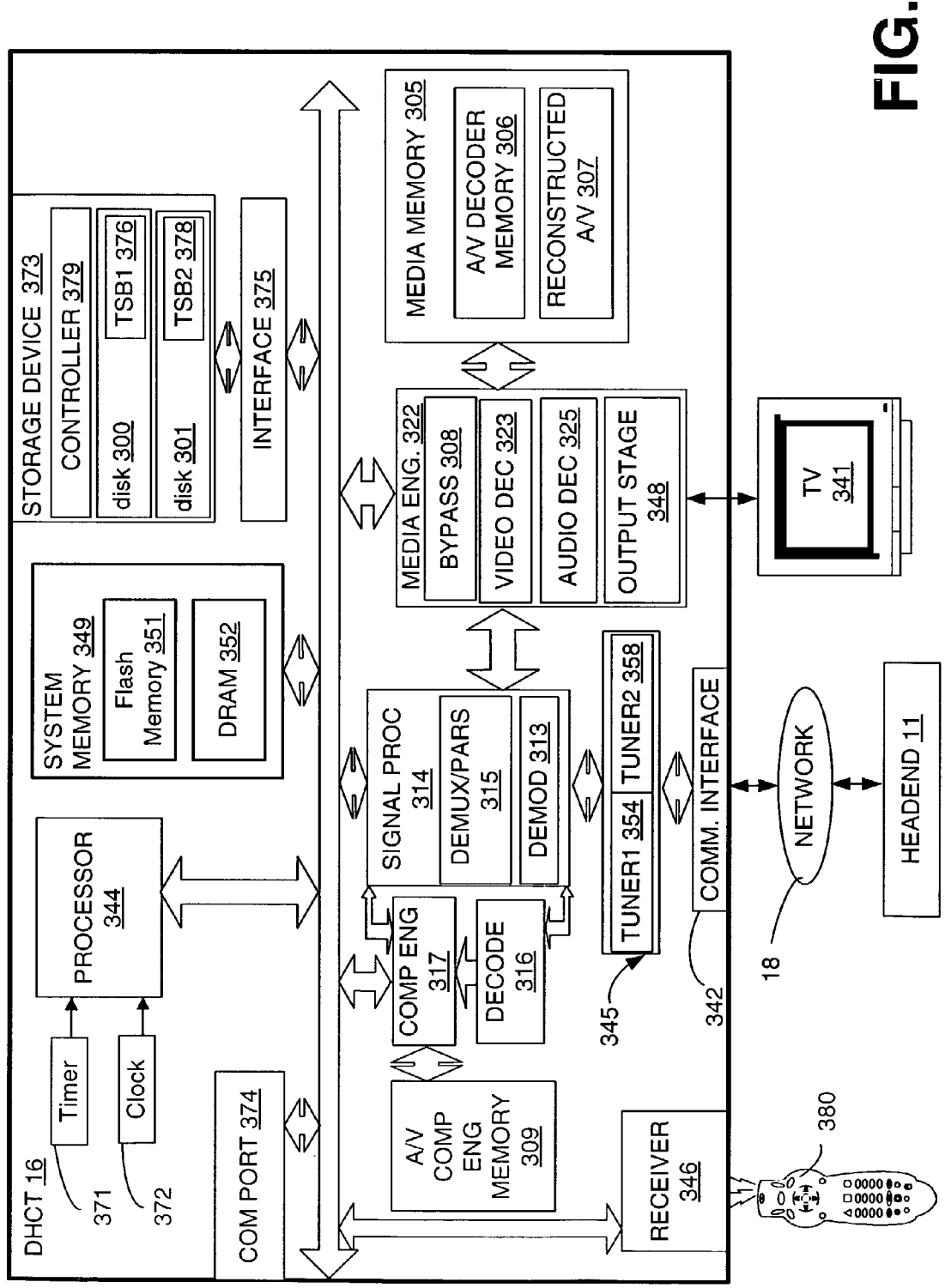
FIG. 3A is a block diagram of an example DHCT as depicted in FIG. 1A and related equipment, in accordance with one embodiment of the invention.

FIG. 3A is a block diagram illustration of an example DHCT 16 that is coupled to the headend 11 and to a television 341, in accordance with one embodiment of the invention. It will be understood that the DHCT 16 shown in FIG. 3A is merely illustrative and should not be construed as implying any limitations upon the scope of the preferred embodiments of the invention. For example, some of the functionality performed by applications executed in the DHCT 16 (such as an MOD application 363 (FIG. 3B)) may instead be performed completely or in part at the headend 11 and vice versa, or not at all in some embodiments. A DHCT 16 is typically situated at the residence or place of business of a user and may be a stand-alone unit or integrated into another device such as, for example, a television set or a personal computer or other display devices or an audio device. The DHCT 16 preferably includes a communications interface 342 for receiving signals (video, audio and/or other data) from the headend 11 through the network 18 and for providing any reverse information to the headend 11 through the network 18.

The DHCT 16 further preferably includes one or more processors, such as processor 344, for controlling operations of the DHCT 16, and a tuner system 345, which preferably comprises two tuners, tuner1 354 and tuner2 358, for tuning into a particular television channel or frequency to display media content and for sending and receiving various types of data or media content to and from the headend 11. The DHCT 16 may include, in other embodiments, more than two tuners for receiving downloaded (or transmitted) media content. The tuner system 345 can select from a plurality of transmission signals (FIG. 1B) provided by the subscriber television system. The tuner system 345 enables the DHCT 16 to tune to downstream media and data transmissions, thereby allowing a user to receive digital and/or analog media content delivered in the downstream transmission via the subscriber television system. The tuner system 345 includes, in one implementation, an out-of-band tuner for bi-directional QPSK data communication and two QAM tuners (in band) (tuner1 354 and tuner2 358) for receiving television signals. The tuners 354 and 358 of tuner system 345 can be used to simultaneously receive a plurality of signals at different carrier frequencies, and/or at different program identification (PID) locations to receive different services (e.g., receiving HBO and CNN on one carrier frequency, but different PID locations) in an MPEG formatted signal. Additionally, a receiver 346 receives externally generated information, such as user inputs or commands from an input device, such as a remote control device 380, or other devices.

According to another embodiment of the invention, a telephone modem (not shown) in the DHCT 16 can be utilized for upstream data transmission and the headend 11, the hub 12 (FIG. 1A), or other components located upstream in the STS 10 (FIG. 1A) can receive data from a telephone network corresponding with the telephone modem and can route the upstream data to a destination internal or external to the STS 10, such as an application data server in the headend 11 or content provider.

The DHCT 16 includes a signal processing system 314, which comprises demodulating system 313 and transport demultiplexing and parsing system 315 (herein demultiplexing system) to process broadcast media content and/or data. One or more of the systems of the signal processing system 314 can be implemented with software, a combination of software and hardware, or preferably in hardware. The demodulating system 313 comprises functionality for RF signal demodulation, either an analog transmission signal or a digital transmission signal. For instance, the demodulating system 313 can demodulate a digital transmission signal in a carrier frequency that was modulated, among others, as a QAM-modulated signal.

When tuned to a carrier frequency corresponding to an analog TV signal transmission, the demultiplexing system 315 is bypassed and the demodulated analog TV signal that is output by the demodulating system 313 is instead routed to an analog video decoder 316. The analog video decoder 316 converts the analog video signal (i.e., the video portion of a media content instance that comprises a video portion and an audio portion, such as NTSC video) received at its input into a respective non-compressed digital representation comprising a sequence of digitized pictures and their respective digitized audio. In one implementation, the video consists of a sequence of fields spaced apart at approximately one-sixtieth of a second. A pair of consecutive fields constitutes a picture. The odd field contains the odd-numbered lines of the picture and the even field contains the even-numbered lines of the picture. The analog video decoder 316 outputs the corresponding sequence of digitized pictures and respective digitized audio. Each picture is a two dimensional entity of picture elements and each picture element contains a respective set of values. A picture element value comprises luminance and chrominance information that are representative of brightness and color information at the spatial location of the picture element within the picture.

Digitized pictures and respective audio output by the analog video decoder 316 are presented at the input of a compression engine 317. Digitized pictures and respective audio output by the analog video decoder 316 can also be presented to a bypass 308, which acts through an interface (not shown) such as ITU-656 (International Telecommunications Union or ITU), and is dedicated for non-compressed digitized analog video and audio, for display on the TV 341. The compression engine 317 is coupled to memory 349 and additionally to a local dedicated memory 309 that is preferably DRAM, for input and processing of the input digitized pictures and the respective digitized audio. Alternatively, the compression engine 317 can have its own integrated memory (not shown). The compression engine 317 processes the sequence of digitized pictures and digitized audio and converts them into a video compressed stream and an audio compressed stream, respectively. The compressed audio and video streams are produced in accordance with the syntax and semantics of a designated audio and video coding method, such as specified by the MPEG-2 audio and MPEG-2 video ISO (International Organization for Standardization or ISO) standard, so that they can be interpreted by a video decoder 323 (also known as a video decompression engine) and an audio decoder 325 (also known as an audio decompression engine) for decompression and reconstruction at a future time. Each compressed stream includes a sequence of data packets containing a header and a payload. Each header includes a unique program identification, or PID, associated with the respective compressed stream.

The compression engine 317 multiplexes the audio and video compressed streams into a transport stream, such as an MPEG-2 transport stream, for output. Furthermore, the compression engine 317 can compress audio and video corresponding to more than one media content instance in parallel (e.g., from two tuned analog TV signals when the DHCT 16 possesses multiple tuners) and to multiplex the respective audio and video compressed streams into a single transport stream. The output of compressed streams and/or transport streams produced by the compression engine 317 is preferably input to the signal processing system 314. Parsing capabilities within the signal processing system 314 allow for interpretation of sequence and picture headers, for instance, annotating their locations within their respective compressed stream for future retrieval from a storage device 373. A compressed analog media content instance (e.g., TV program episode or show) corresponding to a tuned analog transmission channel can be output as a transport stream by the signal processing system 314 and presented as input for storage in the storage device 373 via an interface 375 as will be described below. The packetized compressed streams can be also output by the signal processing system 314 and presented as input to the media engine 322 for decompression by the video decompression engine 323 and the audio decompression engine 325 for its display on the TV 341, as will be described below.

The demultiplexing system 315 can include MPEG-2 transport demultiplexing. When tuned to carrier frequencies carrying a digital transmission signal, the demultiplexing system 315 enables the separation of packets of data, corresponding to the compressed streams of information belonging to the desired media content instances, for further processing. Concurrently, the demultiplexing system 315 precludes packets in the multiplexed transport stream that are irrelevant or not desired, such as packets of data corresponding to compressed streams of media content instances of other media content signal sources (e.g., other TV channels), from further processing.

The parsing capabilities of the demultiplexing system 315 includes reading and interpreting the received transport stream without disturbing its content, such as to interpret sequence and picture headers, for instance, to annotate their locations and corresponding time offset within their respective compressed stream for future retrieval from the storage device 373. Thus, the components of the signal processing system 314 are capable of QAM demodulation, forward error correction, and demultiplexing MPEG-2 transport streams, and parsing elementary streams and packetized elementary streams, among other functions. A compressed media content instance corresponding to a tuned carrier frequency carrying a digital transmission signal can be output as a transport stream by the signal processing system 314 and presented as input for storage in the storage device 373 via the interface 375 as will be described below. The packetized compressed streams can be also output by the signal processing system 314 and presented as input to the media engine 322 for decompression by the video decompression engine 323 and the audio decompression engine 325, and output to an output stage 348, as will be described below.

One having ordinary skill in the art will appreciate that the signal processing system 314 will preferably include other components not shown, including memory, decryptors, samplers, digitizers (e.g., analog-to-digital converters), and multiplexers. Further, other embodiments will be understood, by those having ordinary skill in the art, to be within the scope of the preferred embodiments of the present invention, including analog signals (e.g., NTSC) that bypass one or more elements of the signal processing system 314 and are forwarded directly to the output stage 348. Further, outputs presented at corresponding next-stage inputs for the aforementioned signal processing flow may be connected via accessible memory 349 in which the outputting device stores the output data and the inputting device thereafter inputs the output data written to memory 349 by the respective outputting device. Outputting and inputting devices include the analog video decoder 316, the compression engine 317, the media engine 322, the signal processing system 314, and components or subcomponents thereof. Further, it will be understood by those having ordinary skill in the art that components of the signal processing system 314 can be spatially located in different areas of the DHCT 16. Further, it will be understood by those having ordinary skill in the art that, although the components of the signal processing system 314 are illustrated as being in communication with an incoming signal from the communications interface 342, the signal may not necessarily be in the order shown for all signals.

The DHCT 16 also includes the media engine 322, which includes the digital video decoder 323 (or video decompression engine), the digital audio decoder 325 (or audio decompression engine), the output stage 348, and the bypass 308, and other digital signal processing components not shown, as would be appreciated by those having ordinary skill in the art. For example, the demultiplexing system 315 is in communication with the tuner system 345 and processor 344 to effect reception of digital compressed video streams, digital compressed audio streams, and data streams corresponding to one or more media content instances to be separated from other media content instances and/or streams transported in the tuned transmission channel and to be stored in a first part (not shown) of DRAM 352 of DHCT 16 assigned to receive packets of one or more media content instances. Other dedicated memory may also be used for media content instance packets.

Furthermore, while conducting this process, the demultiplexing system 315 demultiplexes and separates desired compressed streams from the received transport stream without disturbing its content. Further, the demultiplexing system 315 parses (i.e., reads and interprets) compressed streams such as to interpret sequence headers and picture headers, and deposits a transport stream carrying compressed streams of a media content instance into DRAM 352. The processor 344 causes the transport stream in DRAM 352 to be transferred to the storage device 373 via the interface 375. Under program control by the processor 344, the demultiplexing system 315, in communication with the digital video decoder 323, the storage device 373, and the processor 344, effects notification and/or transfer of received packets of one or more compressed streams corresponding to one or more media content instances from a first part of DRAM 352 to a second part (not shown) of DRAM 352 assigned to the digital video decoder 323 and the digital audio decoder 325. In other embodiments, the media engine 322 can have access to a dedicated localized DRAM, such as A/V decoder memory 306 to facilitate such transfers. Upon demultiplexing and parsing the transport stream carrying one or more media content instances, and in communication with the processor 344, the signal processing system 314 outputs to DRAM 352 ancillary data in the form of a table or data structure (not shown) comprising the relative or absolute location of the beginning of certain pictures in the compressed media content instance for convenience in retrieval during future operations.

In another embodiment, according to a plurality of tuners, and respective number of demodulating systems 313, demultiplexing systems 315, and signal processing systems 314, a respective number of broadcast digital media content instances are received and routed to the hard disk 300 of the storage device 373 simultaneously while performing the necessary data annotations for each of the respective compressed media streams for their future retrieval from storage device 373. Alternatively, a single demodulating system 313, a single demultiplexing system 315, and a single signal processing system 314, each with sufficient processing capabilities can serve to process more than one digital media content instance. One or more of the received broadcast digital media content instances routed to the storage device 373 can be routed simultaneously to the media engine 322 for decoding and display to the TV 341.

In another embodiment according to the aforementioned description, a first tuner, for example tuner1 354 of tuning system 345 receives an analog video signal corresponding to a first media content instance and a second tuner, for example tuner2 358 receives a digital compressed stream corresponding to a second media content instance. The first media content instance is processed as an analog signal and the second media content instance is processed as a digital compressed stream as described above. The compressed digital version of the analog video signal or the second media instance, or both, can be routed to the storage device 373 while simultaneously performing the respective data annotations required for future retrieval. Additionally, either or both of the media instances can be routed simultaneously to the media engine 322 for decoding and display on the TV 341.

In one implementation, the compression engine 317 can output formatted MPEG-2 or MPEG-1 packetized elementary streams (PES) inside a transport stream, all compliant to the syntax and semantics of the ISO MPEG-2 standard. Alternatively, the compression engine 317 can output other digital formats that are compliant to other standards. The digital compressed streams output by the compression engine 317 corresponding to a media content instance are preferably deposited in local memory 309 for the compression engine 317 and routed to the demultiplexing system 315. The demultiplexing system 315 parses (i.e., reads and interprets) the transport stream generated by the compression engine 317 without disturbing its content, such as to interpret picture headers, and deposits the transport stream into DRAM 352. The processor 344 causes the transport stream in DRAM 352 to be transferred to the storage device 373. While parsing the transport stream, the demultiplexing system 315 outputs to DRAM 352 ancillary data in the form of a table or data structure (not shown) comprising the relative or absolute location of the beginning of certain pictures in the compressed media content stream for the media content instance for convenience in retrieval during future operations. In this way, random access operations such as fast forward, rewind, and jumping to a location in the compressed media content instance can be attained.

In another embodiment, according to a plurality of tuners, respective number of analog video decoders 316, and respective number of compression engines 317, the aforementioned compression of analog video and audio is performed and routed to the hard disk 300 of the storage device 373 simultaneously on a respective number of analog media content instances. Alternatively, a single compression engine with sufficient processing capabilities can serve to compress more than one analog media content instance.

The media engine 322 also includes the output stage 348. In one implementation, the output stage 348 can include a digital encoder (DENC) (not shown) for driving the TV display. In parallel to feeding a DENC, the output stage 348 can also route the video/audio signal for output in multiple formats. Such formats can include analog component YPbPr, which can be used in High Definition Television (HDTV), some standard televisions, and digital video disk (DVD) players. Another format can be RGB component for personal computer displays. Another format can include a digital version of an analog component, which is used with fiber optic cable connections. The DENC output can feed digital analog converters (DAC—not shown) for output as composite video (CVBS), also known as baseband (e.g., V-output connection in a VCR or DVD player). In other implementations, the luma and chroma signals can be kept separate to output "separate video" through DACs (e.g., S-video connection in a VCR or DVD player). The DENC output of the output stage 348 can also feed an RF channel 3 and 4 modulator (not shown) that feeds a DAC. In another implementation, the output stage 348 outputs in parallel through an ITU-656 output port, either for internal routing of the video or to drive an external DENC (e.g., for VCR recording). In other embodiments, the DENC can be external to the output stage 348. In other embodiments, a DENC internal to the output stage 348 can be used to drive an external DENC (not shown), and the external DENC can be used to drive a Channel 3 and/or 4 RF modulator.

The DHCT 16 also includes a media memory 305. These components can include software and/or hardware to compose and store graphical information created by the processor 344. These components enable the compositing of graphical data with video into a picture for a TV display as provided by capabilities in the media engine 322.

In one implementation, compressed video and audio streams received through an in-band tuner of the tuner system 345 or read from the local storage device 373 is deposited continuously into a compressed audio and video section 306 of the media memory 305. Thereafter, one or more video decompression engines 323 within the media engine 322 decompress compressed MPEG-2 Main Profile/Main Level video streams read into the video decompression engine 323 from the compressed video buffer 306 of the media memory 305. Each picture decompressed by the video decompression engine 323 is written to a reconstruction portion 307 of the media memory 305, where the reconstructed pictures are retained.

Alternatively, the pictures may be decompressed in the video decompression engine 323, then scaled down as they are being reconstructed in a procedural fashion by feeding data of the reconstructed pictures in raster-scan order from the video decompression engine 323 to a video scaling unit (not shown). According to this alternative, the scaled down reconstructed picture can be stored in one of multiple scaled video picture buffers (not shown) in media memory 305 in raster-scan order as they are reconstructed, such that a respective scaled video picture buffer is dedicated to the motion video picture of a program or video object (read from the local storage device 373) and included in the displayed presentation.

Additionally, one or more digital audio decompression engines 325 in the media engine 322 can decode the compressed digital audio streams associated with the compressed digital video or read as an audio object from the local storage device 373 in a similar fashion, allocating respective buffers as necessary. It should be appreciated that in some implementations only one audio buffer may be required. Note that, in some embodiments, system memory 349 and media memory 305 can be unified as one physical memory device. It should be appreciated that the media memory 305 is a memory of finite number of bytes, and it serves as a repository for different data components. Compressed MPEG-2 video streams are deposited in A/V decoder memory 306 allocated for compressed video and compressed audio, as described above. Decompressed audio is fed into an audio port (not shown) for playback. Further information on the media memory and subcomponents thereof, in addition to other DHCT components can be found in the patent application entitled, DIGITAL SUBSCRIBER TELEVISION NETWORKS WITH LOCAL PHYSICAL STORAGE DEVICES AND VIRTUAL STORAGE, filed on Jul. 30, 2001, assigned a Ser. No. 09/918,376, assigned to Scientific Atlanta, Inc., and herein incorporated by reference.

Figure 3B:
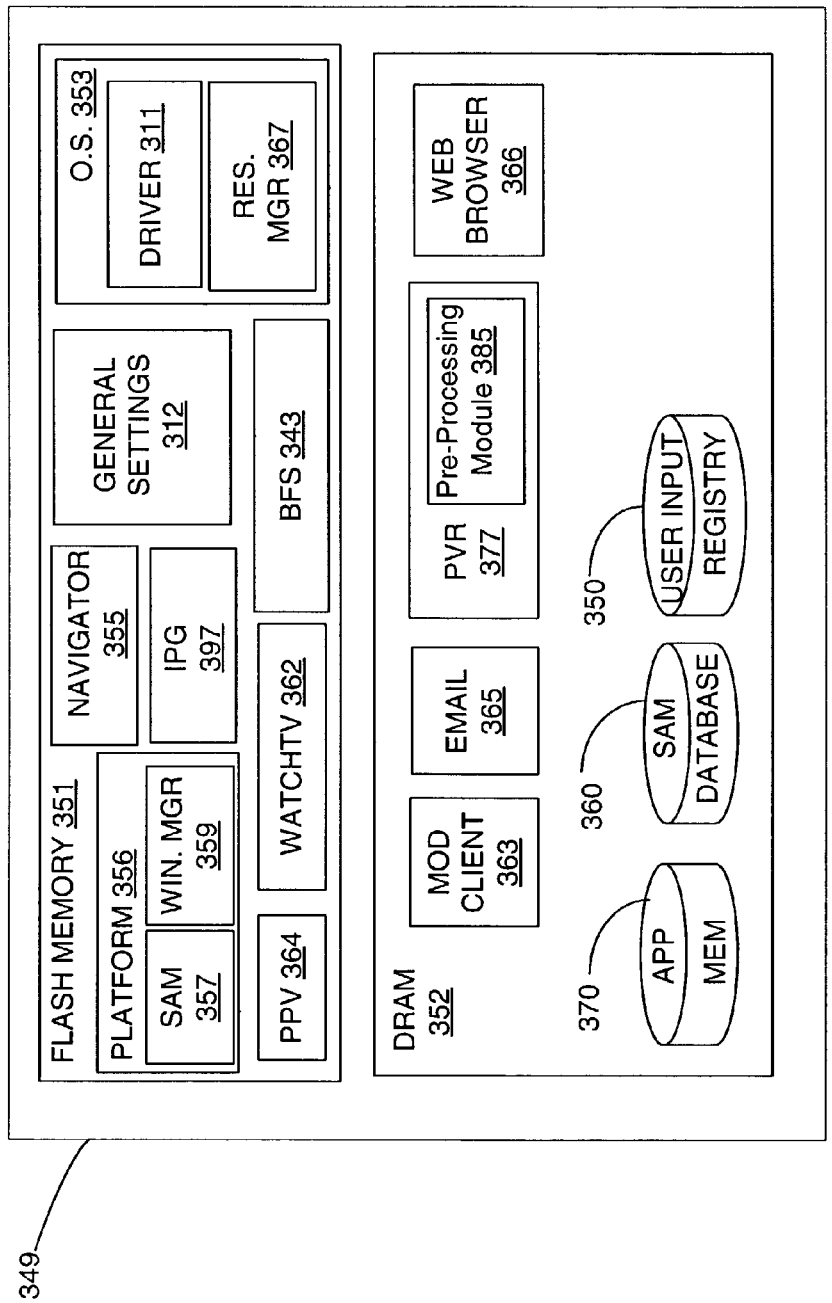
FIG. 3B is a block diagram of example memory for the example DHCT depicted in FIG. 3A, in accordance with one embodiment of the invention.

One or more programmed software applications, herein referred to as applications, are executed by utilizing the computing resources in the DHCT 16. Note that an application typically includes a client part and a server counterpart that cooperate to provide the complete functionality of the application. FIG. 3B is a block diagram of an example system memory 349. The applications may be resident in FLASH memory 351 or downloaded (or uploaded) into DRAM 352. Applications stored in FLASH memory 351 or DRAM 352 are executed by the processor 344 (e.g., a central processing unit or digital signal processor) under the auspices of the operating system 353. Data required as input by an application is stored in DRAM 352 or FLASH memory 351 and read by the processor 344 as need be during the course of application execution. Input data may be data stored in DRAM 352 by a secondary application or other source, either internal or external to the DHCT 16, or possibly anticipated by the application and thus created with the application at the time it was generated as a software application, in which case it is stored in FLASH memory 351. Data generated by an application is stored in DRAM 352 by the processor 344 during the course of application execution. DRAM 352 also includes application memory 370 that various applications may use for storing and/or retrieving data.

An application referred to as a navigator 355 is also resident in FLASH memory 351 for providing a navigation framework for services provided by the DHCT 16. The navigator 355 registers for and in some cases reserves certain user inputs related to navigational keys such as channel increment/decrement, last channel, favorite channel, etc. The navigator 355 also provides users with television related menu options that correspond to DHCT functions such as, for example, blocking a display channel or a group of display channels from being displayed in a display channel menu presented on a screen display.

The FLASH memory 351 also contains a platform library 356. The platform library 356 is a collection of utilities useful to applications, such as a timer manager, a compression manager, a configuration manager, a hyper text markup language (HTML) parser, a database manager, a widget toolkit, a string manager, and other utilities (not shown). These utilities are accessed by applications via application programming interfaces (APIs) as necessary so that each application does not have to contain these utilities. Two components of the platform library 356 that are shown in FIG. 3B are a window manager 359 and a service application manager (SAM) client 357.

The window manager 359 provides a mechanism for implementing the sharing of the screen regions and user input. The window manager 359 on the DHCT 16 is responsible for, as directed by one or more applications, implementing the creation, display, and deallocation of the limited DHCT 16 screen resources. It allows multiple applications to share the screen by assigning ownership of screen regions, or windows. The window manager 359 also maintains, among other things, a user input registry 350 in DRAM 352 so that when a user enters a key or a command via the remote control device 380 or another input device such as a keyboard or mouse, the user input registry 350 is accessed to determine which of various applications running on the DHCT 16 should receive data corresponding to the input key and in which order. As an application is executed, it registers a request to receive certain user input keys or commands. When the user presses a key corresponding to one of the commands on the remote control device 380, the command is received by the receiver 346 and relayed to the processor 344. The processor 344 dispatches the event to the operating system 353 where it is forwarded to the window manager 359 which ultimately accesses the user input registry 350 and routes data corresponding to the incoming command to the appropriate application.

The SAM client 357 is a client component of a client-server pair of components, with the server component (not shown) being located on the headend 11, preferably in the control system 232 (FIG. 2). A SAM database 360 (i.e., structured data such as a database or data structure) in DRAM 352 includes a data structure of services and a data structure of channels that are created and updated by the headend 11. Herein, database will refer to a database, structured data or other data structures as is well known to those of ordinary skill in the art. Many services can be defined using the same application component, with different parameters. Examples of services include, without limitation and in accordance with one implementation, presenting television instances (available through a WatchTV application 362), pay-per-view events (available through a PPV application 364), digital music (not shown), media-on-demand (available through an MOD application 363), and an interactive program guide (IPG) 397. In general, the identification of a service includes the identification of an executable application that provides the service along with a set of application-dependent parameters that indicate to the application the service to be provided. As an example, a service of presenting a television instance (media content instance) could be executed by the WatchTV application 362 with a set of parameters specifying HBO to view HBO or with a separate set of parameters to view CNN. Each association of the application component (tune video) and one parameter component (HBO or CNN)

represents a particular service that has a unique service I.D. The SAM client 357 also interfaces with the resource manager 367 to control resources of the DHCT 16.

Applications can also be downloaded into DRAM 352 at the request of the SAM client 357, typically in response to a request by the user or in response to a message from the headend 11. In the example DHCT memory illustrated in FIG. 3B, DRAM 352 includes a media-on-demand application (MOD) 363, an e-mail application 365, a PVR application 377, and a web browser application 366. It should be clear to one with ordinary skill in the art that these applications are not limiting and merely serve as examples for embodiments of the invention. Furthermore, one or more DRAM based applications may be resident, as an alternative embodiment, in FLASH memory 351. These applications, and others provided by the subscriber television system operator, are top-level software entities on the network for providing services to the user.

In one implementation, applications executing on the DHCT 16 work with the navigator 355 by abiding by several guidelines. First, an application utilizes the SAM client 357 for the provision, activation, and suspension of services. Second, an application shares DHCT 16 resources with other applications and abides by the resource management policies of the SAM client 357, the operating system 353, and the DHCT 16. Third, an application handles situations where resources are only available with navigator 355 intervention. Fourth, when an application loses service authorization while providing a service, the application suspends the service via the SAM (the navigator 355 will reactivate an individual service application when it later becomes authorized). Finally, an application is designed to not have access to certain user input keys reserved by the navigator 355 (i.e., power, channel +/−, volume +/−, etc.).

The MOD application 363 provides the user with lists of available media content titles for each media content instance to choose from and with media content instances requested by the user. The MOD application 363 provides media content to the user by engaging, typically, in a direct two-way IP (Internet Protocol) connection with VOD content servers (not shown) that would be located, in one embodiment, in the headend 11.

An executable program or algorithm corresponding to an operating system (OS) component, or to a client platform component, or to an application, or to respective parts thereof, can reside in and execute out of DRAM 352 and/or FLASH memory 351. Likewise, data input into or output from any executable program can reside in DRAM 352 or FLASH memory 351. Furthermore, an executable program or algorithm corresponding to an operating system component, or to a client platform component, or to an application, or to respective parts thereof, can reside in FLASH memory 351, or in a local storage device (such as the storage device 373) externally connected to or integrated into the DHCT 16 and be transferred into DRAM 352 for execution. Likewise, data input for an executable program can reside in FLASH memory 351 or a storage device and be transferred into DRAM 352 for use by an executable program or algorithm. In addition, data output by an executable program can be written into DRAM 352 by an executable program or algorithm and be transferred into FLASH memory 351 or into a storage device. In other embodiments, the executable code is not transferred, but instead, functionality is effected by other mechanisms.

Referring again to FIG. 3A, the DHCT 16 may also include one or more wireless or wired interfaces, also called communication ports 374, for receiving and/or transmitting data to other devices. For instance, the DHCT 16 may feature USB (Universal Serial Bus), Ethernet (for connection to a computer), IEEE-1394 (for connection to media content devices in an entertainment center), serial, and/or parallel ports. The user inputs may be, for example, provided by an input device including a computer or transmitter with buttons or keys located either on the exterior of the terminal or by a hand-held remote control device 380 or keyboard that includes user-actuated buttons, or even aural input (e.g., voice activated).

The DHCT 16 includes at least one storage device 373 to provide storage for downloaded media content. The storage device 373 can be an optical storage device or a magnetic storage device, and is preferably a hard disk drive. The storage device 373 comprises storage for media content and/or data that can be written to for storage and later read from for retrieval for presentation. The storage device 373 preferably includes two hard disks 300 and 301, with each including a corresponding buffer space TSB1 376 and TSB2 378, as will be explained further below. Alternatively, the DHCT 16 can be coupled to two storage devices, each with one hard disk. Alternatively, a storage device can be used that uses different buffer spaces on one hard disk, or the storage device can include more than two hard disks, or platters. Throughout this disclosure, references relating to writing to or reading from the storage device 373, or references regarding recordings from or to the storage device 373 will be understood to mean that such read or write operations are occurring to the actual medium (for example, the hard disk 300 and/or 301) of the storage device 373. The storage device 373 is also comprised of a controller 379 that receives operating instructions from a device driver 311 of the operating system 353 (as described below) and implements those instructions to cause read and/or write operations to the hard disks 300 and/or 301.

Figure 3C:
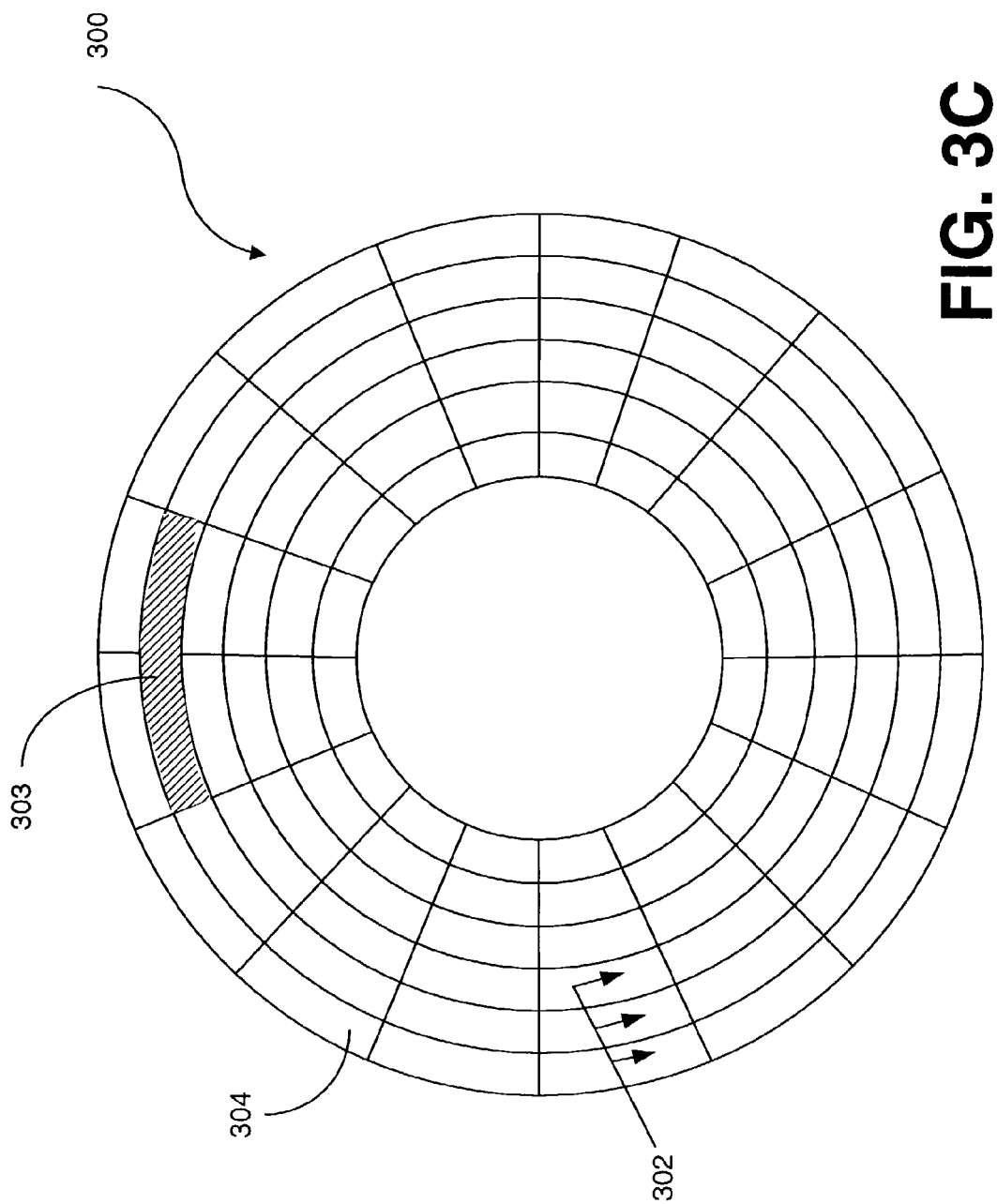
FIG. 3C is a schematic diagram of an example hard disk and hard disk elements located within the storage device coupled to the DHCT depicted in FIG. 3A.

The device driver 311 communicates with the storage device controller 379 to format the hard disks 300 and 301, causing the hard disks to be divided radially into sectors 301 and concentric circles called tracks 302, as illustrated by the schematic diagram n of the example hard disk 300 in FIG. 3C. It will be understood to one having ordinary skill in the art that the discussion that follows pertains to hard disk 301 as well as hard disk 300. Note from FIG. 3C that the same number of sectors 304 per track 302 are illustrated, but other embodiments with a different number tracks per side, sectors per track, bytes per sector, and in different zones of tracks, are within the scope of the preferred embodiments of the invention. The sector 304 is the basic unit of storage on the hard disk 300. In one implementation, each sector 304 of a hard disk 300 can store 512 bytes of user data. While data is preferably stored in 512-byte sectors on the hard disk 300, the cluster, such as example cluster 303, is typically the minimum unit of data storage the operating system 353 uses to store information. Two or more sectors on a single track make up a cluster.

Referring again to FIGS. 3A and 3B, the storage device 373 is preferably internal to the DHCT 16, coupled to a common bus through the communication interface 375, preferably an integrated drive electronics (IDE) interface or small computer system interface (SCSI), although IEEE-1394 or USB can be used. In other embodiments, the storage device 373 can be externally connected to (and thus removable from) the DHCT 16 via the communication port 374 implemented as IEEE-1394 or USB or as a data interface port such as a SCSI or an IDE interface. In one implementation, under the auspices of the real-time operating system 353 (as described below) and executed by the processor 344, and in coordination with the personal video recording (PVR) application 377, the device driver 311, and the device controller 379 (the latter three components described below), downloaded media content (herein understood to also refer to other types of data, in addition to, or instead of, media content instances) are received in the DHCT 16 via the communications interface 342, processed as described above, and stored in a temporary cache (not shown) in memory 349.

The temporary cache is implemented and managed to enable media content transfers from the temporary cache to the storage device 373, or, in concert with the insertion of a newly arriving media content into the temporary cache. In one implementation, the fast access time and high data transfer rate characteristics of the storage device 373 enables media content to be read from the temporary cache in memory 349 and written to the storage device 373 in a sufficiently fast manner. Orchestration of multiple simultaneous data transfer operations is effected so that while media content is being transferred from the cache in memory 349 to the storage device 373, new media content is received and stored in the temporary cache of memory 349. In other implementations, the downloaded media content is received through the communications port 374 in the DHCT 16 and then transferred directly to storage device 373, thus bypassing the temporary cache.

The operating system 353, the device driver 311, and the controller 379 communicate under program execution in the processor 344 and/or via the interrupt and messaging capabilities of the DHCT 16 and thus cooperate to create a special file in one of the hard disk sectors in each hard disk 300 and 301 called a file allocation table (FAT) (not shown). The FAT is where the operating system 353 stores the cluster and file information about each of the hard disks 300 and 301, and which clusters are assigned and associated with a file and thus used to store which media content instance files. The operating system 353 can determine where a file's data is located by using the directory entry (not shown) for the file and the entries of the FAT. The directory entry gives information about a directory such as its related files and subdirectories and create time, and special permissions. A FAT entry describes the physical locations of data associated with a media content downloaded to the hard disks 300 and 301 of the storage device 373. The FAT also keeps track of which clusters are free, or open, and thus available for use. Updates to the FAT are provided for by the operating system 353, or the device driver 311, or a combination of both. Writes to each of the hard disks 300 and 301 are coordinated between the PVR application 377 (described below), the operating system 353, the device driver 311, and the storage device controller 379.

The PVR application 377, the operating system 353, and the device driver 311 execute respective programmed instructions in the processor 344. The processor 344, the storage controller 379, and the demultiplexing system 315 communicate via interrupt and messaging capabilities of the DHCT 16. The PVR application 377, in communication with operating system 353, the device driver 311, the storage device controller 379, and the demultiplexing system 315, effects retrieval of compressed video streams, compressed audio streams, and data streams corresponding to one or more media content instances from the storage device 373. The retrieved streams are deposited in an output cache in the storage device 373 and transferred to DRAM 352, and then processed for playback according to mechanisms well known to those having ordinary skill in the art. In some embodiments, the media content instances are retrieved and routed from the hard disks 300 and/or 301 to the video and audio decoding system 323 and 325 simultaneously, and then further processed for eventual presentation on a display device or other device.

The PVR application 377 provides for media content recording functionality by enabling the temporary writing to, and if requested, more permanent recording (i.e., relatively permanent) to the storage device 373. Media content can be transmitted (or downloaded) from a remote location, such as, for example, a remote server located in the head end 11, or from a home communication network, or from other consumer electronic devices. Downloaded media content that is received at each tuner of tuner system 345 is temporarily buffered, or stored, on the hard disk of the storage device. The corresponding space on each hard disk is called a buffer space, or a time shift buffer (TSB). In a preferred embodiment, each tuner in tuner system 345 has a respective TSB. In one implementation, tuner1 354 receives media content for buffering to TSB1 376. Likewise, the second tuner 358 receives media content for buffering to TSB2 378. Moreover, media instances sourced from a device such as a camera attached to the DHCT 16 via the communication port 374 has a respective TSB (not shown). Note that buffering is understood to mean temporarily storing media content, received from a local attached device, or either from reception of a broadcast digital channel, and/or a digital compressed version of a broadcast analog channel, and/or data, into the buffer spaces (or TSBs) of the storage device 373.

Under normal operation, the PVR application 377 effectively associates a temporary recording designation with the media content received into the TSBs. The media content stored in the TSBs will either be deleted (i.e., the clusters storing the media content will be configured as writeable for eventual write operations that overwrite the media content within those clusters) or retained (through election by the user, as one example) as a permanent recording. A permanent recording will be understood to include media content that is stored for an extended period of time as decided by the user. Permanent recordings are stored in non-buffer clusters (i.e., not in clusters assigned to the TSBs) that are not used for the TSBs in instances when the user elects in advance to make a scheduled recording of a media content instance that has not yet been tuned to at the DHCT 16. A permanent recording can also be achieved by selecting a media content instance stored in the TSBs and designating the media content instance as permanent. In this latter implementation, the designated media content is stored in clusters that are configured from TSB clusters to permanent recording clusters (non-buffer clusters). To compensate for the re-designation of clusters to a permanent recording, the device driver 311 preferably assigns and associates an equivalent number of clusters to the TSB that it obtains from a pool of available unused and/or writeable (e.g., repossessed) clusters thus permitting continuance of normal TSB behavior and management. Thus, permanent recordings will preferably be more permanent than media content in the TSBs, and permanent recordings can eventually be deleted from the disk space, typically at the explicit request of a user, as one example.

There is a duration associated with the TSBs, which represents how much data is held by the TSBs. This duration could represent, in one embodiment, actual media content instance time. The PVR application 377, in such a time-duration embodiment, will preferably maintain a substantially constant buffer space capacity suitable for a certain duration of media content instance time, for example, 3-4 hours worth of media content instances. Media content instance-time tracking is related to hard disk space tracking if a constant data rate, or buffering rate, is assumed or estimated.

In a preferred embodiment, the duration of the TSBs represents hard disk space. The PVR application 377 can set a buffer size capacity, for example 3 gigabytes (GB), and then track the disk space used for the TSBs to ensure a substantially constant TSB capacity. For example, before the PVR application 377 effects a write to the storage device 373, it can query the device driver 311 (through the operating system 353) to determine the available hard disk space. After the write operation, the PVR application 377 again can poll the device driver 311 to get an update on available hard disk space.

The TSBs can be managed according to several mechanisms. In one embodiment, each media content instance that is received at either of the tuners of tuner system 345 prompts the PVR application 377 to cause each media content instance to be downloaded to the hard disk 300 or 301 and associated as a media content instance file under a designated media content instance filename. This media content instance filename is recorded in a FAT that maintains a list of the corresponding clusters storing the media content instance file. The PVR application 377 also creates a management file that maintains a data record that preferably points to the corresponding filename and includes a data record that includes, among other elements, guide data and the receipt time of the downloaded media content instance. The guide data includes the scheduled start time and stop time of the downloaded media content instance as well as other attributes and information that pertain to the media content instance.

The receipt of the downloaded media content instance is also recorded by the PVR application 377 (through coordination with the operating system 353 and an internal clock 372) as a real-time value. The PVR application 377 is either alerted to the start of a media content instance, in one implementation, from a keypress event (e.g., when a user tunes to a desired display channel). In another implementation, the PVR application can use a polling or timing mechanisms (via timer 371, as one example) in cooperation with the internal real-time clock 372 and guide data. The PVR application 377 provides the operating system 353 with the scheduled stop time (from guide data, such as from an interactive program guide) of the downloaded media content instance in order to set up a timer interrupt (or in other embodiments, polls the operating system 353) with the operating system 353. The operating system 353, in coordination with the real-time clock 371 within the DHCT 16, alerts the PVR application 377 (FIG. 3B) to the end of the received media content instance.

Further, the PVR application 377 preferably maintains the management files with an organization mechanism such as a linked list, wherein each management file is associated with each of the media content instances located on the hard disks 300 and 301. Read requests for one of the downloaded media content instances in the TSB 378 occurs by the PVR application 377 searching the linked list for the requested media content instance, and providing a graphics user interface (GUI) (not shown) on a display screen based on the information maintained in the corresponding management file. Furthermore, a bi-directional link-list mechanism can be employed for arbitrary entry and to search forward or backward in relation among media instances.

Further information pertaining to this embodiment for creating and maintaining the TSBs can be found in the patent application entitled, SYSTEM AND METHOD FOR CONTROLLING SUBSTANTIALLY CONSTANT BUFFER CAPACITY FOR PERSONAL VIDEO RECORDING WITH CONSISTENT USER INTERFACE OF AVAILABLE DISK SPACE, filed Dec. 6, 2001 under Ser. No. 10/010,270 and assigned to Scientific Atlanta, herein incorporated by reference.

Another embodiment for maintaining and managing the TSBs includes associating a single file for each TSB, and controlling the allocation and deallocation of clusters in the disk space at the device driver 311 level. In this embodiment, further described in the patent application entitled, DISK DRIVER CLUSTER MANAGEMENT OF TIME SHIFT BUFFER WITH FILE ALLOCATION TABLE STRUCTURE," filed Dec. 5, 2001 under Ser. No. 10/005,628 and assigned to Scientific Atlanta, herein incorporated by reference, the PVR application 377 requests the allocation of disk space for a single file for each TSB. For each TSB 378, the device driver 311, implemented as either a separate software module, or integrated with the operating system 353, allocates enough clusters and assigns them to the respective file to meet the size requirement designated by the PVR application 377. Media content instances downloaded and written to the TSBs are preferably tracked by time. The device driver 311 provides a software generated pointer, called Normal Play Time (NPT), which points to locations within files and locations within media content instances within those files. Based on the Lightweight Stream Control Protocol, NPT can be thought of as the clock associated with a video asset (as distinguished from the real-time clock 372 for the DHCT 16).

For every file that is created for media content downloaded to the storage device 373, an NPT is generated. There is an NPT for the read head of the storage device 373 and for the write head of the storage device 373. For writing media content to the storage device 373 for a newly created file (e.g., a TSB1 file), an NPT is created for the write head of the storage device 373 with an initial value of zero. In one implementation, the device driver 311 receives a periodic interrupt (for example every 5-10 msec) set up by the PVR application 377 through the computer services of the operating system 353. This interrupt is synchronized with the internal real-time clock 372 of the DHCT 16 in order to advance the pointer (i.e., the NPT) at a substantially constant rate. The NPT continues to increase in value (from an initial value of zero) until the associated file is closed. For the read head of the storage device 373, the NPT starts at 0 at the start of the file, advances in real time in normal play mode, advances faster than real time in fast forward mode, decrements in rewind mode, and is fixed when the video is paused.

The PVR application 377 maintains a data structure for every downloaded media content instance. There are one or more data structures preferably maintained on the hard disks 300 and 301 of the storage device 373, but the data structures can also be maintained in memory 349. The data structures include, for example, the NPT values defining the start and end times of the downloaded media content instance, the real-time values corresponding to the start and end times of the media content instances, as well as the corresponding media content instance guide data, among other elements. The device driver 311 maintains the mapping between NPT and the cluster and sector locations of the media content in a separate look-up table data structure (not shown) preferably located on the hard disks 300 and 301. In one embodiment, the device driver 311 can sample the current write location (i.e., cluster and sector location provided by the storage device controller 379) as the write head of the storage device 373 advances and store that cluster and sector location in the look-up table data structure along with a corresponding NPT value. This sampling can occur, for example, every 5-10 msec. In an alternative embodiment, the device driver 311 can record an initial sample and through an estimation algorithm (e.g., interpolation) estimate file locations and locations within said files. When the PVR application 377 references a particular media content instance (for example where a user seeks to rewind to a downloaded media content instance in the hard disk 300), the PVR application 377 passes the stored start and stop NPT values for that media content instance to the device driver 311, and the device driver 311 determines the hard disk locations from the look-up table data structure. The PVR application 377 correlates NPT read values for locations within the media content instances to the real-time clock value. With the real-time start and stop values and guide data maintained in a data structure, as well as the correlated read-NPT to real-time values, the PVR application 377 can produce a GUI that provides the user with information that includes what portion of a buffered media content instance the user is currently viewing.

Figure 3D:
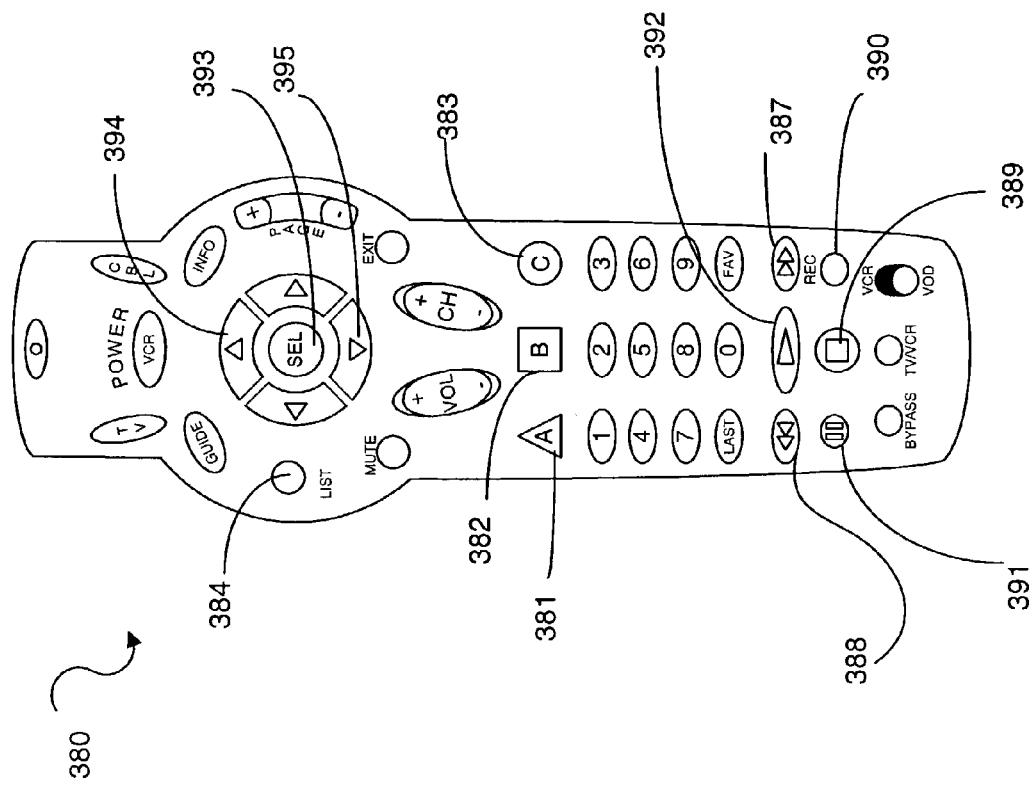
FIG. 3D is a schematic diagram of an example remote control device to provide input to the DHCT illustrated in FIG. 3A, in accordance with one embodiment of the invention.

As described above, the user preferably permanently records from the TSBs by designating as permanent a currently viewed media content instance during real-time viewing or returning (e.g., rewinding) to any part of a media content instance in the TSBs and selecting record from a remote device 380, or alternatively, from selecting a record button (not shown) on the DHCT 16. An example remote control device 380 to provide input to the DHCT 16 is illustrated in FIG. 3D. A display channel is selected, and changed, by a user, typically via pressing a key or button on the remote control device 380. Rewind 388 and fast-forward 387 buttons enable a user to access buffered media content instances in the TSBs 376 and 378. A record button 390 enables the user to designate as permanently recorded any media content instance buffered into the TSBs 376 and 378, as described below. A pause button 391 (and a stop button 389) enables the user to pause a media content instance, or pause during a search for a particular media content instance. A playback button 392 enables the playback of a media content instance. "A" 381, "B" 382, and "C" 383 buttons can correspond to certain application-defined functions that have a corresponding "A", "B", or "C" symbol displayed in a GUI presented on a display device. A list button 384 can be used to evoke various PVR application 377 user interface screens. Also included is a select button 393 for selecting an option on a display screen, and up and down arrows 394 and 395 for scrolling through displayed options. Many alternative methods of providing user input may be used including a remote control device with different buttons and/or button layouts, a keyboard device, a voice activated device, etc. The embodiments of the invention described herein are not limited by the type of device used to provide user input.

Figure 4:
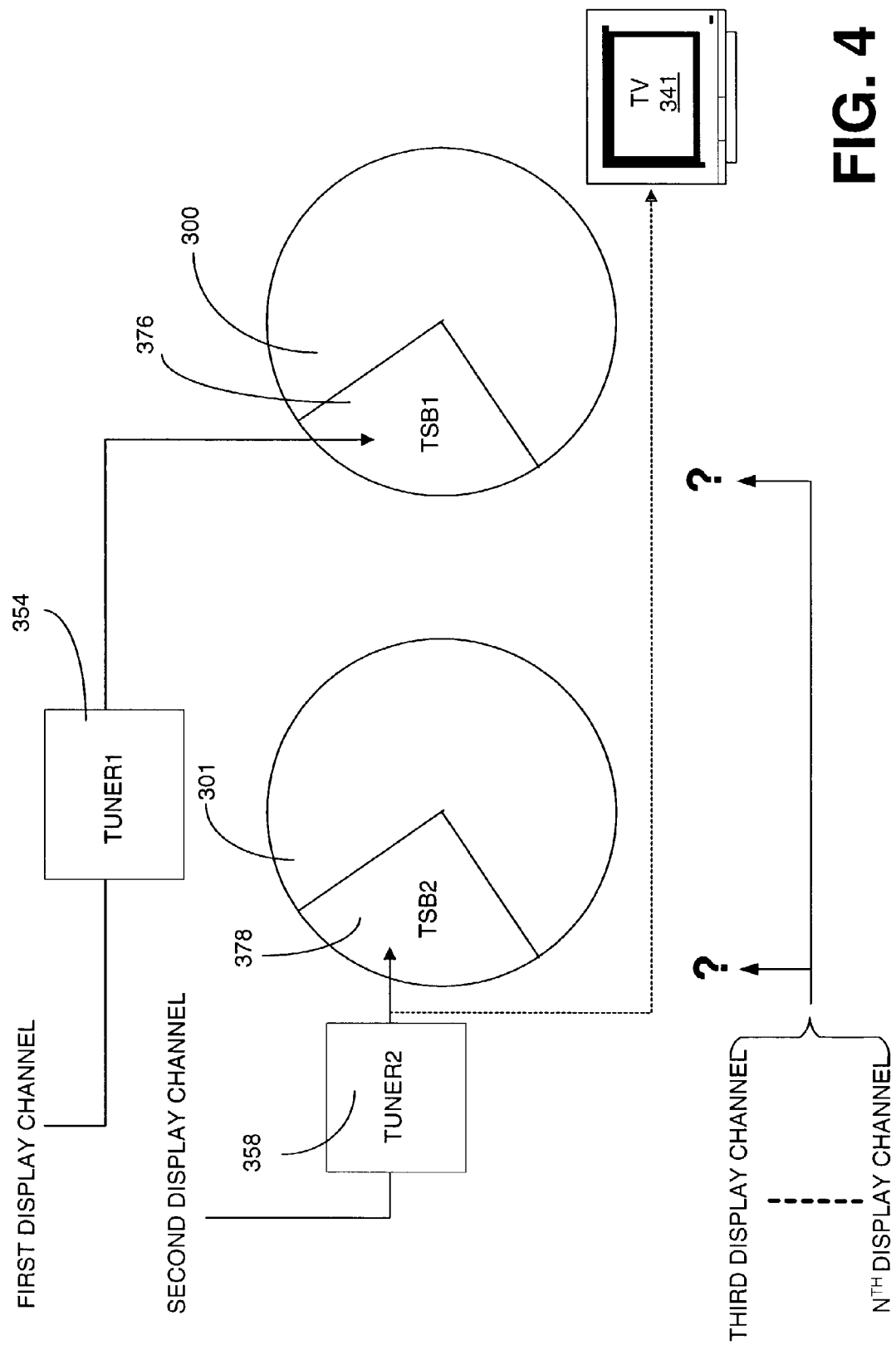
FIG. 4 is a schematic diagram illustrating an example conflict scenario in a two tuner, two buffer system that would require the establishment of priorities for receiving and buffering media content from a plurality of display channels, in accordance with one embodiment of the invention.

FIG. 4 is a schematic diagram illustrating an example scenario in a two tuner (and two buffer) system that would require the establishment of priorities for downloading media content from a plurality of display channels, in accordance with one embodiment of the invention. One or more of these display channels can also be presented to a display device, such as a television 341, as shown by the dotted line from the second display channel. For example, assume the user was initially watching media content of the first display channel, and then selected a second display channel for display (while buffering and displaying the first display channel). This display of media content of the second display channel can be a time-shifted display (sourced from the buffer), or the buffering and the display can occur in parallel. For the descriptions that follow, it will be assumed that the newly requested display channel will always be displayed in favor of the current display. Shown are two hard disks 300 and 301. These hard disks are preferably located in the storage device 373, as described above. The hard disk 300 includes a buffer space (TSB1) 376 for receiving and storing downloaded media content from a first display channel. The first display channel media content is preferably provided from the headend 11 (FIG. 2) to one of the tuners, for example tuner1 354 of tuner system 345 (FIG. 3A). The second display channel can be received at tuner2 358 of the tuner system 345. The hard disk 301 includes a buffer space (TSB2) 378 for receiving and storing downloaded media content of the second display channel. Alternatively, TSB1 376 and TSB2 378 can be buffer space on a single hard disk (e.g., one physical hard disk, or other storage medium, partitioned to function and be controlled as two "logical" hard disks), or on disks in separate storage devices.

While tuner1 354 receives media content of the first display channel for storage into TSB1 376 and display on the TV 341, assume a user changes from the first display channel to the second display channel. In order to receive media content at tuner2 358, the operating system 353 (FIG. 3B) preferably performs a resource query to determine if the resources exist to tune and buffer both display channels. For instance, if tuner2 358 was currently resourced to perform a scheduled recording, then the second display channel, in one implementation, may not be received at tuner2 358, and thus the content of the second display channel may have to be received at tuner1 354 and TSB1 376 at the expense of the media content stored in TSB1 376 and received from the first display channel.

In another implementation, if the second display channel is transmitted over the same center RF frequency as the first display channel, as determined by the operating system 353 (FIG. 3B) from a display channel number to center frequency association table (not shown) in memory 349 (FIG. 3A), resourcing of tuner2 358 is not necessary and media content of both the first and second display channel are received via tuner1 354 and deposited into the respective TSB1 376 and TSB2 378.

Assume the user changed from the first display channel to the second display channel, and that the second tuner 358 is an available resource. The media content of the first display channel, in one embodiment, will not be "deleted" (i.e., written over or its associated clusters made writeable) but instead retained for now, and the media content (after the display channel change) will continue to be received at tuner1 354 and downloaded into TSB1 376 from the first display channel. The point in time when the user resources tuner2 358 to receive the second display channel is "marked" and stored in memory 349 and thereafter copied to a PVR application data structure (not shown) associated with the buffer spaces of the storage device 373 (FIG. 3A) when enough time of buffering the second display channel elapses. Buffering to storage device 373 is preferably effected by the caching the data to memory 349 (FIG. 3A) and thereafter reading the respective data from memory 349 and writing it to storage device 373. The buffering is timely orchestrated so that previously deposited data to memory 349 is read while additional data is being written to memory. Further, a pointer to the location of the hard disk 300 where the media content of the first display channel is buffered when tuner2 358 is resourced is also recorded in the data structure to enable later access and/or retrieval, as described below.

In an alternate implementation, memory 349 (FIG. 3A) in DHCT 16 (FIG. 3A) is of sufficient size to permit buffering of data up to a predetermined elapsed time required according to a threshold before proceeding to transfer the cached data in memory 349 to storage device 373 (FIG. 3A). Consequently, less bookkeeping is required on the storage device 373.

The amount of elapsed time deemed to be sufficient is determined by comparison to a first programmable threshold value. The threshold value can be preset at compilation time by the application developer. In one preferred embodiment, the programmer programs the threshold to have an initial default value that can be modified throughout the course of time by the viewer according to the viewer's preference via an interactive configuration application (not shown) in which the viewer makes selections in a displayed graphical user interface (GUI) by entering information with key presses or by entering alphanumeric information with an input device such as a remote control device 380 (FIG. 3D). For instance, desired preferences and configuration can be entered as part of an overall general settings application 312 (FIG. 3B).

The PVR application 377 (FIG. 3B) recognizes the key-press event associated with the display channel change, and determines the time of the key press from time and clock provisions in the DHCT 16 (FIG. 3A) and from services of the operating system 353 (FIG. 3B). The time of the key press is stored in memory 349 (FIG. 3B) and thereafter if enough time elapses, as defined by a first threshold, for example, while buffering the second display channel, the time of the key press is also annotated (written) into the storage device 373 with annotations associated with the respective media content. Annotations include information required to retrieve the media content downloaded to the storage device 373 (FIG. 3A). Such information includes the time that the media content was received, information to fulfill playback and other navigating modes, characteristics of the media content, elapsed time of buffering, and a pointer to the location of the downloaded media content, among other information. If enough time elapses, an address marker associated with the start of where the media content corresponding to the second display channel is downloaded is also stored on the hard disk 300 or 301 (FIG. 3A) in the storage device 373 (FIG. 3A) as part of the media content's annotations. The PVR application 377 stores these values in memory until it determines that sufficient time (according to a first threshold) has elapsed and then also stores them in the hard disk 300 or 301 by reading their respective information from memory 349 and writing it to hard disk 300 or 301.

The PVR application 377 (FIG. 3B) waits until a next input state regardless of whether enough time has elapsed to store annotations in the storage device 373 (FIG. 3A). A next input state from a set of possible next input states includes a viewer's input such as a keypress event that is possibly associated with returning to the first display channel (when that occurs). A next input state can alternatively correspond to a key press corresponding to the currently displayed channel (that is, the second display channel) or to a third display channel. A key press that selects the second display channel while the user is currently viewing the media content of the second display channel may be a viewer's mistake, in conventional television systems. However, in the preferred embodiments, it can actually signify a desired effect by the viewer such as to give precedence to buffering the second display channel over the buffering of a first display channel. In one embodiment, this viewer desired precedence behavior for buffering the second display channel becomes effective indefinitely. In an alternate embodiment, the viewer desired precedence behavior for buffering the second display channel becomes effective if the viewer subsequently selects to display a third display channel within a specific amount of elapsed time corresponding to less than a second threshold.

The return to the first display channel causes the PVR application 377 (FIG. 3B) to, in one implementation, return to the point in the media content instance that the user left off viewing the media content associated with the first display channel to go to the media content of the second display channel. In other implementations, according to a programmed default behavior or to a viewer's configured preference, the user can be returned to the real-time tuned position to receive the current media content, with the ability to rewind back to where the user left the media content of the first display channel. The first display channel and the second display channel can download a single media content instance to each of the buffer spaces 376 and 378 between display channel changes, or a plurality of media content instances can be downloaded to each respective buffer space, depending on the amount of time, or the download duration, that the media content is received in each respective buffer space. In other words, the user is free to change the display channel at any point within or after a media content instance presentation, and thus at any point in time, either buffer space can temporarily store, for example, a portion (e.g., 30 seconds) of a media content instance, or enough media content instances to reach buffer space capacity, among other examples. Such buffering behavior is determined in part by a set of programmed thresholds, including a first and a second threshold as described above. Alternatively, each threshold in the set of thresholds can be fixed to respective empirically determined values by the application developer. In another embodiment, some of the thresholds in the set may be programmed to be configurable and others to fixed values.

When the user decides to change display channels (e.g., switch to a third display channel), the media content of the third display channel can go to either TSB1 376 or TSB2 378. In one embodiment, according to a programmed behavior, when the media content of the third display channel is downloaded to one of these buffer spaces, the media content already stored there is deleted (e.g., overwritten or made writeable) in order to receive and store the media content of the third display channel. A user can implement a preference as to which buffer space media content to delete.

In other embodiments, a currently buffered display channel's media content is deleted after a display channel change according to a set of controlling rules based on the respective values of a set of input variables that effect one or more outcomes or resulting behaviors. The controlling rules are programmed by the application developer and employ measured input variables that preferably connote elapsed time as measured in the background throughout the course of time by the PVR application 377 (FIG. 3B). Relational input variables are also employed by the programmed controlling rules. The relational input variables express respective comparisons of the value of an input variable type that expresses elapsed time for a first display channel to the value for a second display channel. As a non-limiting example, a relational input variable may be the fraction obtained by division of the values of the two corresponding input variables being compared or their reciprocal.

The PVR application 377, the operating system 353, the controller 379, the general settings application 312, and the device driver 311 (FIGS. 3A and 3B) execute respective programmed instructions in the processor 344 (FIG. 3A). The communication between these entities is preferably via interrupt and/or messaging capabilities of the DHCT 16 as well as by sharing of data output by one of these entities and written in memory 349 that serves as input to one or more of any of these entities by reading the data from memory 349. The data output by one or more of these entities can be input data to itself. Programmed controlling rules are a programmed component part of the PVR application 377. The controlling rules comprise ingredients employed in the preferred embodiments of the invention to make decisions, for example decisions as to priority of buffering and tuning resources. This rule-based system of the preferred embodiments includes variables that feed into their antecedents, and each rule produces a consequence or a prediction. The set of consequences may in turn be input to another set of rules to provide an overall output, or the consequences may be input to other mechanisms (e.g., statistical classifiers, syntactical classifiers, or other inference engine mechanisms used with inference engines in expert systems) to make a decision. As will be described further below, variables can be assigned coefficients. Consequences produced by the rules can be assigned a weight as well. The weights can change throughout the course of time, for example in a dynamic system. If probability or a confidence/certainty factor is assigned to a variable (e.g., a favorites channel), then the rule based system can be generically categorized as a fuzzy-set system.

The scope of outcomes or actions conducted by the execution of the programmed controlling rules, include one or more of the following:

A. Determination of available unemployed resources such as tuners, TV displays to display the newly requested display channel, storage device capacity (including the time shift buffers) to store the media content of the newly displayed channel, access capability to and/or from the storage device (e.g., via interfaces), compression engines, and decompression engines. Note that the access capacity may be an issue with high definition television streams. For example, in an implementation that includes a single hard disk drive, available bandwidth for transfers to and from the hard disk through the IDE interface, for example, can be limited, especially for high bit rates.

B. Determination of whether to discontinue a display channel that is sourcing media content (that is being currently buffered) to repossess a lacked resource that is required to effect the viewer's newly requested display channel's media content.

C. Upon determination of a need for discontinuation of a display channel, selection of a currently buffered display channel (selected display channel) to discontinue.

D. Upon the lack of an available tuner to receive another display channel, discontinuation of sourcing the selected display channel's media content via the tuner, and E. Commencement of sourcing of the viewer's newly requested display channel's media content via the repossessed tuner.

F. Discontinuation of buffering the currently buffered display channel's media content in a TSB from a first tuner, and deletion (or displacement) of that media content, G. Continuation of buffering of a non-displaced display channel's media content associated with a second tuner in a TSB, H. Commencement of buffering into the repossessed TSB of the viewer's newly requested display channel's media content, I. Upon the lack of an available TV display to display another display channel, discontinuation of display on the TV display of the selected display channel's media content that is being buffered, J. Commencement of display on the TV of the viewer's newly requested display channel's media content on the repossessed TV display.

The order in the actions conducted can differ, and no particular order is implied by the list A-J described above. A tuner resource change comprises the discontinuation of receiving a display channel's media content, and receiving the media content of another display channel requested by the viewer. A display resource change comprises the discontinuation of displaying a received display channel's media content and displaying on the TV 341 the media content of a newly requested display channel. A buffer resource change comprises the discontinuation of a received display channel and deletion of the corresponding media content that is buffered, in addition to buffering the media content of another received display channel in the TSB.

With continued reference to FIG. 4, if all the resources are available to tune, buffer, and display the media content of the third display channel (i.e., newly requested display channel), no discontinuation is required in the signal flow path through the DHCT. However, if there is a conflict in resources used such that the current resources are fully employed for tuning, buffering, and/or displaying the first and second display channel media content, then the controlling rules of the preferred embodiments will provide for a discontinuation preferably in reverse order (e.g., from display to source) to the order used to establish a connection between resources to tune, display, and/or buffer the media content, and connection in the forward order (e.g., from source to display) for receiving, buffering, and displaying the media content for the newly requested display channel.

For the example implementations provided, it will be assumed that a newly requested display channel is to be both displayed on the television 341 and buffered, with the understanding that the preferred embodiments can be used to accomplish either one of these operations alone or in combination. A couple of considerations are worth noting in the context of proper resource management. For example, according to rules and precedences configured, and with continued reference to FIG. 4, the second display channel may be discontinued from being displayed, but its buffering may continue. The first display channel that was not being displayed but only buffered may stop buffering, and its associated tuner may discontinue sourcing the media content of the first display channel in favor of sourcing the newly requested display channel. Further, the media content of the first display channel downloaded to the buffer can be deleted in favor of the media content of the newly requested display channel. Thus, although tuning, displaying, and/or buffering media content from one display channel can be completely discontinued in favor of a newly requested display channel, it is also possible that the signal flow for both display channels (the first and the second) will in some way be affected to provide resources for the newly requested display channel media content. As described above, the discontinuation in signal flow is preferably done in the reverse order (i.e., reverse to its forward connection), such that the display for the second display channel is discontinued first, and then the buffering and then the tuning is discontinued for the first display channel, as one example.

Another consideration in resource management includes the fact that discontinuation will vary in the signal flow path and the resources affected, in some implementations, depending on whether the received display channel is analog or digital. FIGS. 5-11 will now be used to further illustrate the signal flow paths through a DHCT, and in particular, how resources are employed to receive (tune), buffer, and/or display media content sourced from analog transmission signals and digital transmission signals. The timing diagrams of FIGS. 5-11 will also help to provide added understanding of the outcomes described above in A-J.

Figure 5:
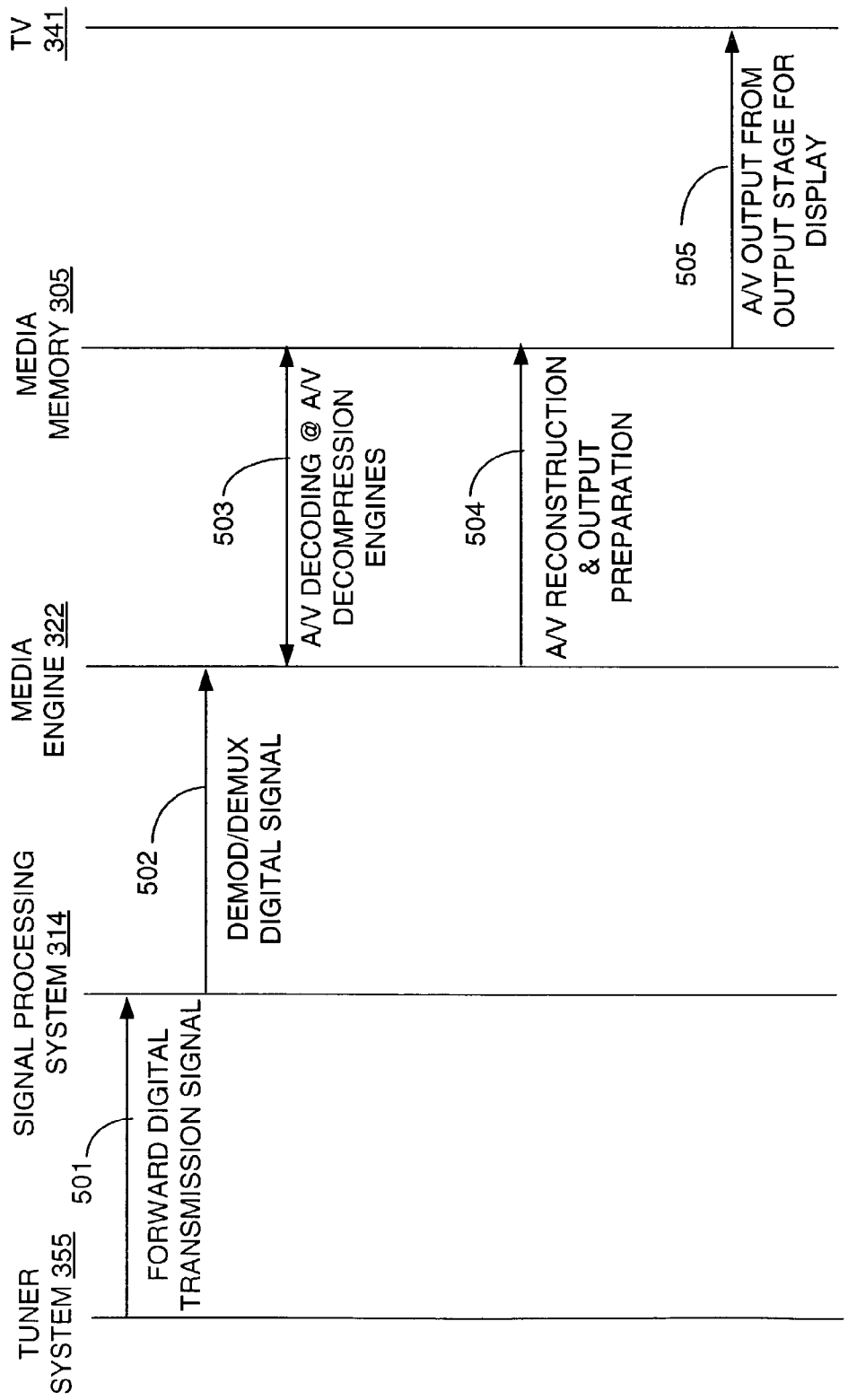
FIGS. 5-11 are timing diagrams that illustrate some example resource interactions included in tuning, buffering, and displaying media content among a variety of analog and digital signal flow path configurations, in accordance with several embodiments of the invention.

FIG. 5 is a timing diagram that illustrates one example implementation for resource connections for a digital signal flow path where there is a display of the media content with no buffering. Step 501 includes forwarding the digital transmission signal from a resourced tuner of the tuner system 345 to the signal processing system 314. At the signal processing system 314, the digital signal is preferably demodulated and demultiplexed, and forwarded to the media engine 322 (step 502). Step 503 includes decoding the signal in cooperation with media memory 305, and then the media content is readied and reconstructed (step 504) for output (via output stage 348 (FIG. 3A, as understood herein) to the TV 341 (step 505). Discontinuation of the signal flow path, according to the preferred embodiments, will preferably occur in the reverse order (e.g., steps 505, 504, 503, etc.), as is generally true for FIGS. 6-11 that follow.

Figure 6:
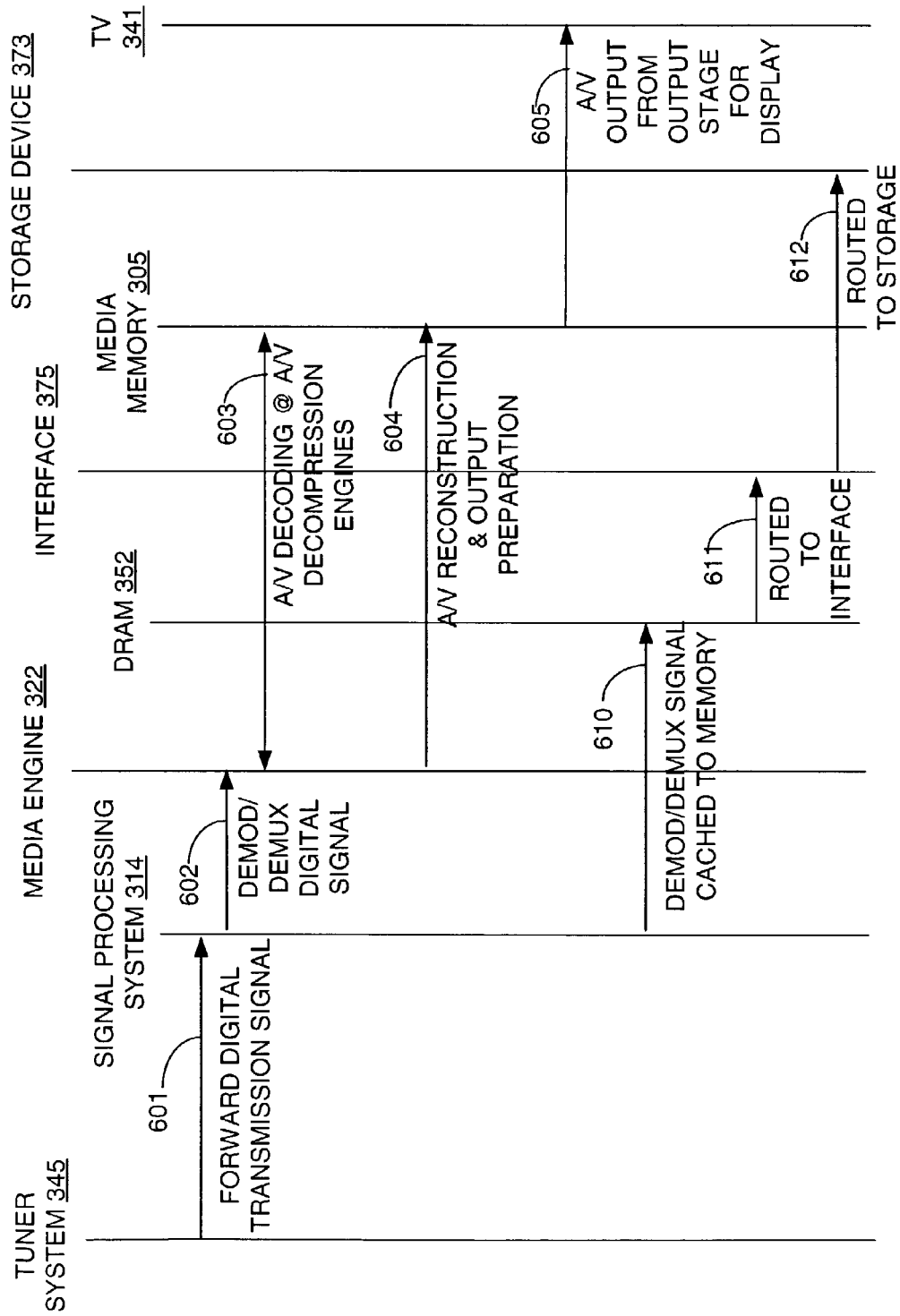

FIG. 6 is a timing diagram of one example implementation for buffering and displaying media content in a digital signal path. Steps 601 through 605 are similar to steps 501 through 505 described in association with FIG. 5. Step 610 preferably occurs in parallel to step 602, and includes caching the demultiplexed signal in DRAM 352. Step 611 includes routing the signal from DRAM 352 to an interface 375, and step 612 includes routing the signal to a time shift buffer in the storage device 373.

Figure 7:
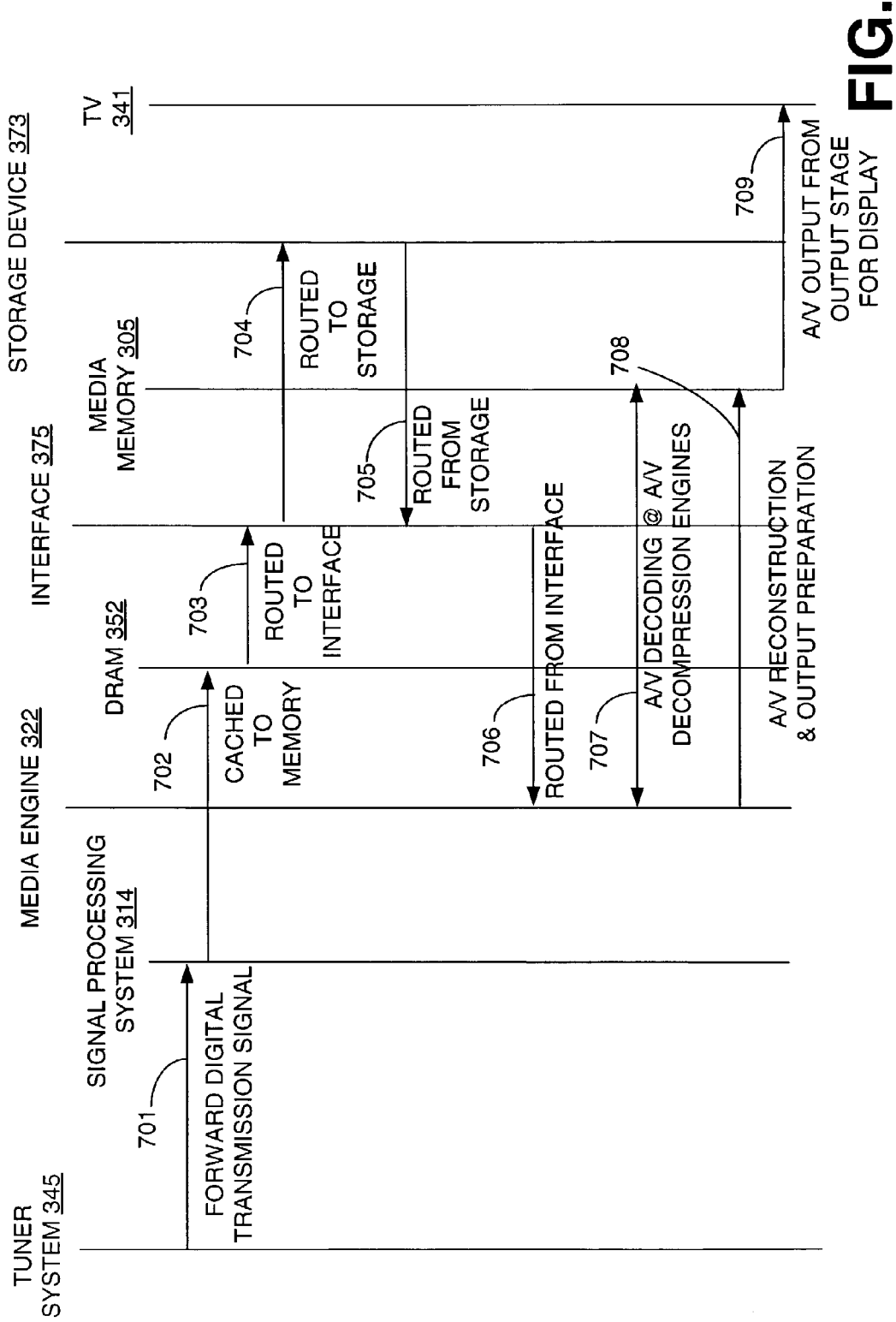

FIG. 7 is a timing diagram of one example implementation that includes displaying a time-shifted (i.e., buffered) digital signal. Step 701 includes forwarding the digital signal to the signal processing system 314 for demodulation and demultiplexing. The signal is then cached to DRAM 352 (step 702), routed to the interface 375 (step 703) and then to the storage device 373 (Step 704). From the storage device 373, the signal is routed back to the interface 375 (step 705), and then to the media engine 322 (step 706). The media engine 322 and the media memory 305 cooperate to decode the signal (step 707), and then the signal is reconstructed and conditioned for output (step 708), and then the signal is output to the TV 341 (step 709).

Figure 8:
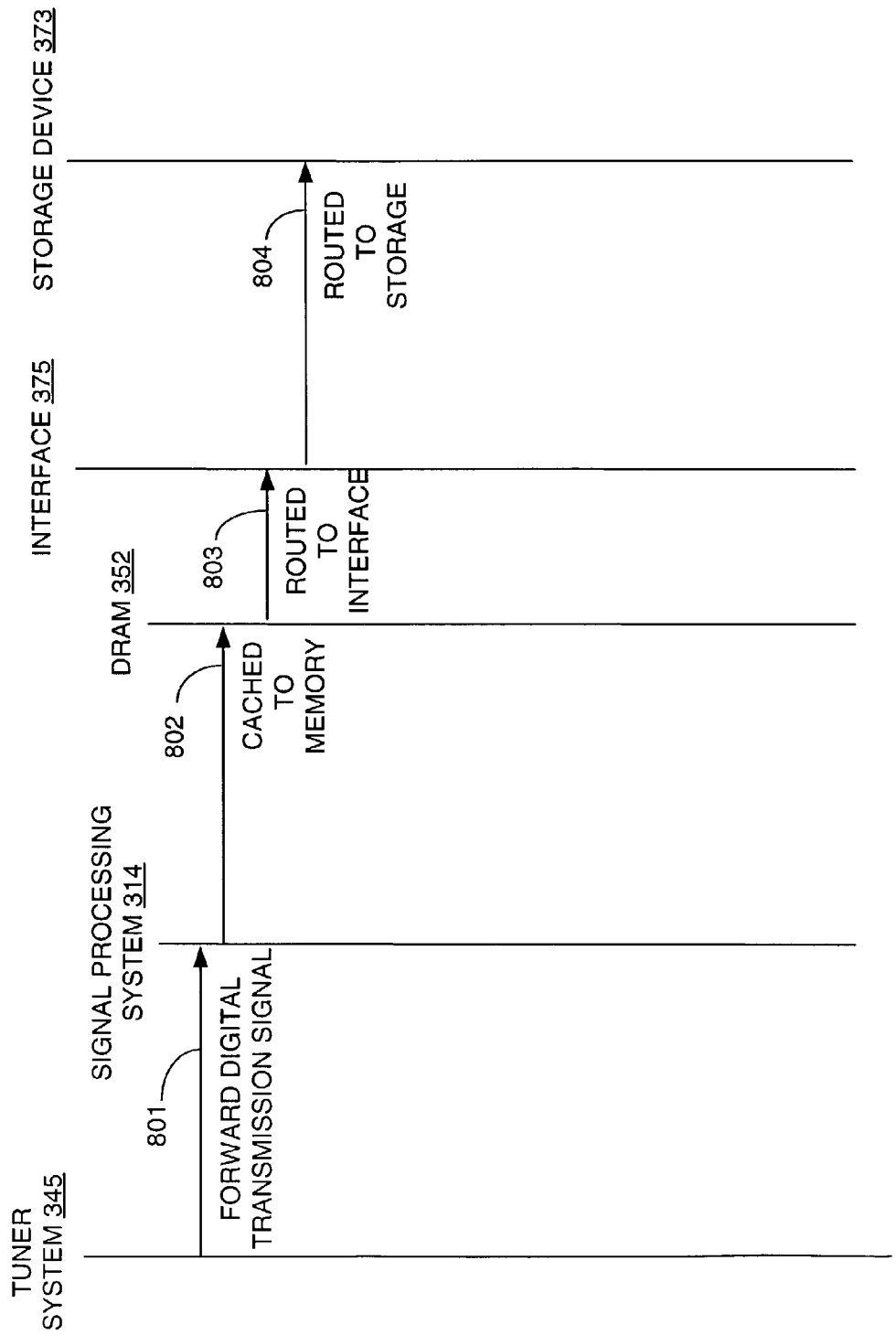

FIG. 8 is a timing diagram of one example implementation that includes buffering the media content from one of the display channels to the storage device 373. As shown, the digital transmission signal received at a tuner of the tuner system 345 is forwarded to the signal processing system 314 (step 801), cached to DRAM 352 (step 802), routed to the interface 375 (step 803) and then to the storage device 373 (step 804).

Figure 9:
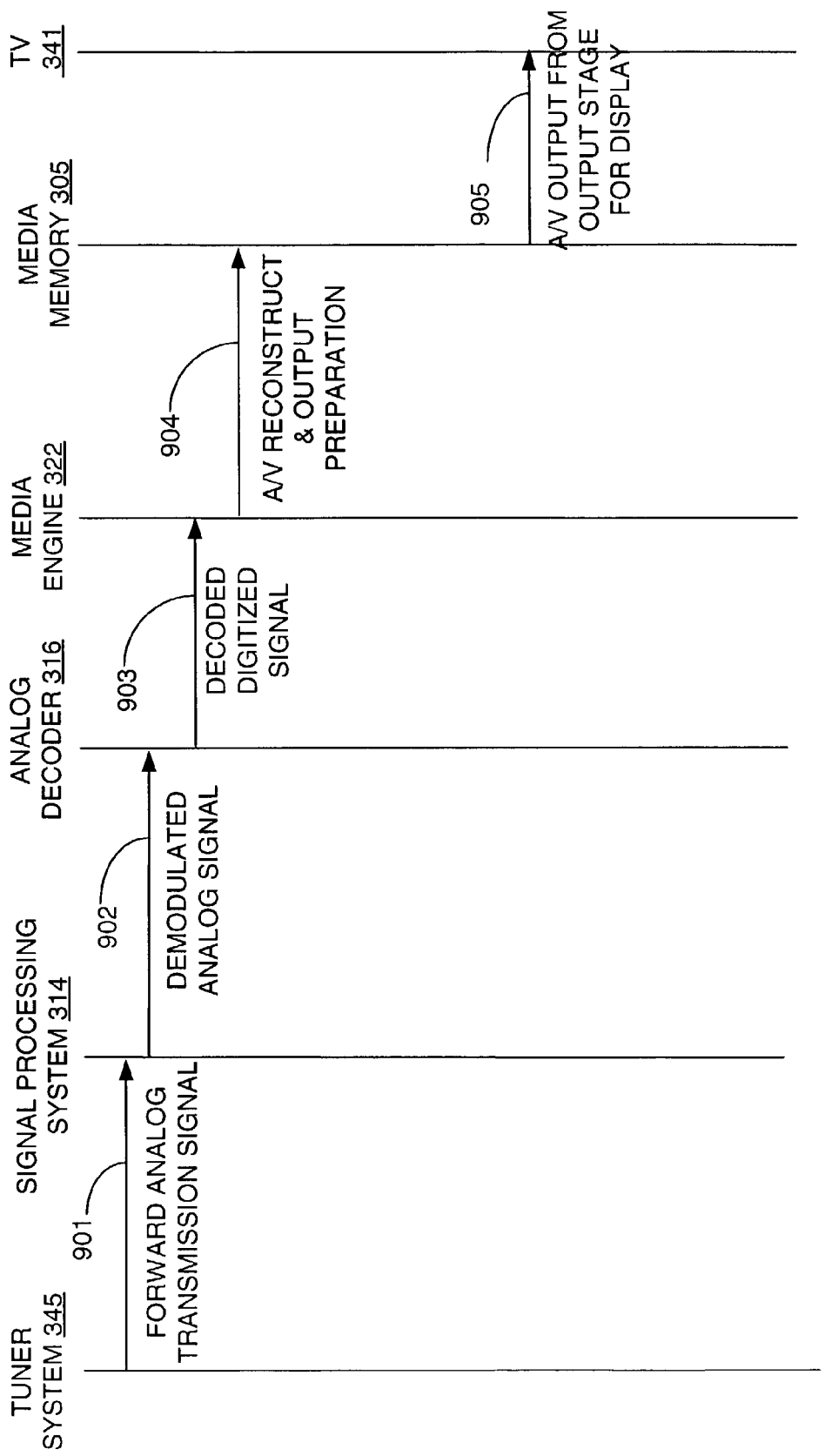
Figure 10:
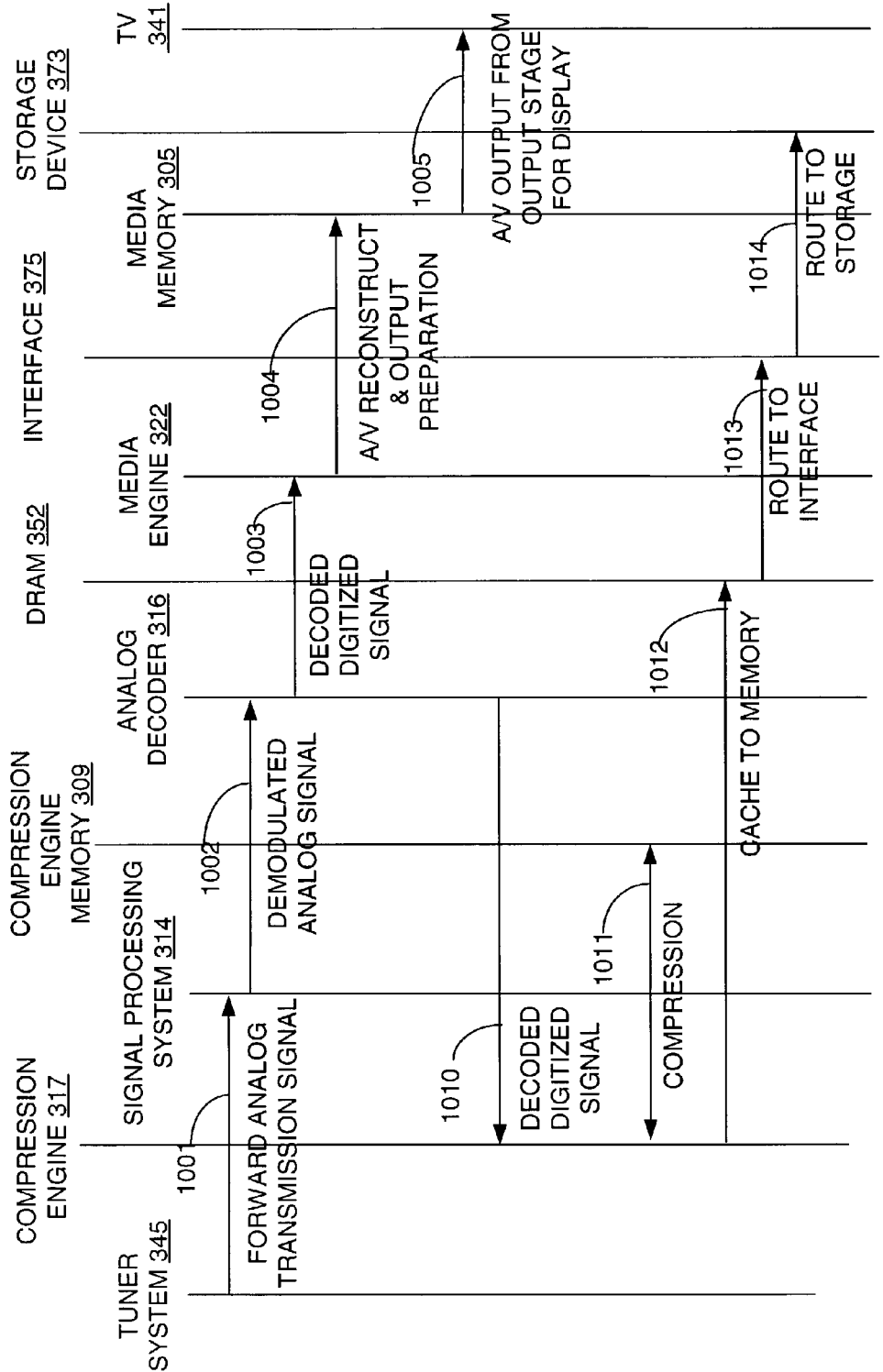
Figure 11:
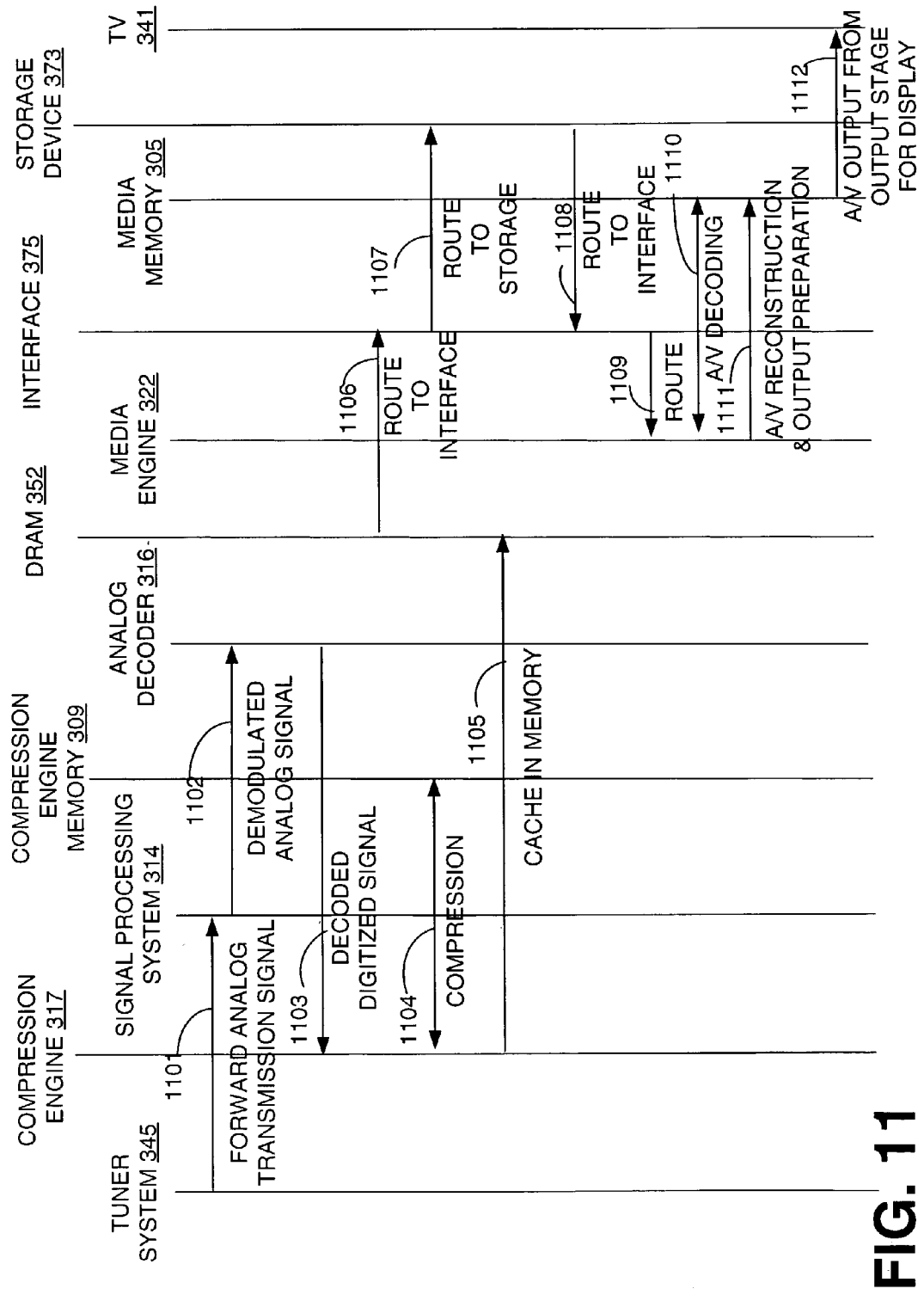

FIGS. 9-11 will now be used to illustrate the signal flow path and resources employed for tuning, buffering, and/or displaying media content modulated in an analog transmission signal. FIG. 9 is a timing diagram illustrating an example signal flow path and resources employed for decoding and displaying an analog signal. Step 901 includes forwarding the analog signal received at a tuner of the tuner system 345 to the signal processing system 314, where it is demodulated and forwarded to the analog decoder 316 (step 902) for decoding. The resulting decoded, digitized signal is then forwarded to the media engine 322 (step 903), and then forwarded to the media memory 305 (step 904) where the signal is readied for output, and then forwarded to the TV 341 (step 905).

FIG. 10 is a timing diagram of one example implementation where the analog signal is buffered and displayed in parallel processes. Step 1001 includes forwarding the analog signal from the tuner system 345 to the signal processing system 314, where it is demodulated and then forwarded to the analog decoder 316 (step 1002). From the analog decoder 316, processing occurs in two parallel paths. Step 1003 includes forwarding the decoded digitized signal to the media engine 322, and then to steps 1004 and 1005 that mirror steps 904 and 905 of FIG. 9. The other processing path from the analog decoder 316 includes forwarding the decoded digitized signal to the compression engine 317 (step 1010) for compression, which occurs in cooperation with compression engine memory 309 (step 1011), and then caching the compressed signal (step 1012). The compressed signal is then routed from DRAM 352 to the interface 375 (step 1013), and then routed for storage in the storage device 373 (step 1014).

FIG. 11 is a timing diagram of one example implementation where the media content displayed is time shifted. Step 1101 includes forwarding the analog signal received at the tuner system 345 to the signal processing system 314 for demodulation. The demodulated signal is then forwarded to the analog decoder 316 (step 1102) where it is decoded, and then forwarded to the compression engine 317 (step 1103) for compression in cooperation with compression engine memory 309 (step 1104). From the compression engine 317, the signal is then cached in DRAM 352 (step 1105) and transferred to the interface 375 (step 1106) and then routed to the storage device 373 (step 1107). From the storage device 373, the signal is then routed to the interface 375 (1108) and then to the media engine 322 (step 1109), where it undergoes decoding (step 1110) in cooperation with media memory 305, and then the signal is reconstructed and output processed (step 1111), and then the signal is output to the TV 341 (step 1112).

Figure 12B:
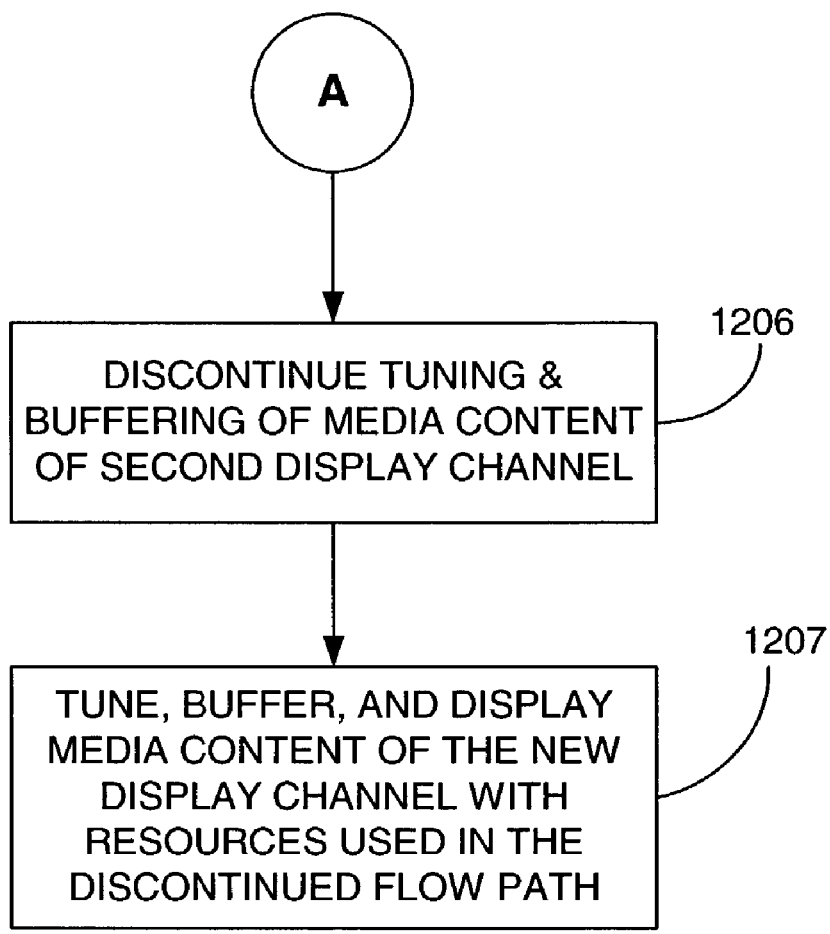

Thus as shown, the management of resources for tuning, displaying, and/or buffering media content from a plurality of display channels includes, in addition to the considerations mentioned above, determining whether the resources are processing analog signals, digital signals, or a combination of both. FIG. 12A is a flow diagram of an example resource management process that can be implemented when the first and/or second display channel signal flow needs to be discontinued, in whole or in part, to provide for the tuning, buffering and display of a newly requested display channel. Assume that the desired signal flow for the newly requested display channel is as shown in the configuration illustrated in FIG. 6 (e.g., display in parallel to buffering), or in other embodiments, the configuration shown in FIG. 7 (time-shifted display). Step 1201 provides that media content is provided in a first display channel for display to the display device and in parallel, for buffering to a storage device, much like the configuration shown in FIG. 6. Step 1202 provides that the second display channel is now being displayed and buffered (which results in discontinuation of the display of the media content of the first display channel), and the first display channel is resourced within a configuration that appears much like the configuration shown in FIG. 8. Similar actions and configurations can apply for analog signals, as will be described below.

Step 1203 includes receiving a request for a new display channel. For purposes of discussion, it will be assumed that the new display channel is provided as a digital signal, with the understanding that the steps provided herein can be generally applied for an analog signal, or a combination of analog and digital signals. Step 1204 includes discontinuing the display of the media content of the second display channel on a display device (e.g., TV). For example, if the second display channel was currently providing media content to the display device, such as that shown in the timing diagram of FIG. 6, the following forward path steps would be reversed, preferably in the order given: steps 605, 604, 603, and then 602. At this stage, the first and the second display channel would have a forward signal path that closely resembles FIG. 8 for a digital signal (or steps 1001, 1002, 1010 through 1014 of FIG. 10 for an analog signal).

Step 1205 includes determining a precedence for resourcing a newly requested display channel according to a set of controlling rules, as will be described below. If the rules mandate that the first display channel has precedence, then discontinue the buffering of the media content of the second display channel (step 1206, FIG. 12B). According to the example configuration shown in FIG. 6, such an action would result in discontinuing the signal flow path according to the following order: steps 612, 611, 610, 602, and 601 (or steps 1014-1010, 1002, and 1001 of FIG. 10 for an analog signal). Step 1207 (FIG. 12B) includes using the tuner resources, the buffer resources, and the display resources previously employed for the second display channel to resource the media content of the newly requested display channel.

Figure 12C:
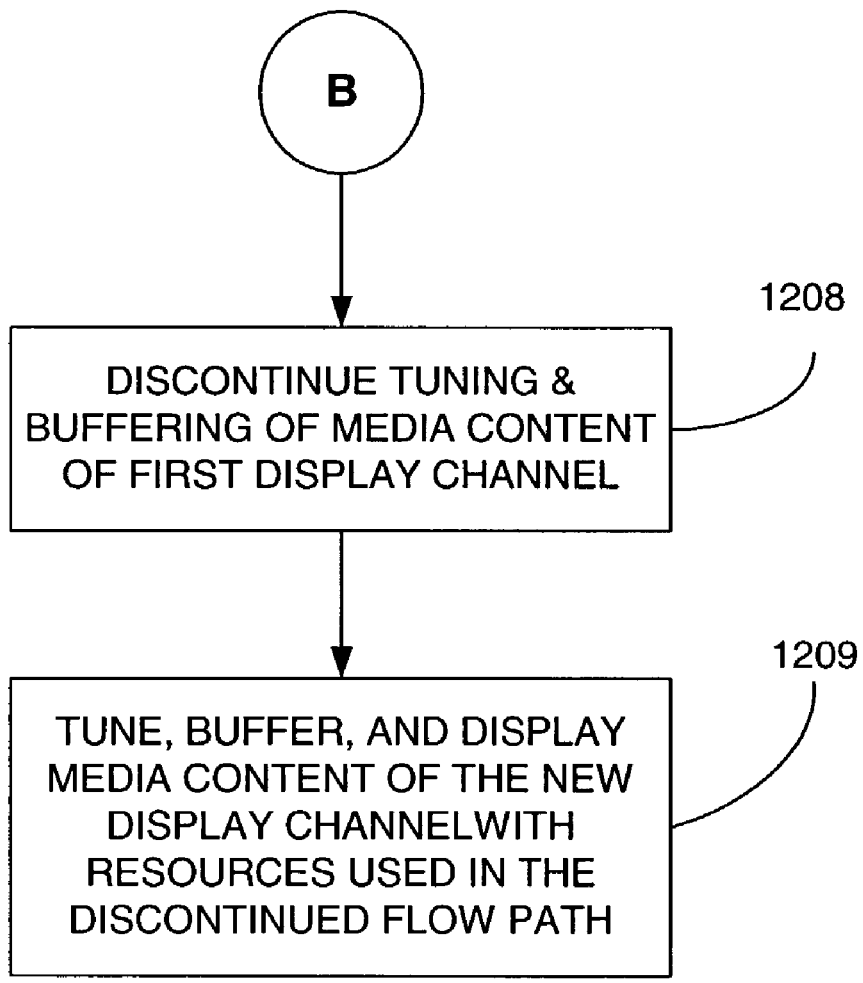

Referring to FIG. 12C, with continued reference to FIG. 12A, if the rules mandate that the second display channel has precedence, then buffering for the second display channel (for example, as shown in steps 801 through 804 of FIG. 8 for a digital signal, or steps 1001, 1002, 1010-1014 of FIG. 10 for an analog signal) will continue and the first display channel buffering path will be discontinued (step 1208). Step 1209 includes using the tuner resources, the buffer resources, and the display resources previously employed for the first display channel to resource the media content of the newly requested display channel.

In one implementation, the repossession of "buffering resources" of the received display channel to be displaced uses a form of bookkeeping. In one embodiment, the point on the hard disk (e.g., 300 or 301, FIG. 3A) where the media content to be deleted started will preferably be recorded (for example in the PVR data structure or in annotations in the storage device 373 (FIG. 3A)) such that the newly requested display channel media content will start at the point where the deleted media content started. Another form of bookkeeping that can be used in other embodiments includes subtracting the amount of total buffer capacity after such deletion. As described briefly above, the determining of precedence relies preferably on a set of controlling rules, which in turn rely on a set of input variables, and/or user inputted preferences. One of the input variables to the controlling rules, including those rules that control discontinuation of buffering of a display channel's media content, can be the length of contiguous time of buffering the display channel's media content (and deletion of buffered media content). Alternatively, the total time of buffering a respective media content instance (i.e., not necessarily contiguous time) can be employed.

Another input variable can be the length of time that a buffered display channel's media content is displayed on TV. Whether a buffered display channel's media content is currently displayed or last displayed on TV may cause this input variable to be weighted more significantly in the controlling rules. Hence, the multiplicative coefficient of an input variable may be dynamically adjusted according to a user's viewing patterns. The relationship between the length of buffering elapsed time between media content of a first display channel currently being buffered to media content of a second currently buffered display channel can also be another input variable.

The relationship between the length of buffering elapsed time of a display channel's media content currently being buffered to its total time displayed on TV throughout the course of buffering can also be an input variable. Another input variable to the controlling rules can be whether a display channel currently being buffered is included in a favorites channel list, such as a list of preferred display channels selected or entered by the viewer during the course of a configuration session. A favorites channel list, as well as all preferences and configurations aforementioned herein are stored in memory (e.g., DRAM 352) and in non-volatile memory, such as FLASH memory 351 (FIG. 3A) for its recovery in the event of a power outage. The storage device 373 (FIG. 3A) can also serve for storing preferences and configurations and recovery upon power-up. Whether the favorites channel list influences the controlling rule is preferably a configuration and/or preference entered by the viewer during a configuration session.

In one embodiment, when the favorites channel list is employed as input to the controlling rules, a different set of controlling rules is executed. Alternate values for thresholds that control relational input variables can be employed when the favorites channel list is part of the input to the controlling rules. Hence, if a display channel being buffered is in the favorites channel list, it will influence the controlling rules in a way more towards continuing its buffering (or equivalently, less likely of being displaced and discontinued due to sourcing the tuner and respective TSB for media content of a newly requested display channel).

An input variable may be designed to exhibit a non-linear range when controlled by a respective threshold or set of thresholds. A first input threshold is preferably assigned to control the value of a first variable. A first type of input variable may be assigned a value of "no significance" (e.g., zero) if below its respective first controlling threshold value. Furthermore, the value of a second type of input variable may be controlled with a first controlling respective threshold and a second respective controlling threshold. If the value of the second type of input variable is above or equal to a first respective controlling threshold but below a second respective controlling threshold value, it retains its original value. Furthermore, the value of a third type of input variable may be controlled with a first respective controlling threshold and a second respective controlling threshold but may be assigned a maximum value when its value is above a second respective controlling threshold value. As would be understood and appreciated by those having ordinary skill in the art, the comparison of an input variable's value to a threshold value may be based on programmable operations, including "if less than the value", "less than or equal to", "greater than", "greater than or equal to", "equal", and/or "not equal."

A fourth type of input variable may be controlled by assigning a respective "no significance" value indirectly or directly per a viewer's input. A fifth type of input variable may be controlled by assigning a respective "no significance" value indirectly or directly per a viewer's input to configure a desired buffering, tuning and/or display behavior during a configuration session. A sixth type of input variable may be controlled by assigning a respective "maximum value" indirectly or directly per a viewer's input. A seventh type of input variable may be controlled by assigning a respective "maximum value" indirectly or directly per a viewer's input to configure a desired buffering, tuning and/or display behavior during a configuration session. In this way, the value of some and possibly all input variables can be modified to a non-linear range of values according to their actual value. The actual value of an input variable can be a measured value, a user input value, or a default value assigned by the programmed application. Each input variable may be further weighted multiplicatively with a respective coefficient that pertains to the importance of the respective input variable with respect to the complete set of input variables employed by the controlling rules. For example, a first controlling rule has a first multiplicative coefficient for a first input variable and a second controlling rule has a second multiplicative coefficient for the same first input variable.

Throughout the course of time, the PVR application 377 (FIG. 3B) employs OS services such as time posting and clock access to allow updating of values for each respective input variable in the set of input variables, and to be updated according to the "time posting granularity" of the OS 353 and according to the granularity of timer 371 and clocks 372 (one is shown) of DHCT 16. Values of input variables are stored in memory 349 (FIG. 3A) with annotations pertaining to a file in the storage device 373 (FIG. 3A).

Upon a viewer's input entered via an input device such as a remote control device 380 (FIG. 3D), the PVR application 377 executes on the processor 344 (FIG. 3A) to enter a machine state wherein the PVR application 377 (FIG. 3B) assesses and determines available resources such as (1) tuners for sourcing media content of a display channel selection by the viewer, (2) TV display for displaying a display channel's media content, (3) compression engines for compressing analog signals, (4) decompression engines for decoding digital signals, (5) communication interfaces for access to and from the storage device, and (6) TSBs for buffering the respective display channel's media content. Determination of resources is part of the controlling rules in one embodiment. When the PVR application 377 determines the lack of a required resource, controlling rules are executed to effect the desired change according to the viewer's input requesting a new display channel, a prior entered viewer's configuration and prioritization, and/or according to set of input variables.

Prior to the execution of the controlling rules, pre-processing of the applicable input variables is preferably conducted. The pre-processing module 385 (FIG. 3B) includes processing of the controlling rules and is preferably included in the PVR application 377 (FIG. 3B), although similar functionality can be found in other applications or as a separate module. In the pre-processing module 385, the respective values of input variables is read from memory 349. For an applicable input variable, its respective value is compared to one or more thresholds assigned to that particular input variable and a modified value for the input variable is obtained. Hence, the preprocessing module 385 maps the actual value of each input variable required to be modified to a desired range according to the predetermined set of thresholds assigned to control the respective input variable. Thereafter, each pre-processed input variable is multiplied by its respective weight coefficient and the set of controlling rules are executed to obtain one or more outcomes that effect one or more resource changes.

The following description will include an example implementation, based on FIG. 4, using some input variables to illustrate a rule-based system that determines priority of resources to tune, buffer, and display a third display channel when two other display channels are consuming the resources needed for the third display channel. One way to prioritize which buffer space of the storage device 373 (FIG. 3A) to delete of media content is to prioritize the cumulative media content in each buffer space by evaluating input variables such as download duration. For example, if the user was viewing the first display channel for 5 hours, and then decided to "channel surf" (i.e., change display channels in brief succession) over 1 through "N" display channels, then it is probable that the content downloaded from the first display channel is of higher significance, or of a higher priority, than the media content downloaded from the surfed display channels. Thus, with each display channel change, a tuner and buffer conflict arises whereby media content downloaded from prior display channels into TSB1 376 and/or TSB2 378 are at risk of being deleted to accommodate the download of the newly requested display channel. It will be assumed that the most recently tuned display channel will be displayed. The conflict of tuning and buffering can be addressed, in one implementation, by establishing a system that prioritizes the download duration to each buffer space according to controlling rules.

In the preferred embodiments, the buffering duration of the media content of the first display channel up to the point of the display channel change (to the second display channel) is compared to the buffering duration of the media content of the second display channel. For example, the user can be viewing a series of media content instances over a span of hours on the first display channel. The user then decides to look at the score of a football game on the second display channel. The point in the presentation of the media content instance of the first display channel when the user switched to the second display channel is "marked", and this "mark", the buffering duration, and the displayed duration for the first display channel are stored in a PVR data structure with its pertinent annotations (not shown). The user is now viewing the football game on the second display channel, which is preferably received at tuner2 358 and buffered to TSB2 378. The media content of the first display channel continues to be downloaded to TSB1 376. Assume the user waits a few minutes before the score comes up on the screen display for the football game, and then decides to go to a third display channel.

Assuming the two tuner DHCT illustrated in FIG. 4, the user selects the third display channel on his or her remote control device 380 (FIG. 3D). The PVR application 377 (FIG. 3B) executes the set of controlling rules and according to the outcome of the rules, makes a determination as to which tuner (tuner1 354 or tuner2 358) to resource as well as the respective applicable behavior to effect. The PVR application 377 makes this determination by executing the programmed controlling rules that effectively compare the buffering duration (stored in the PVR data structure) of the first display channel with the buffering duration of the second display channel (the football game) by the pre-processing (via the pre-processing module 385 (FIG. 3B)) of applicable input variables and execution of controlling rules. Since the difference in buffering durations is measurable in hours, the second display channel is discontinued, the second tuner 358, in one implementation, is then resourced for the third display channel and the associated buffered media content (i.e., the game in TSB2 378) is deleted in order to receive and store the media content of the third display channel.

If shortly after switching to the third display channel, the user decides to switch to a fourth display channel, the PVR application 377 (FIG. 3B) does a similar evaluation of buffering durations. The buffering duration of the first display channel (stored in the PVR data structure) is compared to the buffering duration for the third display channel. Again, in one implementation, due to the large difference in buffering duration (or because the buffering duration of the third display channel did not meet sufficient elapsed time according to a first threshold), the third display channel is discontinued, the second tuner 358 is again resourced for the fourth display channel, and the TSB2 media content of the third display channel is deleted to receive the media content of the fourth display channel, while the media content of the first display channel continues to be buffering and retained in TSB1 376.

FIGS. 13-17 are a series of flow charts illustrating steps for prioritizing between tuner and buffer resources based on a plurality of buffering durations in order to address the example scenario of FIG. 4, in accordance with several embodiments of the invention. The blocks in the flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figure 13:
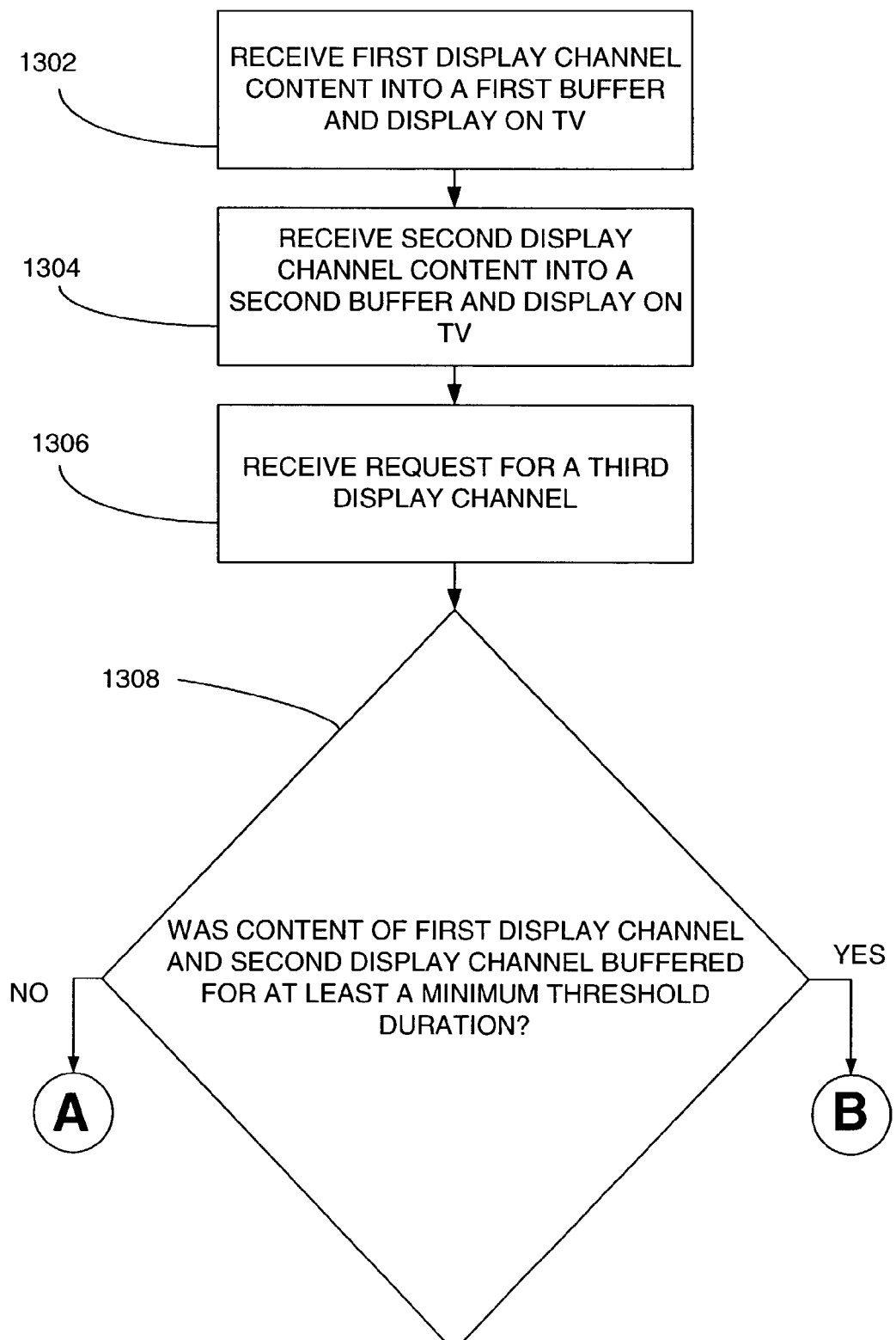
FIGS. 13-17 are flow diagrams that illustrate steps for prioritizing between tuner resources and buffer space based on a plurality of download durations in order to address the example scenario of FIG. 4, in accordance with several embodiments of the invention.

With continued reference to FIG. 4, FIG. 13 is a flow chart that establishes an arbitrary starting point for prioritizing the buffering durations to the first buffer (TSB1 376) and the second buffer (TSB2 378). Step 1302 includes receiving the media content of the first display channel (via tuner1 354) into the first buffer (TSB1 376), and displaying the media content on the TV 341. Thus, as a non-limiting example, a two-tuner system is assumed, and tuner1 354 is employed to receive media content of the first display channel. Upon a viewer's input via an input device (e.g., a remote control device 380, FIG. 3D) to display a second display channel's media content, step 1304 includes receiving the media content from a second display channel (via tuner2 358) into the second buffer (TSB2 378), and displaying the media content on the TV 341. The second tuner (tuner2 358) is assumed to be an available resource, and thus receives the media content of the second display channel. The newly requested display channel will preferably have display resource precedence over the currently displayed display channel.

Step 1306 includes receiving user input requesting a third display channel. Unless the DHCT 16 contains additional tuners, a conflict arises, since one of the tuners (354 or 358) has to be resourced to receive the media content of the third display channel for display on the TV 341 (FIG. 4). This example scenario assumes that no other buffer resource conflicts are present, for instance from a scheduled permanent recording or from preference filter mechanisms, among others. Otherwise, additional constraints or behavior would be enacted based on the outcome of the execution of the programmed controlling rules. Some conflicts, when they arise, can give rise to conflict barkers that are presented on a display screen to give the user the opportunity to resolve the conflict. Other conflicts can be automatically resolved by execution of the programmed controlling rules. In some embodiments, a system settings menu (not shown) can be utilized at start-up or at times convenient to the user that enables the user to select and/or configure priorities between these and other conflicts that may arise. Assuming that the DHCT 16 has only two tuners, step 1308 includes a decision to be made by the PVR application 377 (FIG. 3B). Namely, the PVR application 377, upon receiving a request for a display channel change to a third display channel, decides whether media content of the first two display channels was buffered for a minimum threshold buffering duration prior to the respective display channel changes. The determination of which display channel did not meet the minimum buffering threshold will be left for step 1410 of FIG. 14, as described below.

Figure 14:
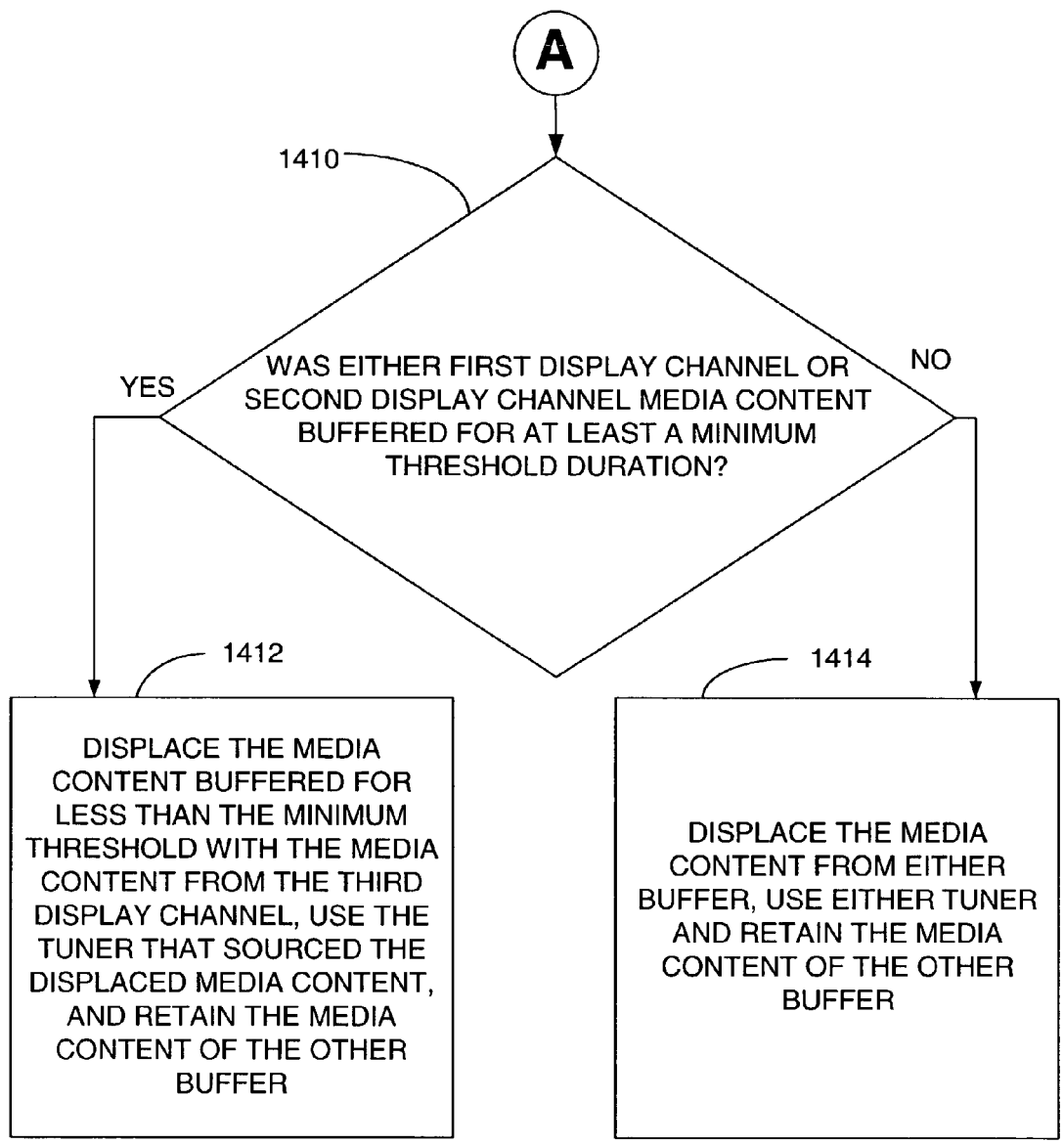
Figure 15:
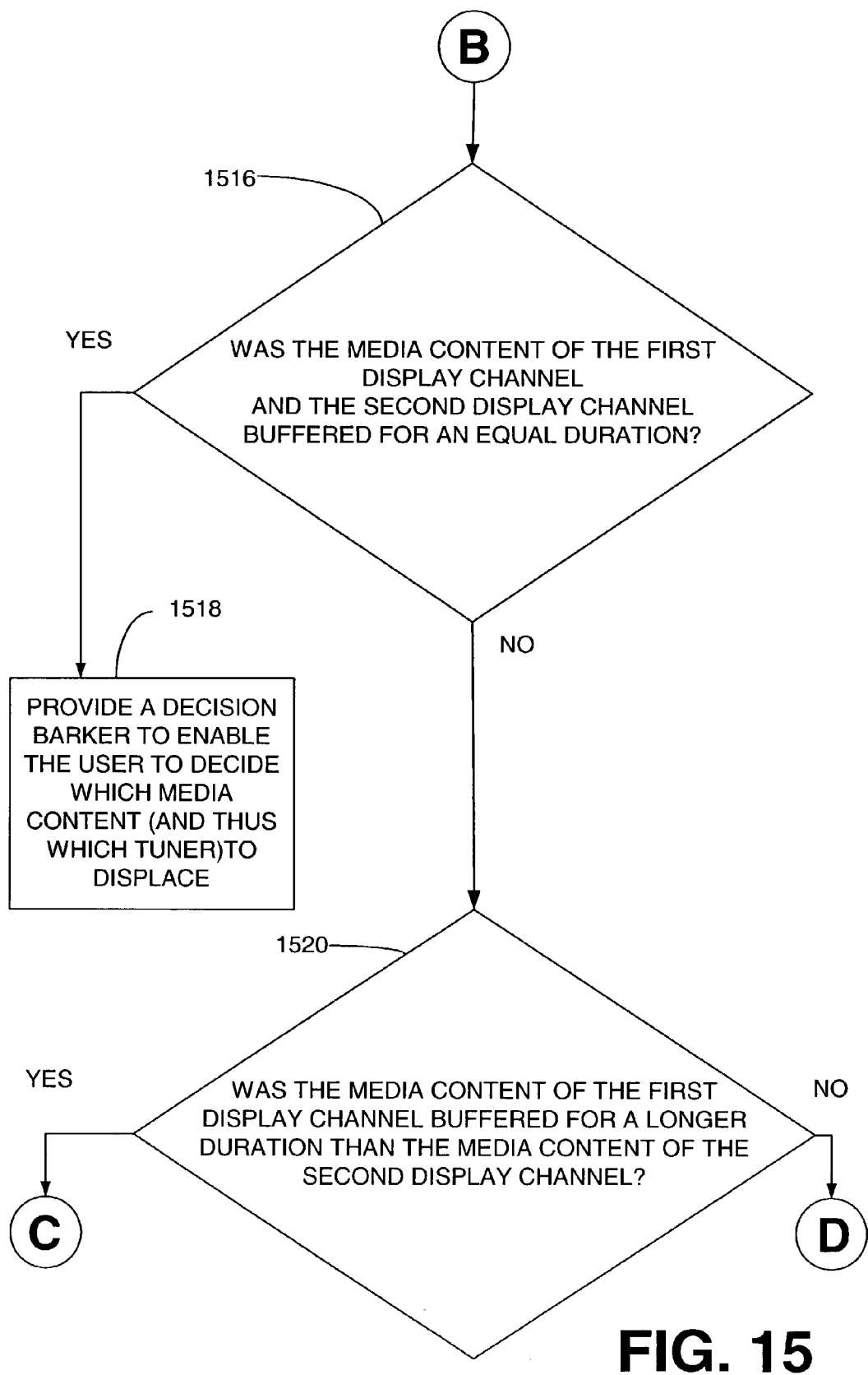

If a minimum buffering duration threshold was not met for the buffering of the media content to its respective buffer, then the prioritizing continues to point A in FIG. 14, otherwise to point B in FIG. 15. Continuing the example at point A in FIG. 14, the PVR application 377 decides whether the media content buffered to either buffer was buffered over at least a minimum threshold duration (step 1410). If a buffering duration threshold was met for the buffering of the media content to one buffer, then step 1412 includes the steps of resourcing the tuner (for the third display channel media content) that is sourcing the display channel for which the buffered media content does not satisfy the minimum duration according to a first threshold. In turn, the media content buffered for less than the minimum threshold is displaced with the media content buffered from the third display channel, while the media content buffered for a minimum threshold duration is retained allowing for a continued tuning and buffering operation.

If the buffering of the media content to either buffer failed to meet a minimum threshold duration, then either tuner1 354 or tuner2 358 (FIG. 3A) is resourced for the third display channel and the media content from either buffer is displaced while retaining the media content in the non-displaced buffer. At this point, other input variables (as described above), can be employed to provide a decision as to priority. In one embodiment, the media content consuming the least buffered space is displaced. In another implementation, the latest displayed channel media content is retained. In yet another embodiment, the last displayed channel (e.g., the first display channel media content) is retained when the viewer has pressed the key for the current display channel media content being displayed (e.g., the second display channel media content) prior to changing to a third display channel. Another embodiment includes retaining media content sourced from a higher priority display channel (e.g., a favorites channel). Alternatively, the user can be presented at this point with a user interface screen (decision barker screen), as explained below, that provides the user with a choice of buffers to clear (and a choice of tuners to resource) to make room for the third display channel media content.

FIG. 15 is a flow chart that illustrates example prioritizing steps starting from point B, which occurred after the threshold determination of FIG. 13. Thus, if the buffering duration to both buffers met a minimum threshold, step 1516 comes into play to determine if the media content of the first display channel and the second display channel was buffered into the respective buffers for an equal duration. If so, step 1518 shows that a decision barker is provided to enable the user to decide which media content to displace (and consequently, which tuner to resource and which media content to retain). The decision barker will be described in further detail below. Alternatively, other input variables can be evaluated to provide a decision, for example retaining the media content of a higher priority display channel (e.g., a favorites channel).

However, if the media content to both buffers was not buffered for an equal buffering duration, then the next step (step 1520) is to determine whether the media content of the first display channel was buffered for a longer duration than the media content of the second display channel (i.e., relational input variables). It will be understood by those of ordinary skill in the art that the reference comparison can be reversed. For example, step 1520 can just as easily be described as determining whether the second display channel was buffered for a longer duration, or described as whether the media content of the second display channel was buffered for a shorter duration, etc. If step 1520 results in an affirmative determination, the prioritizing steps continue to point C (FIG. 16), otherwise the steps continue at point D (FIG. 17).

Figure 16:
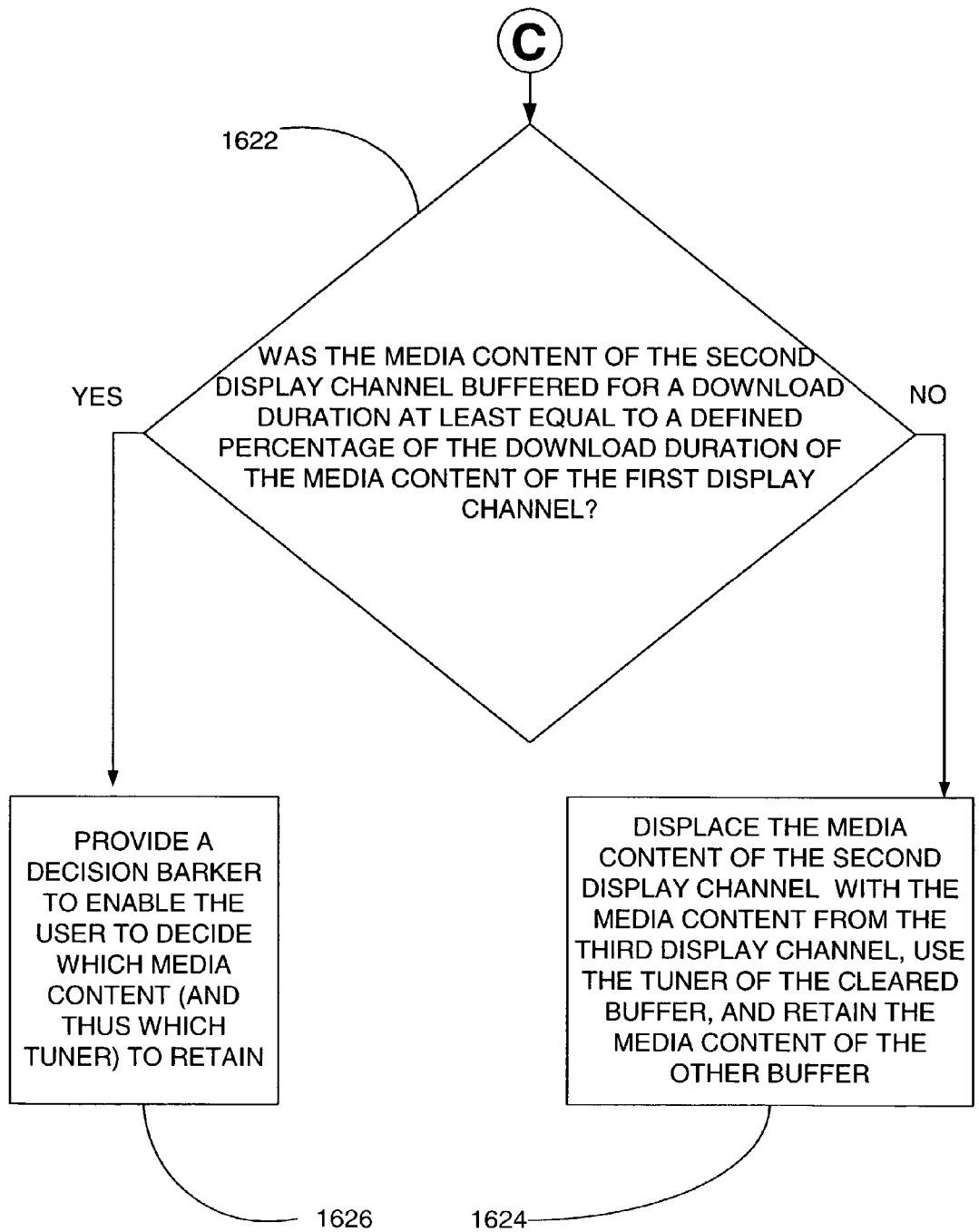

FIG. 16 is a flow chart that begins from point C, wherein step 1622 compares the buffering duration of the first and the second display channel and determines whether the media content of the second display channel was buffered for a buffering duration at least equal to a defined percentage of the buffering duration of the media content of the first display channel. For instance, if the media content of the first display channel was buffered to the first buffer (TSB1 376, FIG. 4) for a duration of 30 minutes, a threshold percentage buffering duration, such as 50%, could be established, in one embodiment, at a user settings menu (not shown) at start-up, or configured at any other point when using the PVR mechanisms in other embodiments. By establishing a threshold percentage of, for example, 50%, if the media content of the second display channel was buffered into the second buffer (TSB2 378, FIG. 4) for 10 minutes, 10 minutes is less than 50% of 30 minutes, and thus the determination of step 1622 would lead to step 1624, wherein tuner2 358 (FIG. 4) would be resourced for the third display channel and the media content of the second display channel would be displaced by the media content buffered from the third display channel.

However, continuing the example, if the media content of the second display channel was buffered for 25 minutes, this buffering duration exceeds the threshold percentage of 50%, and thus a decision barker can be provided (step 1626) to enable the user to determine priority in this case. In one embodiment, the viewer configures when to allow the decision barker to be displayed by entering input during a configuration session. Furthermore, the viewer configures the percentage difference from the set threshold for when the decision barker is displayed. Alternatively, a decision barker is only presented to the viewer to enable the viewer to determine priority in cases deemed as a "close-case," such as when near the percentage threshold. Alternatively, default threshold percentages can be provided in the software, or the user can configure these threshold percentages in a user interface screen at start-up, or at other times, or additional input variables can be evaluated.

Figure 17:
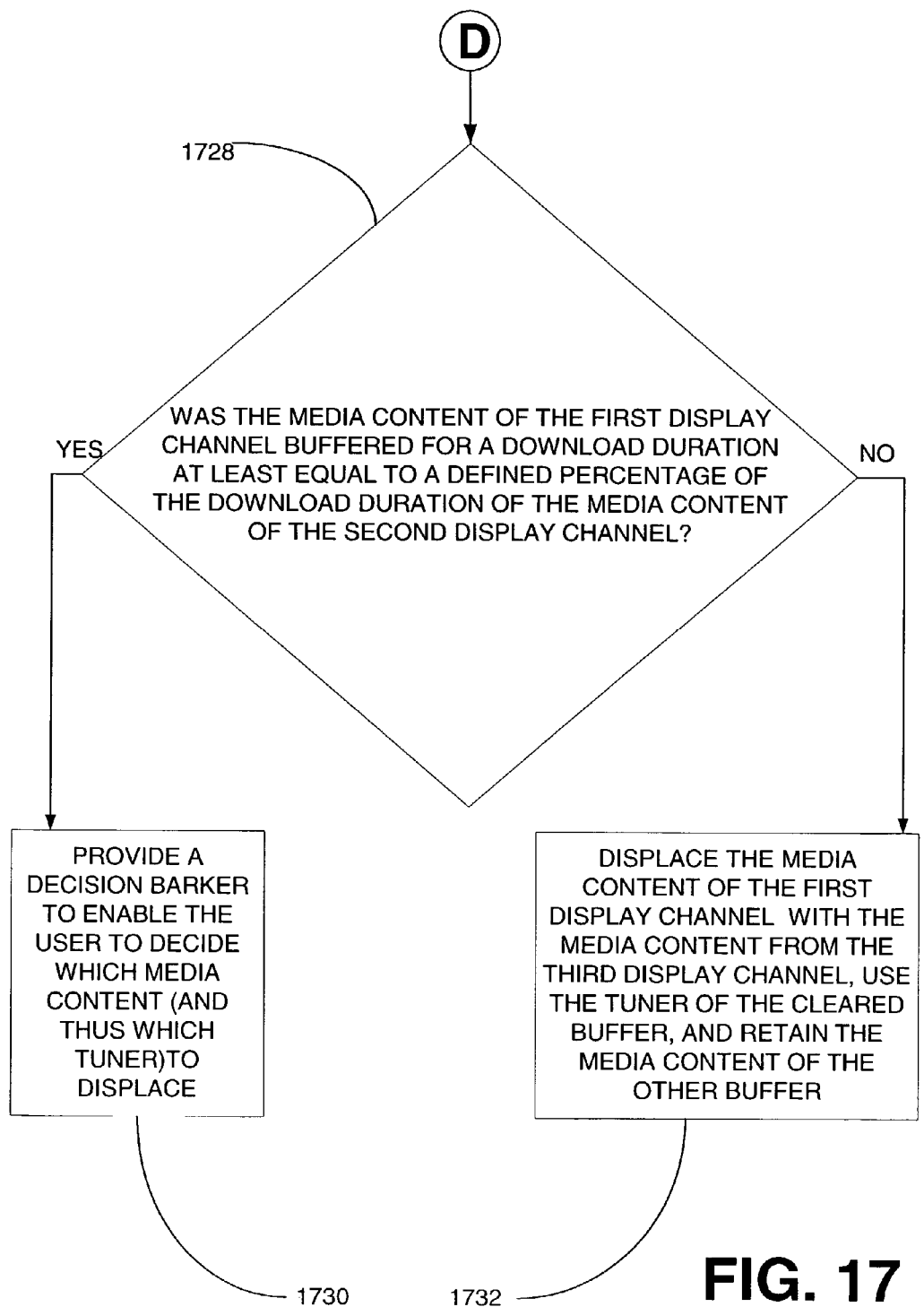

FIG. 17 continues the prioritizing steps from point D, which resulted from the decision step 1520 in FIG. 15. In other words, the media content of the first display channel was buffered for a shorter duration than the media content of the second display channel. Step 1728 mirrors the decision step of step 1622 (FIG. 16), and determines whether the media content of the first display channel was buffered for a buffering duration at least equal to a defined percentage of the buffering duration of the media content of the second display channel. If so, the decision barker is displayed for user interaction (step 1730), otherwise the first tuner (tuner1 354 FIG. 4) is resourced and the media content of the first display channel is displaced (step 1732) to make room for the media content of the third display channel (while retaining the media content of the other buffer).

FIG. 18 is a screen diagram of an example decision barker screen provided for by the PVR application 377 (FIG. 3B). The decision barker screen 1800 can be overlaid on a display of a media content instance, or preferably, is a separate screen that contains a scaled down media content display 1834. The decision barker screen 1800 further includes an instruction section 1836 that informs the user of the buffer space conflict, as well as directions as to how to resolve the conflict. A list portion 1838 includes a select symbol 1893 and scroll arrow icons 1894 and 1895 that suggest corresponding functionality to the select button 393 and up and down arrows 394 and 395 of the remote control device 380 (FIG. 3D). The list portion 1838 preferably also includes a list of titles of the media content instances buffered for each display channel, as well as the times the instances were buffered as well as the duration of time each media content instance was buffered. The user scrolls to the display channel that the user wants to remove to make room for the third display channel. If the user decides that he or she wants to permanently record buffered content, he or she selects the record options button "B".

The PVR application 377 (FIG. 3B) of the present invention can be implemented in hardware, software, firmware, or a combination thereof. In the preferred embodiment(s), the PVR application 377 is implemented in software or firmware that is stored in a memory and that is executed by a suitable instruction execution system. If implemented in hardware, as in an alternative embodiment, the PVR application 377 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The PVR application 377 (FIG. 3B), which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, at least the following is claimed:

1. A method for resourcing media content of multiple display channels, the method including the steps of:
   determining when resources are insufficient to receive media content of a newly requested display channel;
   responsive to a determination of insufficient resources, determining the lowest priority display channel using at least one user configurable rule; and
   discontinuing the receipt of media content of a display channel designated as having the lowest priority among a plurality of received display channels.

2. The method of claim 1, further including the step of employing the resources previously used to receive the discontinued media content to receive the media content of the newly requested display channel, wherein the step of employing the resources to receive the media content includes using tuning, buffering, and display resources to tune, buffer, and display media content of the newly requested display channel, further including the step of deleting the media content associated with the display channel designated as having the lowest priority, wherein the step of deleting includes at least one of configuring storage space as writeable and writing over the storage space.

3. The method of claim 1, further including the step of determining priority using a plurality of user configurable rules.

4. The method of claim 1, further including the steps of inputting at least one input variable among a plurality of input variables into the user configurable rule and providing a priority determination as an outcome, wherein the input variables are assigned values that are used in the priority determination, wherein the input variables are assigned values depending on the relationship of the input variables to at least one threshold of a plurality of thresholds.

5. A method for managing the use of media client device resources when a user request for a new display channel occurs while the resources are fully utilized for resourcing other display channels, the method comprising the steps of:
receiving an input signal indicating a user request for a new display channel while tuning and buffering media content downloaded in response to the user previously selecting a first display channel and while tuning, buffering, and displaying media content downloaded in response to the user previously selecting a second display channel;
characterizing the media content downloads of the first and second display channels with input variables;
assigning values to the input variables;
inputting the input variables and the corresponding assigned values into a set of rules that determine a priority between the first and second display channels; and
tuning, buffering, and displaying media content downloaded from the new display channel using the resources associated with the display channel having the lowest determined priority.

6. The method of claim 5, wherein the step of receiving an input signal includes the step of receiving a key press signal responsive to a user selecting a button on a remote control device, wherein the button is associated with the selection of a display channel.

7. The method of claim 5, wherein the step of characterizing the media content downloads includes the step of characterizing the media content downloads as an input variable representing a length of contiguous time of buffering media content of at least one of the first and second display channels.

8. The method of claim 5, wherein the step of characterizing the media content downloads includes the step of characterizing the media content downloads as an input variable representing a length of total time of buffering a media content instance of at least one of the first and second display channels.

9. The method of claim 5, wherein the step of characterizing the media content downloads includes the step of characterizing the media content downloads as an input variable representing a length of time that the buffered media content of at least one of the first and second display channels is displayed on a display device, wherein the set of rules dynamically adjusts a multiplicative coefficient of the input variable associated with the time the buffered media content is displayed on the display device according to the viewing patterns of the user, such that different viewing patterns are weighted differently in the set of rules.

10. The method of claim 5, wherein the step of characterizing the media content downloads includes the step of characterizing the media content downloads as an input variable representing a relationship between a length of time of buffering media content of the first display channel with a length of time of buffering media content of the second display channel.

11. The method of claim 5, wherein the step of characterizing the media content downloads includes the step of characterizing the media content downloads as an input variable representing a relationship between a length of time of buffering media content of at least one of the first and second display channel with a length of time of displaying the associated display channel media content on a display device.

12. The method of claim 5, wherein the step of characterizing the media content downloads includes the step of characterizing the media content downloads as an input variable representing whether at least one of the first and second display channels buffering media content is included in a favorites channel list, further including the step of enabling the user to configure whether the favorites channel list will influence a rule set, further including the step of using a different set of rules when the favorites channel list is employed as an input variable such that the assigned value of the input variable is weighted in a manner that favors continued buffering of the media content associated with the favorites channel list.

13. The method of claim 5, wherein the step of assigning includes the step of relating the input variables to a first threshold and a second threshold to effect a buffering behavior of the media content associated with the first and second display channels.

14. The method of claim 13, wherein the first and second thresholds include at least one of default values that are user configurable and fixed values.

15. The method of claim 13, wherein first threshold is a fixed value and the second threshold is a default value that is user configurable, further comprising the step of assigning alternate values to the first threshold and the second threshold when inputting in the set of rules an input variable representing whether at least one of the first and second display channels buffering media content is included in a favorites channel list, such that the associated values of the thresholds are weighted in a favorites channel list.

16. The method of claim 5, wherein the step of assigning includes the step of causing the input variables to exhibit a non-linear range of values when the input variables are input into the set of rules.

17. The method of claim 5, wherein the step of assigning includes the step of relating a first threshold to a first input variable value, wherein if the first input variable value is below the first threshold, the first input variable value is assigned a value of no significance.

18. The method of claim 5, wherein the step of assigning includes the step of relating a first threshold and a second threshold to a second input variable value, wherein if the second input variable value is at least equal to the first threshold but below the second threshold, the second input variable value is assigned its original value.

19. The method of claim 5, wherein the step of assigning includes the step of relating a first threshold and a second threshold to a third input variable value, wherein if the third input variable value is greater than the first and the second threshold, the third input variable value is assigned a maximum value.

20. The method of claim 5, wherein the step of assigning includes the step of assigning a fourth input variable value a value of no significance based on input of the user.

21. The method of claim 5, wherein the step of assigning includes the step of assigning a fifth input variable value a value of no significance based on input of the user to configure at least one of a desired buffering, tuning and display behavior during a user configuration session.

22. The method of claim 5, wherein the step of assigning includes the step of assigning a sixth input variable value a maximum value based on input of the user.

23. The method of claim 5, wherein the step of assigning includes the step of assigning a seventh input variable value a maximum value based on input of the user to configure at least one of a desired buffering, tuning and display behavior during a user configuration session.

24. The method of claim 5, wherein the step of assigning includes the step of relating at least one of the input variable values to a non-linear range of assigned values.

25. The method of claim 5, wherein the step of assigning includes the step of weighting each of the assigned values of the input variables multiplicatively with a respective coefficient that relates to the priority of the respective input variables, further comprising the steps of weighting a first input variable value with a first multiplicative coefficient for a first rule and weighting the first input variable value with a second multiplicative coefficient for a second rule.

26. The method of claim 5, wherein the step of assigning includes the step of pre-processing the input variables in a pre-processing module, wherein the step of pre-processing includes the steps of receiving at least one of the input variables from memory, comparing the input variable value to at least one of a pre-determined set of thresholds, assigning a new value to the input variable from a range of desired values, and multiplying the value by its respective weight coefficient for input to the set of controlling rules, wherein the step of inputting the weighted value of the one of the input variables to the set of the controlling rules includes the step of providing an outcome that effects a change to at least some of the resources used for the media content of the first and the second display channel to resource the media content of the new display channel.

27. The method of claim 5, wherein the step of inputting further comprises the step of inputting precedences configured by the user.

28. The method of claim 5, further comprising the step of using the set of rules to determine the resources to be used.

29. The method of claim 5, wherein the set of rules are programmable.

30. A method for managing the use of media client device resources when a user request for a new display channel occurs while the resources are fully utilized for resourcing other display channels, the method comprising the steps of:

receiving an input signal indicating a user request for a new display channel while tuning and buffering media content downloaded in response to the user previously selecting a first display channel and while tuning, buffering, and displaying media content downloaded in response to the user previously selecting a second display channel;

characterizing the media content downloads of the first and second display channels with input variables;

assigning values to the input variables, wherein the step of assigning includes the step of relating the an input variables to a first threshold and a second threshold to effect a buffering behavior of the media content associated with the first and second display channels, wherein the first and second thresholds include default values that are user configurable, wherein the step of assigning includes the step of causing the input variables to exhibit a non-linear range of values when the input variables are input into the set of rules, wherein the step of assigning includes the step of relating a first threshold to a first input variable value, wherein if the first input variable value is below the first threshold, the first input variable value is assigned a value of no significance, wherein the step of assigning includes the step of relating a first threshold and a second threshold to a second input variable value, wherein if the second input variable value is at least equal to the first threshold but below the second threshold, the second input variable value is assigned its original value, wherein the step of assigning includes the step of relating a first threshold and a second threshold to a third input variable value, wherein if the third input variable value is greater than the first and the second threshold, the third input variable value is assigned a maximum value, wherein the step of assigning includes the step of assigning a fourth input variable value a value of no significance based on input of the user, wherein the step of assigning includes the step of assigning a fifth input variable value a value of no significance based on input of the user to configure at least one of a desired buffering, tuning and display behavior during a user configuration session, wherein the step of assigning includes the step of assigning a sixth input variable value a maximum value based on input of the user, wherein the step of assigning includes the step of assigning a seventh input variable value a maximum value based on input of the user to configure at least one of a desired buffering, tuning and display behavior during a user configuration session, wherein the step of assigning includes the step of relating at least one of the input variable values to a non-linear range of assigned values, wherein the step of assigning includes the step of weighting each of the assigned values of the input variables multiplicatively with a respective coefficient that relates to the priority of the respective input variables, wherein the step of assigning includes the step of pre-processing the input variables in a pre-processing module, wherein the step of pre-processing includes the steps of receiving at least one of the input variables from memory, comparing the input variable value to at least one of a pre-determined set of thresholds, assigning a new value to the input variable from a range of desired values, and multiplying the value by its respective weight coefficient for input to the set of controlling rules, wherein the step of inputting the weighted value of the one of the input variables to the set of the controlling rules includes the step of providing an outcome that effects a change to at least some of the resources used for the media content of the first and the second display channel to resource the media content of the new display channel, wherein the set of rules are programmable;

inputting the input variables and the corresponding assigned values into a set of rules that determine a priority between the first and second display channels, wherein the set of rules dynamically adjusts a multiplicative coefficient of the input variable associated with the time the buffered media content is displayed on the display device according to the viewing patterns of the user, such that different viewing patterns are weighted differently in the set of rules;

tuning, buffering, and displaying media content downloaded from the new display channel using the resources associated with the display channel having the lowest determined priority;

wherein the step of characterizing the media content downloads includes the step of characterizing the media content downloads as an input variable representing a length of contiguous time of buffering media content of at least one of the first and second display channels;

wherein the step of characterizing the media content downloads includes the step of characterizing the media content downloads as an input variable representing a length of total time of buffering a media content instance of at least one of the first and second display channels;

wherein the step of characterizing the media content downloads includes the step of characterizing the media content downloads as an input variable representing a length of time that the buffered media content of at least one of the first and second display channels is displayed on a display device;

wherein the step of characterizing the media content downloads includes the step of characterizing the media content downloads as an input variable representing a relationship between a length of time of buffering media content of the first display channel with a length of time of buffering media content of the second display channel;

wherein the step of characterizing the media content downloads includes the step of characterizing the media content downloads as an input variable representing a relationship between a length of time of buffering media content of at least one of the first and second display channel with a length of time of displaying the associated display channel media content on a display device; and wherein the step of characterizing the media content downloads includes the step of characterizing the media content downloads as an input variable representing whether at least one of the first and second display channels buffering media content is included in a favorites channel list, further including the step of enabling the user to configure whether the favorites channel list will influence a rule set, further including the step of using a different set of rules when the favorites channel list is employed as an input variable such that the assigned value of the input variable is weighted in a manner that favors continued buffering of the media content associated with the favorites channel list.

31. A method for buffering media content of multiple display channels, the method including the steps of:

receiving media content of a plurality of display channels using a plurality of tuners; and buffering the media content to a plurality of buffers, wherein each tuner has an associated buffer, wherein the steps of receiving and buffering the media content of a plurality of display channels include the steps of buffering the media content of a first display channel to a first buffer associated with a first tuner, and buffering the media content of a second display channel to a second buffer associated with a second tuner, further including the step of associating the first buffer with a first filename and the second buffer with a second filename, wherein the first buffer and the second buffer are located in separate storage devices, further including the steps of recording the point in time in memory when one of the display channels is tuned and then copying the point in time to a data structure associated with an associated buffer space when a first buffering threshold duration has substantially elapsed, wherein the buffering threshold duration is user configurable, wherein the buffering resources include at least one of a storage device, a communications interface, a compression engine, compression engine memory, and system memory, further including the steps of receiving media content from an external device that is coupled to a communication port and buffering to a third buffer associated with the communication port.

32. A method for prioritizing multiple display channels, the method including the steps of:

determining the buffering durations for buffered media content of associated display channels;

prioritizing the buffering durations of a plurality of buffers; and designating at least one display channel as having the lowest priority based on the prioritized buffering durations.

33. The method of claim 32, further including the step of receiving a user request for a currently displayed channel causes the currently displayed channel to have priority over a preceding displayed channel, wherein the priority determination becomes effective at least one of immediately and after receiving a subsequent user request for displaying a subsequent display channel within a specific amount of elapsed time corresponding to less than a second buffering threshold duration.

34. The method of claim 32, wherein the step of prioritizing includes the step of designating the display channels with buffering durations that fail to meet a minimum threshold buffering duration as the lowest priority display channels.

35. The method of claim 32, further including the step of randomly deleting the buffered media content from the buffering resources associated with either of the display channels that have the lowest priority duration, further including the steps of receiving, buffering, and displaying the media content of a new display channel using tuning resources, buffering resources, and display resources associated with buffers from which the media content was deleted.

36. The method of claim 32, further including the step of providing a decision barker for a user to determine which display channel of the plurality of display channels designated as having the lowest priority should have the media content deleted, further including the step of receiving, buffering, and displaying media content of a new display channel using tuning resources, buffering resources, and display resources associated with buffers from which the media content was deleted.

37. The method of claim 32, further including the step of favoring the retention of media content associated with a favorites display channel when the favorites display channel is included among the display channels designated as having the lowest priority duration.

38. The method of claim 32, further including the step of providing a decision barker to enable a user to determine priority if the buffering duration to each of the buffers at least meet a minimum threshold buffering duration and the buffering duration to each of the buffers are of equal duration.

39. The method of claim 32, further including the step of favoring retention of media content associated with a favorites display channel when the favorites display channel is included among display channels that have buffering durations that at least meet the minimum threshold buffering duration and the buffering duration to each of the buffers are of equal duration.

40. The method of claim 32, further including the step of deleting the buffered media content having the shortest buffering duration if the buffering duration to each of the buffers at least meet the minimum threshold buffering duration.

41. The method of claim 32, further including the step of deleting the buffered media content having the shortest buffering duration if the buffering duration to each of the buffers at least meets a minimum threshold and the buffered media content with the shortest buffering duration has a buffering duration of less than a defined percentage of the buffering duration of the buffered media content having the longest buffering duration, wherein the defined percentage includes at least one of a default value and a user configurable value, further including the step of providing a decision barker to enable a user to determine priority when the lowest buffering duration is a defined value in relation to the defined percentage, further including the step of providing a user configuration screen to enable the user to determine when to provide the decision barker, further including the step of providing a user configuration screen to enable the user to determine the defined value.

42. The method of claim 32, further including the step of providing a decision barker if the buffering duration to each of the buffers at least meets a minimum threshold and the buffered media content with the lowest buffering duration has a buffering duration of at least equal to a defined percentage of the buffering duration of the buffered media content having the highest buffering duration, wherein the defined percentage includes at least one of a default value and a user configurable value, further including the step of providing a user configuration screen to enable the user to determine when to provide the decision barker.

43. The method of claim 32, further including the step of providing a decision barker for a user to determine priority when the buffering durations are substantially similar, wherein the decision barker includes a description of the buffering resource conflict, suggestions as to how to resolve the conflict, titles of each media content instance buffered, the buffering duration for each buffered media content instance, the times each media content instance was buffered, the ability to permanently record buffered media content, and the ability to delete buffered media content.

44. The method of claim 32, wherein the step of prioritizing includes the step of providing a decision barker for a user to determine priority when the buffering durations are within a defined percentage of a minimum threshold, further including the step of providing at least one of a default minimum threshold buffering duration and a user configurable minimum threshold buffering duration, further including the step of providing a user interface to a user to prioritize the display channels by prioritizing buffering durations.

45. The method of claim 32, wherein the step of prioritizing includes the step of designating the display channel having a buffering duration that consumes the least amount of storage space as the lowest priority display channel.

46. The method of claim 32, wherein the step of prioritizing includes the step of designating the display channel that included media content that was currently displayed as the lowest priority display channel.

47. The method of claim 32, wherein the step of prioritizing includes the step of designating the display channel that included media content that was the second to the last displayed as the lowest priority display channel.

48. A method for prioritizing multiple display channels, the method including the steps of:

receiving media content of a plurality of display channels using tuning resources, wherein the tuning resources include at least a tuner system, an analog decoder, a demodulator, and a demultiplexer;

buffering the media content using buffering resources, wherein the buffering resources include at least one of a storage device, a communications interface, a compression engine, compression engine memory, and system memory;

receiving a request for a new display channel when all of the tuning resources and the buffering resources are unavailable to fulfill the request;

prioritizing the plurality of display channels;

discontinuing the receiving and buffering of the lowest priority display channel;

deleting the media content associated with the lowest priority display channel;

receiving the media content of the new display channel using the tuning resources associated with the lowest priority display channel;

buffering the media content of the new display channel using the buffering resources of the lowest priority display channel;

wherein the step of prioritizing includes the step of designating the display channels with buffering durations that fail to meet a minimum threshold buffering duration as the lowest priority display channels;

wherein the step of deleting includes the step of randomly deleting the buffered media content from the buffering resources associated with either of the display channels that have the lowest priority duration, and wherein the steps of receiving and buffering include receiving and buffering the media content of the new display channel using the tuning resources and the buffering resources associated with the buffering resources from which the media content was deleted;

wherein the step of deleting includes the step of providing a decision barker for a user to determine which display channel of the plurality of display channels designated as having the lowest priority should have the media content deleted, and wherein the steps of receiving and buffering include receiving and buffering the media content of the new display channel using the tuning resources and the buffering resources associated with the buffering resources from which the media content was deleted;

wherein the step of deleting includes the step of favoring the retention of media content associated with a favorites display channel when the favorites display channel is included among the display channels designated as having the lowest priority duration;

further comprising the step of providing a decision barker to enable a user to determine priority if the buffering duration to each of the buffers at least meet a minimum threshold buffering duration and the buffering duration to each of the buffers are of equal duration;

further comprising the step of favoring retention of media content associated with a favorites display channel when the favorites display channel is included among display channels that have buffering durations that at least meet the minimum threshold buffering duration and the buffering duration to each of the buffers are of equal duration;

further comprising the step of deleting the buffered media content having the shortest buffering duration if the buffering duration to each of the buffers at least meet the minimum threshold buffering duration;

further comprising the step of deleting the buffered media content having the shortest buffering duration if the buffering duration to each of the buffers at least meets a minimum threshold and the buffered media content with the shortest buffering duration has a buffering duration of less than a defined percentage of the buffering duration of the buffered media content having the longest buffering duration, wherein the defined percentage includes at least one of a default value and a user configurable value;

further including the step of providing a decision barker to enable a user to determine priority when the lowest buffering duration is a defined value in relation to the defined percentage;

further including the step of providing a user configuration screen to enable the user to determine when to provide the decision barker;

further including the step of providing a user configuration screen to enable the user to determine the defined value;

further including the step of providing a decision barker if the buffering duration to each of the buffers at least meets a minimum threshold and the buffered media content with the lowest buffering duration has a buffering duration of at least equal to a defined percentage of the buffering duration of the buffered media content having the highest buffering duration, wherein the defined percentage includes at least one of a default value and a user configurable value;

further including the step of providing a user configuration screen to enable the user to determine when to provide the decision barker;

wherein the step of prioritizing includes the step of providing a decision barker for a user to determine priority when the buffering durations that are compared are substantially similar, wherein the decision barker includes a description of the buffering resource conflict, suggestions as to how to resolve the conflict, titles of each media content instance buffered, the buffering duration for each buffered media content instance, the times each media content instance was buffered, the ability to permanently record buffered media content, and the ability to delete buffered media content; and wherein the step of prioritizing includes the step of providing a decision barker for a user to determine priority when the buffering durations are within a defined percentage of a minimum threshold, further including the step of providing a user configurable minimum threshold buffering duration.

49. A method for resourcing media content of multiple display channels, the method including the steps of:

receiving media content of a plurality of display channels using tuning resources;

buffering the media content using buffering resources;

displaying the media content from at least one of the display channels using display resources;

receiving a request for a new display channel when all of the tuning resources, the buffering resources, and the display resources are unavailable to fulfill the request;

discontinuing the display of the media content from at least one of the display resources;

prioritizing the plurality of display channels;

discontinuing the receiving and buffering of the lowest priority display channel;

deleting the media content associated with the lowest priority display channel;

receiving the media content of the new display channel using the tuning resources associated with the lowest priority display channel;

buffering the media content of the new display channel using the buffering resources of the lowest priority display channel; and displaying the media content of the new display channel using the previously discontinued display resources.

50. The method of claim 49, wherein the steps of discontinuing includes discontinuing the receiving, buffering, and displaying of the media content associated with one of the display channels sourced from a digital transmission signal, wherein the steps of receiving, buffering, and displaying include receiving, buffering, and displaying the media content associated with the new display channel sourced from an analog transmission signal.

51. The method of claim 49, wherein the steps of discontinuing includes discontinuing the receiving, buffering, and displaying of media content associated with one of the display channels sourced from a digital transmission signal, wherein the steps of receiving, buffering, and displaying include receiving, buffering, and displaying the media content associated with the new display channel sourced from a digital transmission signal.

52. The method of claim 49, wherein the steps of discontinuing includes discontinuing the receiving, buffering, and displaying of the media content associated with one of the display channels sourced from an analog transmission signal, wherein the steps of receiving, buffering, and displaying include receiving, buffering, and displaying the media content associated with the new display channel sourced from an analog transmission signal.

53. The method of claim 49, wherein the steps of discontinuing includes discontinuing the receiving, buffering, and displaying of the media content associated with one of the display channels sourced from an analog transmission signal, wherein the steps of receiving, buffering, and displaying include receiving, buffering, and displaying the media content associated with the new display channel sourced from a digital transmission signal.

54. The method of claim 49, wherein the step of discontinuing the display includes discontinuing the display of media content associated with a first display channel sourced from a digital transmission signal while retaining the buffering of the media content associated with the first display channel, wherein the step of discontinuing the receiving and buffering includes discontinuing the receiving and buffering of media content associated with a second display channel sourced from an analog transmission signal, wherein the steps of receiving, buffering, and displaying includes receiving, buffering, and displaying the media content of the new display channel sourced from an analog transmission signal.

55. The method of claim 49, wherein the step of discontinuing the display includes discontinuing the display of media content associated with a first display channel sourced from a digital transmission signal while retaining the buffering of the media content associated with the first display channel, wherein the step of discontinuing the receiving and buffering includes discontinuing the receiving and buffering of media content associated with a second display channel sourced from an analog transmission signal, wherein the steps of receiving, buffering, and displaying includes receiving, buffering, and displaying the media content of the new display channel sourced from a digital transmission signal.

56. The method of claim 49, wherein the step of discontinuing the display includes discontinuing the display of media content associated with a first display channel sourced from a digital transmission signal while retaining the buffering of the media content associated with the first display channel, wherein the step of discontinuing the receiving and buffering includes discontinuing the receiving and buffering of media content associated with a second display channel sourced from a digital transmission signal, wherein the steps of receiving, buffering, and displaying includes receiving, buffering, and displaying the media content of the new display channel sourced from an analog transmission signal.

57. The method of claim 49, wherein the step of discontinuing the display includes discontinuing the display of media content associated with a first display channel sourced from a digital transmission signal while retaining the buffering of the media content associated with the first display channel, wherein the step of discontinuing the receiving and buffering includes discontinuing the receiving and buffering of media content associated with a second display channel sourced from a digital transmission signal, wherein the steps of receiving, buffering, and displaying includes receiving, buffering, and displaying the media content of the new display channel sourced from a digital transmission signal.

58. The method of claim 49, wherein the step of discontinuing the display includes discontinuing the display of media content associated with a first display channel sourced from an analog transmission signal while retaining the buffering of the media content associated with the first display channel, wherein the step of discontinuing the receiving and buffering includes discontinuing the receiving and buffering of media content associated with a second display channel sourced from an analog transmission signal, wherein the steps of receiving, buffering, and displaying includes receiving, buffering, and displaying the media content of the new display channel sourced from an analog transmission signal.

59. The method of claim 49, wherein the step of discontinuing the display includes discontinuing the display of media content associated with a first display channel sourced from an analog transmission signal while retaining the buffering of the media content associated with the first display channel, wherein the step of discontinuing the receiving and buffering includes discontinuing the receiving and buffering of media content associated with a second display channel sourced from an analog transmission signal, wherein the steps of receiving, buffering, and displaying includes receiving, buffering, and displaying the media content of the new display channel sourced from a digital transmission signal.

60. The method of claim 49, wherein the step of discontinuing the display includes discontinuing the display of media content associated with a first display channel sourced from an analog transmission signal while retaining the buffering of the media content associated with the first display channel, wherein the step of discontinuing the receiving and buffering includes discontinuing the receiving and buffering of media content associated with a second display channel sourced from a digital transmission signal, wherein the steps of receiving, buffering, and displaying includes receiving, buffering, and displaying the media content of the new display channel sourced from an analog transmission signal.

61. The method of claim 49, wherein the step of discontinuing the display includes discontinuing the display of media content associated with a first display channel sourced from an analog transmission signal while retaining the buffering of the media content associated with the first display channel, wherein the step of discontinuing the receiving and buffering includes discontinuing the receiving and buffering of media content associated with a second display channel sourced from a digital transmission signal, wherein the steps of receiving, buffering, and displaying includes receiving, buffering, and displaying the media content of the new display channel sourced from a digital transmission signal.

62. The method of claim 49, wherein the step of deleting includes writing over the media content associated with the lowest priority display channel with the media content of the new display channel.

63. The method of claim 49, wherein the step of deleting includes configuring at least a portion of a buffer space associated with the deleted media content as writeable and writing the media content of the new display channel in any writeable area of the buffer space.

64. The method of claim 49, wherein the display resources include at least one of a display device, a media memory, and a media engine.

65. The method of claim 49, wherein the buffering resources include at least one of a storage device, a communications interface, a compression engine, compression engine memory, and system memory.

66. The method of claim 49, wherein the tuning resources include at least a tuner system, an analog decoder, a demodulator, and a demultiplexer.

67. The method of claim 49, further including the step of receiving media content of a second display channel using a first tuner, the second display channel transmitted over the same center RF frequency as a first display channel, and receiving the media content of the second display channel using the first tuner, and buffering the media content of the first display channel to a first buffer and buffering the media content of the second display channel to a second buffer.

68. A method for resourcing media content of multiple display channels, the method including the steps of:
  receiving media content of a plurality of display channels using tuning resources;
  buffering the media content using buffering resources;
  displaying the media content from at least one of the display channels using display resources;
  receiving a request for a new display channel when all of the tuning resources, the buffering resources, and the display resources are unavailable to fulfill the request;
  discontinuing the display of the media content from at least one of the display resources;
  prioritizing the plurality of display channels;
  discontinuing the receiving and buffering of the lowest priority display channel;
  deleting the media content associated with the lowest priority display channel;
  receiving the media content of the new display channel using the tuning resources associated with the lowest priority display channel;
  buffering the media content of the new display channel using the buffering resources of the lowest priority display channel;
  displaying the media content of the new display channel using the previously discontinued display resources;
  wherein the steps of discontinuing includes discontinuing the receiving, buffering, and displaying of the media content associated with one of the display channels sourced from a digital transmission signal, wherein the steps of receiving, buffering, and displaying include receiving, buffering, and displaying the media content associated with the new display channel sourced from an analog transmission signal;
  wherein the steps of discontinuing includes discontinuing the receiving, buffering, and displaying of media content associated with one of the display channels sourced from a digital transmission signal, wherein the steps of receiving, buffering, and displaying include receiving, buffering, and displaying the media content associated with the new display channel sourced from a digital transmission signal;
  wherein the steps of discontinuing includes discontinuing the receiving, buffering, and displaying of the media content associated with one of the display channels sourced from an analog transmission signal, wherein the steps of receiving, buffering, and displaying include receiving, buffering, and displaying the media content associated with the new display channel sourced from an analog transmission signal;

wherein the steps of discontinuing includes discontinuing the receiving, buffering, and displaying of the media content associated with one of the display channels sourced from an analog transmission signal, wherein the steps of receiving, buffering, and displaying include receiving, buffering, and displaying the media content associated with the new display channel sourced from a digital transmission signal;

wherein the step of discontinuing the display includes discontinuing the display of media content associated with a first display channel sourced from a digital transmission signal while retaining the buffering of the media content associated with the first display channel, wherein the step of discontinuing the receiving and buffering includes discontinuing the receiving and buffering of media content associated with a second display channel sourced from an analog transmission signal, wherein the steps of receiving, buffering, and displaying includes receiving, buffering, and displaying the media content of the new display channel sourced from an analog transmission signal;

wherein the step of discontinuing the display includes discontinuing the display of media content associated with a first display channel sourced from a digital transmission signal while retaining the buffering of the media content associated with the first display channel, wherein the step of discontinuing the receiving and buffering includes discontinuing the receiving and buffering of media content associated with a second display channel sourced from an analog transmission signal, wherein the steps of receiving, buffering, and displaying includes receiving, buffering, and displaying the media content of the new display channel sourced from a digital transmission signal;

wherein the step of discontinuing the display includes discontinuing the display of media content associated with a first display channel sourced from a digital transmission signal while retaining the buffering of the media content associated with the first display channel, wherein the step of discontinuing the receiving and buffering includes discontinuing the receiving and buffering of media content associated with a second display channel sourced from a digital transmission signal, wherein the steps of receiving, buffering, and displaying includes receiving, buffering, and displaying the media content of the new display channel sourced from an analog transmission signal;

wherein the step of discontinuing the display includes discontinuing the display of media content associated with a first display channel sourced from a digital transmission signal while retaining the buffering of the media content associated with the first display channel, wherein the step of discontinuing the receiving and buffering includes discontinuing the receiving and buffering of media content associated with a second display channel sourced from a digital transmission signal, wherein the steps of receiving, buffering, and displaying includes receiving, buffering, and displaying the media content of the new display channel sourced from a digital transmission signal;

wherein the step of discontinuing the display includes discontinuing the display of media content associated with a first display channel sourced from an analog transmission signal while retaining the buffering of the media content associated with the first display channel, wherein the step of discontinuing the receiving and buffering includes discontinuing the receiving and buffering of media content associated with a second display channel sourced from an analog transmission signal, wherein the steps of receiving, buffering, and displaying includes receiving, buffering, and displaying the media content of the new display channel sourced from an analog transmission signal;

wherein the step of discontinuing the display includes discontinuing the display of media content associated with a first display channel sourced from an analog transmission signal while retaining the buffering of the media content associated with the first display channel, wherein the step of discontinuing the receiving and buffering includes discontinuing the receiving and buffering of media content associated with a second display channel sourced from an analog transmission signal, wherein the steps of receiving, buffering, and displaying includes receiving, buffering, and displaying the media content of the new display channel sourced from a digital transmission signal;

wherein the step of discontinuing the display includes discontinuing the display of media content associated with a first display channel sourced from an analog transmission signal while retaining the buffering of the media content associated with the first display channel, wherein the step of discontinuing the receiving and buffering includes discontinuing the receiving and buffering of media content associated with a second display channel sourced from a digital transmission signal, wherein the steps of receiving, buffering, and displaying includes receiving, buffering, and displaying the media content of the new display channel sourced from an analog transmission signal; and wherein the step of discontinuing the display includes discontinuing the display of media content associated with a first display channel sourced from an analog transmission signal while retaining the buffering of the media content associated with the first display channel, wherein the step of discontinuing the receiving and buffering includes discontinuing the receiving and buffering of media content associated with a second display channel sourced from a digital transmission signal, wherein the steps of receiving, buffering, and displaying includes receiving, buffering, and displaying the media content of the new display channel sourced from a digital transmission signal.

69. A method for of staging the resources used for resourcing media content of multiple display channels, the method including the steps of:

receiving a request for a new display channel;

then determining the availability of unemployed resources to receive, buffer, and display the media content of the new display channel, wherein the resources include tuners to receive the transmitted media content, a display device to display the media content of the new display channel, storage device capacity to buffer the media content of the new display channel, interface access capability for buffering and retrieving media content to and from the storage device, compression engines, and decompression engines, and memory;

then determining whether to discontinue a display channel that is currently receiving and buffering media content in order to repossess a resource that is to be used for the new display channel media content;

then upon determining whether to discontinue a display channel, selecting a display channel that is currently buffering to discontinue;

then upon determining the unavailability of a display device to display the media content of the new display channel, discontinuing the display of the media content of the selected display channel;

then discontinuing the buffering of the media content of the selected display channel while continuing the buffering of non-selected display channel media content;

then deleting the media content of the selected display channel;

then upon determining the unavailability of a tuner to receive the media content of the new display channel, discontinuing the receipt of the media content of the selected display channel at a tuner of the selected display channel, then receiving the media content of the new display channel using the tuner previously associated with the selected display channel;

buffering media content of the new display channel into a buffer previously associated with the selected display channel; and displaying the media content of the new display channel using the display device previously associated with the selected display channel.

70. A system for resourcing media content of multiple display channels, the system comprising:

a memory with logic;

tuning resources to receive media content of a plurality of display channels;

buffering resources for buffering the media content;

display resources for displaying the media content from at least one of the display channels; and a processor configured with the logic to determine when the resources are unavailable to receive media content of a newly requested display channel, wherein the processor is further configured with the logic to, responsive to a determination of insufficient resources, determine the lowest priority display channel using at least one user configurable rule, wherein the processor is further configured with the logic to effect discontinuing the receipt of media content of a display channel designated as having the lowest priority among a plurality of received display channels, wherein the processor is further configured with the logic to employ the resources previously used to receive the discontinued media content to receive the media content of the newly requested display channel, wherein the processor is further configured with the logic to effect using tuning, buffering, and display resources to tune, buffer, and display media content of the newly requested display channel, wherein the processor is further configured with the logic to effect deleting the media content associated with the display channel designated as having the lowest priority, wherein deleting includes at least one of configuring storage space as writeable and writing over the storage space, wherein the processor is further configured with the logic to determine priority using a plurality of user configurable rules, wherein the processor is further configured with the logic to input at least one input variable among a plurality of input variables into the user configurable rule and provide a priority determination as an outcome.

71. A system for managing the use of media client device resources when a user request for a new display channel occurs while the resources are fully utilized for resourcing other display channels, the system comprising:

a memory with logic;

tuning resources to receive media content of a plurality of display channels;

buffering resources for buffering the media content;

display resources for displaying the media content from at least one of the display channels; and a processor configured with the logic to receive an input signal indicating a user request for a new display channel while effecting the tuning and buffering of media content downloaded in response to the user previously selecting a first display channel and while effecting the tuning, buffering, and displaying of media content downloaded in response to the user previously selecting a second display channel, wherein the processor is further configured with the logic to characterize the media content downloads of the first and second display channels with input variables, wherein the processor is further configured with the logic to assign values to the input variables, wherein the processor is further configured with the logic to input the input variables and the corresponding assigned values into a set of rules that determine a priority between the first and second display channels, wherein the processor is further configured with the logic to then effect the tuning, buffering, and displaying of media content downloaded from the new display channel using the resources associated with the display channel having the lowest determined priority.

72. The system of claim 71, wherein the processor is further configured with the logic to relate at least one of the input variable values to a non-linear range of assigned values.

73. The system of claim 71, wherein the processor is further configured with the logic to weight each of the assigned values of the input variables multiplicatively with a respective coefficient that relates to the priority of the respective input variables, wherein the processor is further configured with the logic to weight a first input variable value with a first multiplicative coefficient for a first rule and weight the first input variable value with a second multiplicative coefficient for a second rule.

74. The system of claim 71, wherein the processor is further configured with the logic to pre-process the input variables in a pre-processing module, wherein the pre-processing module is configured to receive at least one of the input variables from memory, compare the input variable value to at least one of a pre-determined set of thresholds, assign a new value to the input variable from a range of desired values, and multiply the value by its respective weight coefficient for input to the set of controlling rules, wherein the pre-processing module is further configured to provide an outcome that effects a change to at least some of the resources used for the media content of the first and the second display channel to resource the media content of the new display channel.

75. The system of claim 71, wherein the processor is further configured with the logic to receive precedences configured by the user.

76. The system of claim 71, wherein the processor is further configured with the logic to use the set of rules to determine the resources to be used.

77. The system of claim 71, wherein the set of rules are programmable.

78. A system for buffering media content of multiple display channels, the system comprising:
a plurality of tuners for receiving media content of a plurality of display channels;
a plurality of buffers for buffering the media content;
a memory with logic; and
a processor configured with the logic to effect the tuning and buffering, wherein the processor is further configured with the logic to associate each of the buffers with an associated tuner, wherein the processor is further configured with the logic to effect buffering the media content to a plurality of buffers, wherein each tuner has an associated buffer, wherein the processor is further configured with the logic to effect buffering the media content of a first display channel to a first buffer associated with a first tuner, and effect buffering the media content of a second display channel to a second buffer associated with a second tuner, wherein the processor is further configured with the logic to associate the first buffer with a first filename and the second buffer with a second filename, wherein the first buffer and the second buffer are located in separate storage devices, wherein the processor is further configured with the logic to record the point in time in memory when one of the display channels is tuned and then effect copying the point in time to a data structure associated with an associated buffer space when a first buffering threshold duration has substantially elapsed, wherein the buffering threshold duration is user configurable, further including a communications interface, a compression engine, compression engine memory, and system memory, wherein the processor is further configured with the logic to effect receiving media content from an external device that is coupled to a communication port and buffering to a third buffer associated with the communication port.

79. A system for prioritizing multiple display channels, the system comprising:
a plurality of buffers for storing buffered media content;
a memory with logic; and
a processor configured with the logic to determine the buffering durations for buffered media content of associated display channels, wherein the processor is further configured with the logic to prioritize the buffering durations of the plurality of buffers, wherein the processor is further configured with the logic to designate at least one display channel as having the lowest priority based on the prioritized buffering durations.

80. The system of claim 79, wherein the processor is further configured with the logic to designate the display channels with buffering durations that fail to meet a minimum threshold buffering duration as the lowest priority display channels, wherein the processor is further configured with the logic to randomly delete the buffered media content from the buffers associated with either of the display channels that have the lowest priority duration, wherein the processor is further configured with the logic to effect receiving, buffering, and displaying the media content of a new display channel using tuning resources, buffering resources, and display resources associated with the buffers from which the media content was deleted, wherein the processor is further configured with the logic to provide a decision barker for a user to determine which display channel of the plurality of display channels designated as having the lowest priority should have the media content deleted, wherein the processor is further configured with the logic to effect receiving, buffering, and displaying media content of a new display channel using tuning resources, buffering resources, and display resources associated with the buffers from which the media content was deleted, wherein the processor is further configured with the logic to favor the retention of media content associated with a favorites display channel when the favorites display channel is included among the display channels designated as having the lowest priority duration, wherein the processor is further configured with the logic to provide a decision barker to enable a user to determine priority if the buffering duration to each of the buffers at least meet a minimum threshold buffering duration and the buffering duration to each of the buffers are of equal duration, wherein the processor is further configured with the logic to favor retention of media content associated with a favorites display channel when the favorites display channel is included among display channels that have buffering durations that at least meet the minimum threshold buffering duration and the buffering duration to each of the buffers are of equal duration, wherein the processor is further configured with the logic to effect the deletion of the buffered media content having the shortest buffering duration if the buffering duration to each of the buffers at least meet the minimum threshold buffering duration, wherein the processor is further configured with the logic to delete the buffered media content having the shortest buffering duration if the buffering duration to each of the buffers at least meets a minimum threshold and the buffered media content with the shortest buffering duration has a buffering duration of less than a defined percentage of the buffering duration of the buffered media content having the longest buffering duration, wherein the defined percentage includes at least one of a default value and a user configurable value, wherein the processor is further configured with the logic to provide a decision barker to enable a user to determine priority when the lowest buffering duration is a defined value in relation to the defined percentage, wherein the processor is further configured with the logic to provide a user configuration screen to enable the user to determine when to provide the decision barker, wherein the processor is further configured with the logic to provide a user configuration screen to enable the user to determine the defined value, wherein the processor is further configured with the logic to provide a decision barker if the buffering duration to each of the buffers at least meets a minimum threshold and the buffered media content with the lowest buffering duration has a buffering duration of at least equal to a defined percentage of the buffering duration of the buffered media content having the highest buffering duration, wherein the defined percentage includes at least one of a default value and a user configurable value, wherein the processor is further configured with the logic to provide a user configuration screen to enable the user to determine when to provide the decision barker, wherein the processor is further configured with the logic to provide a decision barker for a user to determine priority when the buffering durations are substantially similar, wherein the decision barker includes a description of the buffering resource conflict, suggestions as to how to resolve the conflict, titles of each media content instance buffered, the buffering duration for each buffered media content instance, the times each media content instance was buffered, the ability to permanently record buffered media content, and the ability to delete buffered media content, wherein the processor is further configured with the logic to provide a decision barker for a user to determine priority when the buffering durations are within a defined percentage of a minimum threshold, wherein the processor is further configured with the logic to provide a default minimum threshold buffering duration, wherein the processor is further configured with the logic to provide a user configurable minimum threshold buffering duration.

81. The system of claim 79, wherein the processor is further configured with the logic to provide a user interface to a user to prioritize the display channels by prioritizing buffering durations.

82. A system for resourcing media content of multiple display channels, the system comprising:
 a memory with logic;
 tuning resources to receive media content of a plurality of display channels;
 buffering resources for buffering the media content;
 display resources for displaying the media content from at least one of the display channels;
 a processor configured with the logic to receive a request for a new display channel when all of the tuning resources, the buffering resources, and the display resources are unavailable to fulfill the request, wherein the processor is further configured with the logic to effect the discontinuance of the display of the media content from at least one of the display resources, wherein the processor is further configured with the logic to prioritize the plurality of display channels, wherein the processor is further configured with the logic to effect the discontinuance of the receiving and buffering of the lowest priority display channel, wherein the processor is further configured with the logic to effect the deletion of the media content associated with the lowest priority display channel, wherein the processor is further configured with the logic to effect the receipt of the media content of the new display channel using the tuning resources associated with the lowest priority display channel, wherein the processor is further configured with the logic to effect the buffering of the media content of the new display channel using the buffering resources of the lowest priority display channel, wherein the processor is further configured with the logic to effect the displaying of the media content of the new display channel using the previously discontinued display resources.

83. The system of claim 82, wherein the processor is further configured with the logic to effect the continuing of the tuning and the buffering of the non-deleted media content using the tuning resources and the buffering resources associated with the buffering resources in which the media content was not deleted.

84. The system of claim 82, wherein the display resources include at least one of a display device, a media memory, and a media engine.

85. The system of claim 82, wherein the buffering resources include at least one of a storage device, a communications interface, a compression engine, compression engine memory, and system memory.

86. The system of claim 82, wherein the tuning resources include at least a tuner system, an analog decoder, a demodulator, and a demultiplexer.

* * * * *